United States Patent [19]

Suzuki et al.

[11] Patent Number: 6,031,575
[45] Date of Patent: Feb. 29, 2000

[54] METHOD AND APPARATUS FOR ENCODING AN IMAGE SIGNAL, METHOD AND APPARATUS FOR DECODING AN IMAGE SIGNAL, AND RECORDING MEDIUM

[75] Inventors: Teruhiko Suzuki, Chiba; Yoichi Yagasaki, Kanagawa, both of Japan

[73] Assignee: Sony Corporation, Tokyo, Japan

[21] Appl. No.: 08/825,704

[22] Filed: Mar. 19, 1997

[30] Foreign Application Priority Data

Mar. 22, 1996 [JP] Japan .................................. 8-066640

[51] Int. Cl.[7] .................................................. H04N 7/32
[52] U.S. Cl. ............................................ 348/411; 348/409
[58] Field of Search ..................................... 348/384, 390,
348/396–403, 405, 407–413, 415, 416,
419, 420, 699, 423; 382/232, 233, 236,
238, 240, 244–246, 248–251; H04N 7/32

[56] References Cited

U.S. PATENT DOCUMENTS

| | | | |
|---|---|---|---|
| 5,113,255 | 5/1992 | Nagata et al. ............................ | 348/416 |
| 5,155,593 | 10/1992 | Yonemitsu et al. ...................... | 348/413 |
| 5,173,773 | 12/1992 | Ueda et al. ............................... | 348/407 |
| 5,367,629 | 11/1994 | Chu et al. ................................. | 348/400 |
| 5,410,307 | 4/1995 | Hekstra et al. .......................... | 348/412 |
| 5,412,428 | 5/1995 | Tahara ..................................... | 348/396 |
| 5,418,570 | 5/1995 | Ueno et al. .............................. | 348/699 |
| 5,627,601 | 5/1997 | Ran et al. ................................ | 348/402 |
| 5,742,343 | 4/1998 | Haskell et al. .......................... | 348/401 |
| 5,768,537 | 6/1998 | Butter et al. ............................. | 348/415 |
| 5,818,531 | 10/1998 | Yamaguchi et al. .................... | 348/420 |

*Primary Examiner*—Richard Lee
*Attorney, Agent, or Firm*—Frommer Lawerence & Haug, LLP; William S. Frommer

[57] ABSTRACT

An image signal encoding method and apparatus of encoding first and second image signals in decomposed forms and a key signal used to combine the first and second image signals. First and second scalable encoding processes are performed on the first and second image signals, respectively. A scalable encoding process is performed on the key signal which is similar to that employed for the second image signal. In a typical application, the first image signal is a background image signal and the second image signal is a foreground image signal. The method and apparatus enables highly efficient encoding and decoding of a moving image.

26 Claims, 39 Drawing Sheets

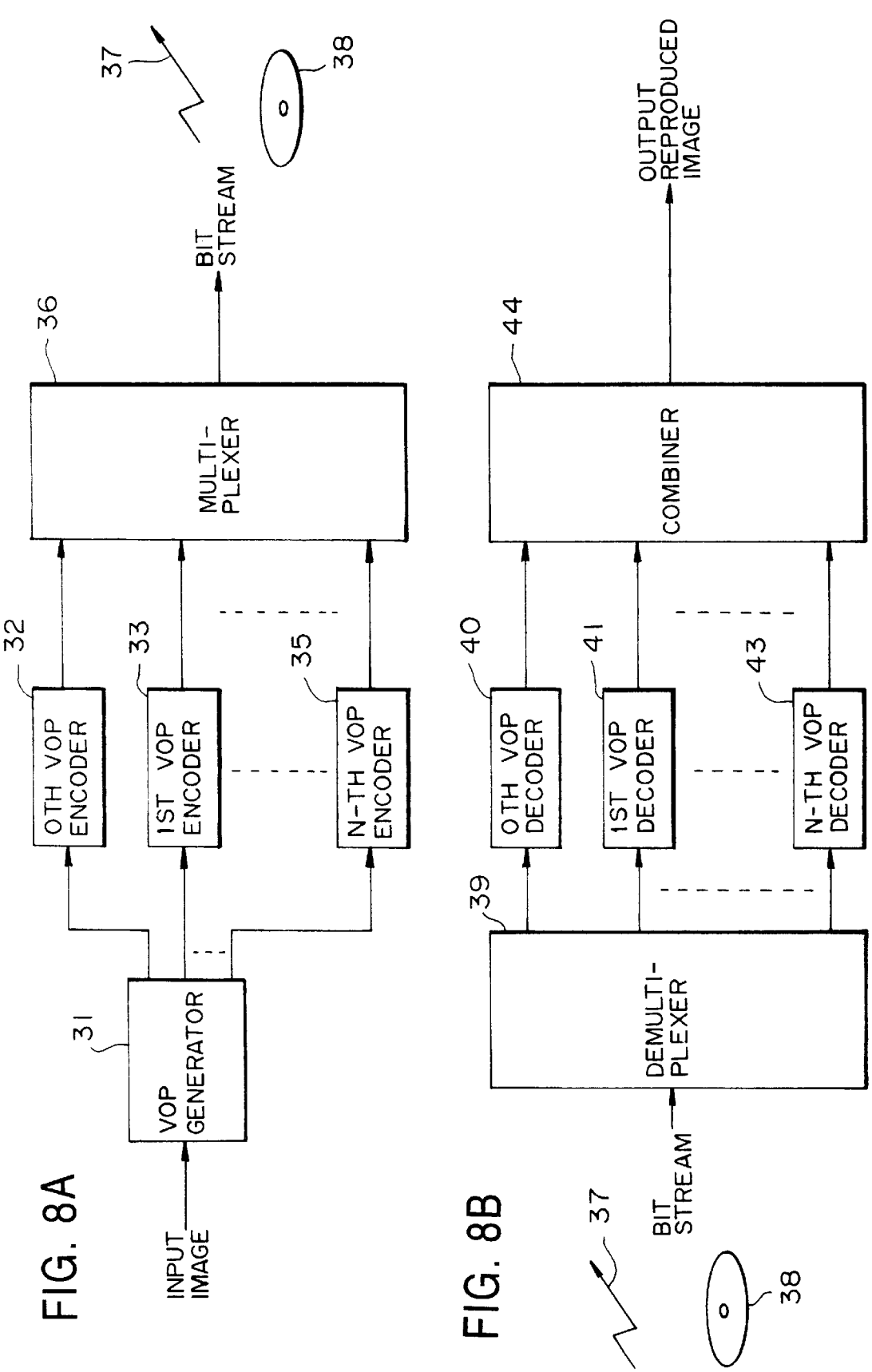

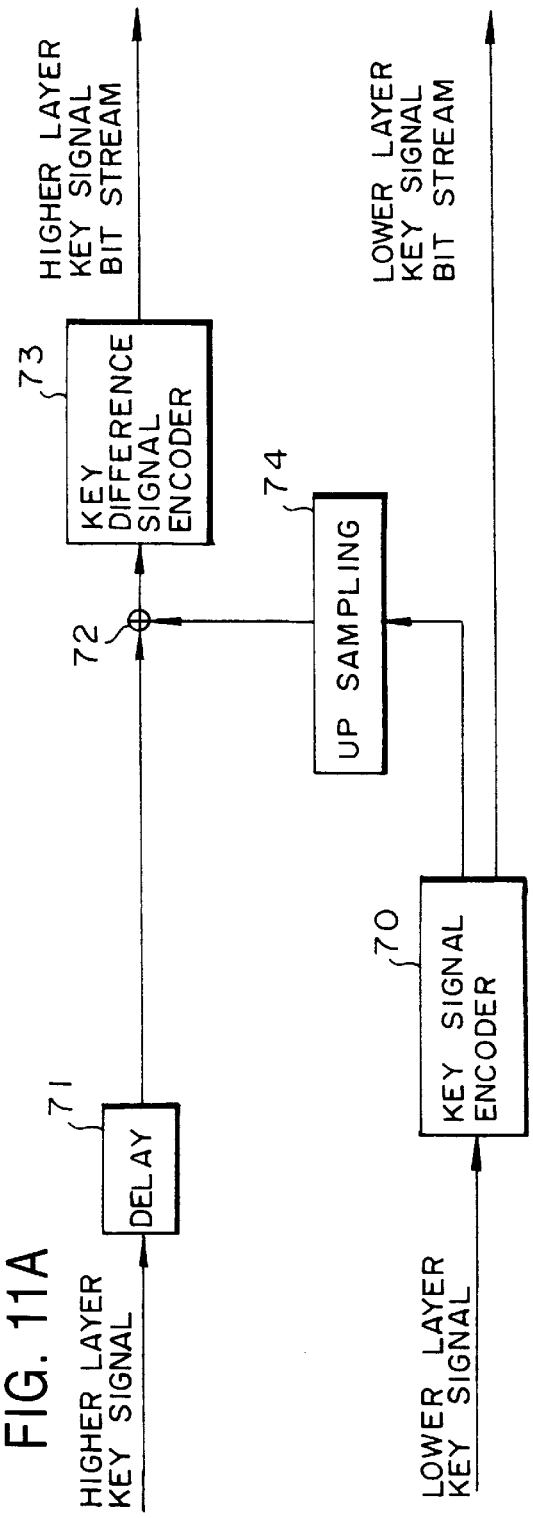
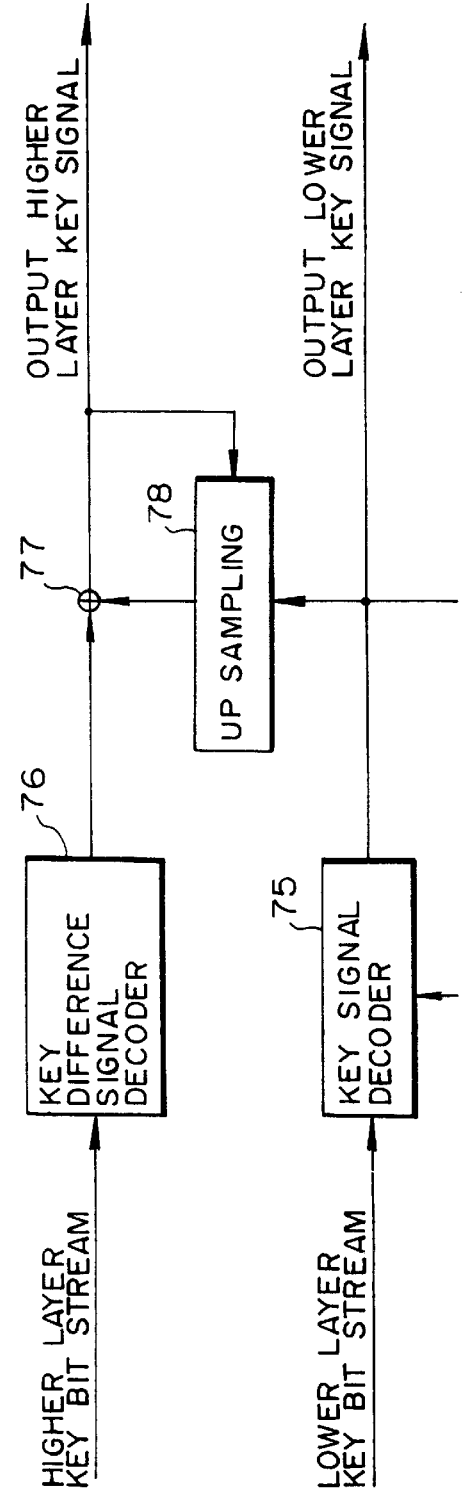
FIG. 11A
FIG. 11B

FIG. 25

SESSION LAYER

|  | No. of bits | Mnemonic |
|---|---|---|
| session_layer() { | | |
|   session_start_code | 32 | bslbf |
| | | |
|   number_of_scalable_layers | 3 | unimsbf |
|   for(i=0; i<=num_of_scalable_layers; i++) { | | |
|     scalable_mode | 2 | unimsbf |
| | | |
|     scalable_layer_dependency | 1 | unimsbf |
|     if(scalable_mode == "temporal_scalability") { | | |
|       num_B_in_set | 3 | unimsbf |
|     } | | |
|     more_than_one_VOP | 1 | unimsbf |
| | | |
|     session_width | 10 | unimsbf |
|     session_height | 10 | unimsbf |
|   } | | |
| | | |
|   while(nextbits() !=session_end_code) | | |
|     VOP_layer() | | |
| | | |
|   session_end-code | | |
| } | | |

FIG. 26

VOP LAYER

| Syntax | No. of bits | Mnemonic |
|---|---|---|
| VOP_start_code | sc +3 | |
| VOP_ID | 5 | |
| VOP_scl_layer_ID | 3 | |
| VOP_temp_ref | 8 | |
| VOP_visibility | 1 | |
| if(VOP_visibility & more_than_one_VOP) { | | |
|     VOP_composition_order | 5 | |
|     VOP_horizontal_spatial_ref | 10 | |
|     VOP_vertical_spatial_ref | 10 | |
|     VOP_scaling | 3 | |
| } | | |
| if(nextbits() != VOP_start_code & | | |
|   nextbits() != session_end_code) { | | |
|   if(more_than_one_VOP) { | | |
|     VOP_width | 10 | |
|     VOP_height | 10 | |
|   } | | |
|   VOP_of_arbitrary_shape | 1 | |
|     if(VOP_of_arbitrary_shape) { | | |
|       binary_shape | | |
|       if(binary_shape) { | | |
|         do { | | |
|           first_QT_code | 1-2 | |
|           if(first_QT_code=="0") | | |
|             subsequent_QT_codes | | |
|         } while(count of macroblock != total number of macroblocks | | |
|       } else { | | |
|         do { | | |
|           first_QT_code | | |
|           if(first_QT_code=="0") { | | |
|             subsequent_QT_codes | | |
|             VQ_codes | 0-128 | |
|           } | | |
|         } while(count of macroblock != total number of macroblocks | | |
|       } | | |
|     } | | |
|   VOP_prediction_type | 2 | |
|   VOP_quantizer | 5 | |
|   separate_motion_texture | 1 | |
|   if(!separate_motion_texture) | | |
|     combined_motion_texture_coding | | |
|   else { | | |
|     motion_coding | | |
|     texture_coding | | |
|   } | | |
| } | | |

FIG. 27

MACROBLOCK LAYER

| | No. of bits | Mnemonic |
|---|---|---|
| Macroblock_layer() { | | |
|   COD | 1 | |
|   if(COD != 0) { | | |
|     MCBPC | | vlc |
|     if(MB_type !=Stuffing) { | | |
|       CBPY | | vlc |
|       if((MB_type == 1)\|\|(MB_type == 4) \|\| (MB_type == 6)) | | |
|         DQUANT | 2 | |
|       if((MB_type == 0) \|\|(MB_type == 1) \|\| (MB_type == 2)) | | |
|         MVD | | vlc |
|       if(MB_type == 2) | | |
|         MVD(2-4) | | vlc |
|       if(spatial_temporal_weight_code_flag ==1) | | |
|         spatial_temporal_weight_code | 1 | |
|     } | | |
|   } | | |
| } | | |

FIG. 28

| VOP_type | MB_type | Name | COD | MCBPC | CBPY | DQUANT | MVD | MVD2-4 |
|---|---|---|---|---|---|---|---|---|
| P | not coded | - | X | | | | | |
| P | 0 | INTER | X | X | X | | X | |
| P | 1 | INTER+Q | X | X | X | X | X | |
| P | 2 | INTER4V | X | X | X | | X | X |
| P | 3 | INTRA | X | X | X | | | |
| P | 4 | INTRA+Q | X | X | X | X | | |
| P | stuffing | - | X | X | | | | |
| I | 3 | INTRA | | X | X | | | |
| I | 4 | INTRA+Q | | X | X | X | | |
| I | stuffing | - | | X | | | | |

NOTE: "X" MEANS THAT THE ITEM IS PRESENT IN THE MACROBLOCK.

FIG. 29

| VOP_type | MB_type | Name | COD | MCBPC | CBPY | DQUANT | MVD | MVD2-4 | spatial_temporal_weight_code_flag |
|---|---|---|---|---|---|---|---|---|---|
| I | not coded | - | x | | | | | | 0 |
| I | 5 | compatible | x | x | x | | | | 0 |
| I | 6 | compatible+Q | x | x | x | x | | | 0 |
| I | 3 | Intra | x | x | x | | | | 0 |
| I | 4 | Intra+Q | x | x | x | x | | | 0 |
| I | Stuffing | - | x | x | | | | | 0 |
| P | not coded | - | x | | | | | | 0 |
| P | 0 | Inter | x | x | x | | x | | 1 |
| P | 1 | Inter+Q | x | x | x | x | x | | 1 |
| P | 2 | Inter4V | x | x | x | | x | x | 1 |
| P | 3 | Intra | x | x | x | | | | 0 |
| P | 4 | Intra+Q | x | x | x | x | | | 0 |
| P | 5 | compatible | x | x | x | | | | 0 |
| P | 6 | compatible+Q | x | x | x | x | | | 0 |
| P | Stuffing | - | x | x | | | | | 0 |

FIG. 30

| spatial_temporal_weight_code | spatial_temporal_weight_class |
|---|---|
| 0 | 0 |
| 1 | 1 |

FIG. 31

| MB_type | Name | spatial_temporal_weight_class | spatial_temporal_weight_code_flag |
|---|---|---|---|
| 0 | Inter | 0,1 | 1 |
| 1 | Inter+Q | 0,1 | 1 |
| 2 | Inter4V | 0,1 | 1 |
| 3 | Intra | 0 | 0 |
| 4 | Intra+Q | 0 | 0 |
| 5 | compatible | 2 | 0 |
| 6 | compatible+Q | 2 | 0 |

FIG. 32

VOP LAYER

| Syntax | No. of bits | Mnemonic |
|---|---|---|
| VOP_start_code | sc +3 | |
| VOP_ID | 5 | |
| VOP_temp_ref | 8 | |
| VOP_visibility | 1 | |
| if(VOP_visibility & more_than_one_VOP) { | | |
|     VOP_composition_order | 5 | |
|     VOP_horizontal_spatial_ref | 10 | |
|     VOP_vertical_spatial_ref | 10 | |
|     VOP_scaling | 3 | |
| } | | |
| if(nextbits() != VOP_start_code & | | |
|   nextbits() != session_end_code) { | | |
|   if(more_than_one_VOP) { | | |
|     VOP_width | 10 | |
|     VOP_height | 10 | |
|   } | | |
|   VOP_of_arbitrary_shape | 1 | |
|     if(VOP_of_arbitrary_shape) { | | |
|       binary_shape | | |
|       if(binary_shape) { | | |
|         do { | | |
|           first_QT_code | 1-2 | |
|           if(first_QT_code=="0") | | |
|             subsequent_QT_codes | | |
|         } while(count of macroblock != total number of macroblocks | | |
|       } else { | | |
|         do { | | |
|           first_QT_code | | |
|           if(first_QT_code=="0") { | | |
|             subsequent_QT_codes | | |
|             VQ_codes | 0-128 | |
|           } | | |
|         } while(count of macroblock != total number of macroblocks | | |
|       } | | |
|     } | | |
|   VOP_prediction_type | 2 | |
|   VOP_quantizer | 5 | |
|   separate_motion_texture | 1 | |
|   if(!separate_motion_texture) | | |
|     combined_motion_texture_coding | | |
|   else { | | |
|     motion_coding | | |
|     texture_coding | | |
|   } | | |
| } | | |

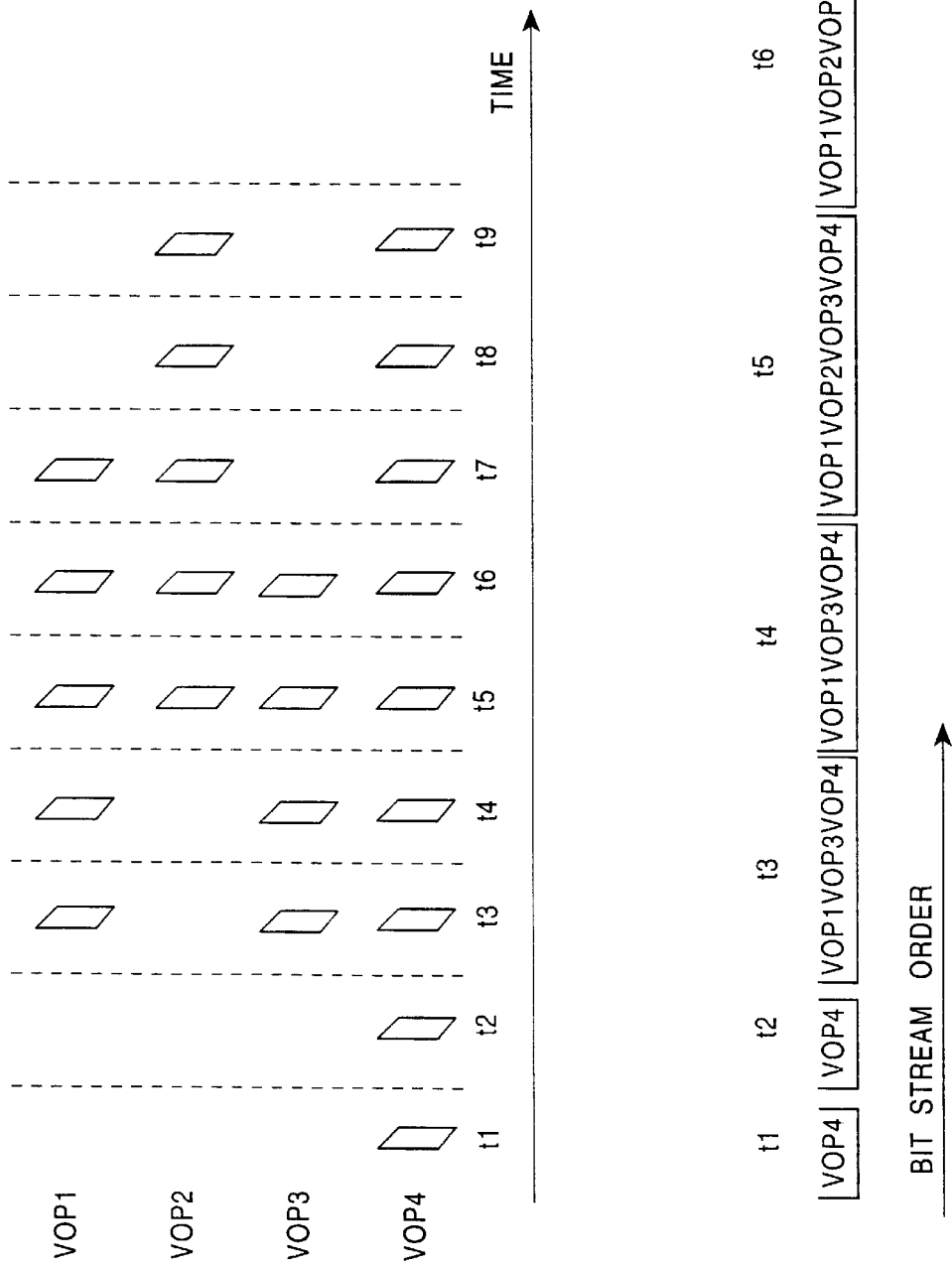

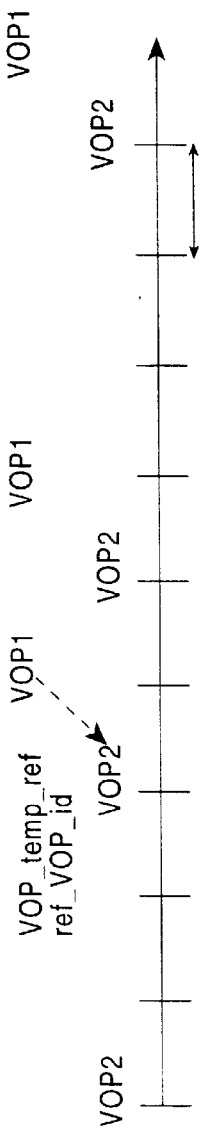
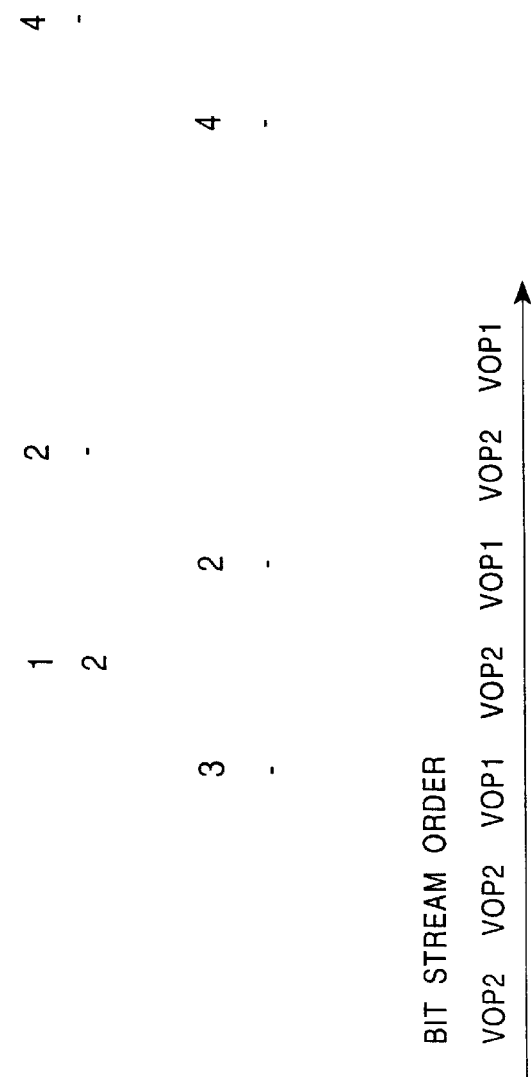
FIG. 35A
FIG. 35B
FIG. 35C

FIG. 36

VOP LAYER

| Syntax | No. of bits | Mnemonic |
|---|---|---|
| VOP_start_code | sc +3 | |
| VOP_ID | 5 | |
| ref_VOP_id | 5 | |
| VOP_temp_ref | 8 | |
| VOP_visibility | 1 | |
| if(VOP_visibility & more_than_one_VOP) { | | |
|     VOP_composition_order | 5 | |
|     VOP_horizontal_spatial_ref | 10 | |
|     VOP_vertical_spatial_ref | 10 | |
|     VOP_scaling | 3 | |
| } | | |
| if(nextbits() != VOP_start_code & | | |
|   nextbits() != session_end_code) { | | |
| if(more_than_one_VOP) { | | |
|     VOP_width | 10 | |
|     VOP_height | 10 | |
| } | | |
| VOP_of_arbitrary_shape | 1 | |
|   if(VOP_of_arbitrary_shape) { | | |
|     binary_shape | | |
|     if(binary_shape) { | | |
|       do { | | |
|         first_QT_code | 1-2 | |
|         if(first_QT_code=="0") | | |
|           subsequent_QT_codes | | |
|       } while(count of macroblock != total number of macroblocks | | |
|     } else { | | |
|       do { | | |
|         first_QT_code | | |
|         if(first_QT_code=="0") { | | |
|           subsequent_QT_codes | | |
|           VQ_codes | 0-128 | |
|         } | | |
|       } while(count of macroblock != total number of macroblocks | | |
|     } | | |
| } | | |
| VOP_prediction_type | 2 | |
| VOP_quantizer | 5 | |
| separate_motion_texture | 1 | |
| if(!separate_motion_texture) | | |
|   combined_motion_texture_coding | | |
| else { | | |
|   motion_coding | | |
|   texture_coding | | |
| } | | |
| } | | |

FIG. 39

VOP LAYER

| Syntax | No. of bits | Mnemonic |
|---|---|---|
| VOP_start_code | sc +3 | |
| VOP_ID | 5 | |
| VOP_temp_ref | 8 | |
| if(VOP is eraste) | | |
|    VOP_end | | |

METHOD AND APPARATUS FOR ENCODING AN IMAGE SIGNAL, METHOD AND APPARATUS FOR DECODING AN IMAGE SIGNAL, AND RECORDING MEDIUM

BACKGROUND OF THE INVENTION

1. Field of the Invention

The present invention relates to an image signal encoding method and an image signal encoding apparatus, an image signal decoding method and an image signal decoding apparatus, an image signal transmission method and an image signal transmission apparatus, and a recording medium on which information is recorded in the form which can be decoded by the image signal decoding apparatus, which are suitable for use in systems for recording an input image signal on a recording medium such as an magneto-optical disk or a magnetic tape and reproducing the image signal from the recording medium thereby displaying the reproduced image on a display device, or systems, such as a video conference system, a video telephone system, broadcasting equipment, a multimedia database retrieving system, for transmitting a moving image signal via a transmission line from a transmitting end to a receiving end so that the transmitted moving image is displayed on a displaying device at the receiving end, and also systems for editing and recording a moving image signal.

2. Description of the Related Art

In the art of moving-image transmission systems such as video conference systems or video telephone systems, it is known in to convert an image signal into a compressed code on the basis of line-to-line and/or frame-to-frame correlation of the image signal so as to use a transmission line in a highly efficient fashion. The encoding technique according to the MPEG (Moving Picture Experts Group) standard can provide a high compression efficiency and is widely used. This standard has been proposed after the discussion in the ISO (International Standardization Organization).

The MPEG technique is a hybrid technique of motion prediction encoding and DCT (discrete cosine transform) encoding techniques. One specific technique based on the MPEG standard has been developed by the inventors of the present invention and is disclosed in U.S. Pat. No. 5,155,593 (Date of Patent: Oct. 13, 1992).

In the MPEG standard, several profiles at various levels are defined so that the standard can be applied to a wide variety of applications. Of these, the most basic one is the main profile at main level (MP@ML). Referring to FIG. 1, an example of an encoder according to the MP@ML of the MPEG standard will be described below.

An input image signal is supplied to a frame memory 1, and then encoded in the predetermined order as described below. The image data to be encoded is applied, in units of macroblocks, to a motion vector extraction circuit 2. The motion vector extraction circuit 2 processes the image data for each frame as an I-picture, a P-picture, or a B-picture according to a predetermined procedure. In the above procedure, the processing mode is predefined for each frame of the image of the sequence, and each frame is processed as an I-picture, a P-picture, or a B-picture corresponding to the predefined processing mode (for example frames are processes in the order of I, B, P, B, P, . . . , B, P).

The motion vector extraction circuit 2 extracts a motion vector, used in motion compensation process, from each frame of image with reference to a reference frame. The motion compensation (interframe prediction) is performed in one of three modes: forward, backward, and forward-and-backward prediction modes. The prediction for a P-picture is performed only in the forward prediction mode, while the prediction for a B-picture is performed in one of the above-described three modes. The motion vector extraction circuit 2 selects a prediction mode which can lead to a minimum prediction error, and generates a predicted vector in the selected prediction mode. The prediction error is compared for example with the dispersion of the given macroblock to be encoded. If the dispersion of the macroblock is smaller than the prediction error, prediction compensation encoding is not performed on that macroblock but, instead, intraframe encoding is performed. In this case, the prediction mode is referred to as an intraframe encoding mode. The obtained motion vector and the information indicating the prediction mode employed are supplied to a variable-length encoder 6 and a motion compensation circuit 12.

The motion compensation circuit 12 generates a predicted reference image on the basis of the motion vector supplied from the motion vector extraction circuit 2. The result is applied as a predicted reference image signal to an arithmetic operation circuit 3. The arithmetic operation circuit 3 calculates the difference between the value of the given macroblock to be encoded and the value of the predicted reference image. The result is supplied as a predicted residual signal to a DCT circuit 4. In the case of an intramacroblock, the arithmetic operation circuit 3 directly transfers the value of the given macroblock to be encoded to the DCT circuit 4 without performing any operation. That is, in this case, the input image signal is directly supplied to the DCT circuit 4.

The DCT circuit 4 performs a DCT (discrete cosine transform) operation on the predicted residual signal for each given macroblock (or the input image signal) thereby generating DCT coefficients. The resultant DCT coefficients for each given macroblock are supplied to a quantization circuit 5. The quantization circuit 5 quantizes the DCT coefficients in accordance with a quantization scale depending on the amount of data stored in a transmission buffer 7. The quantized data is then supplied to the variable-length encoder 6.

The variable-length encoder 6 converts the quantized data supplied from the quantization circuit 5 into a variable-length code using for example the Huffman encoding technique, in accordance with the quantization scale supplied from the quantization circuit 5. The obtained variable-length code is supplied to a transmission buffer 7. The variable-length encoder 6 also receives the quantization scale from the quantization circuit 5 and the motion vector as well as the information indicating the prediction mode (that is, the information indicating in which mode of the intraframe prediction mode, the forward prediction mode, the backward prediction mode, or forward-and-backward prediction mode the prediction has been performed) from the motion vector extraction circuit 2, and converts these received data into variable-length codes.

The transmission buffer 7 stores the received data temporarily. The information representing the amount of data stored in the transmission buffer 7 is fed back to the quantization circuit 5. If the amount of residual data stored in the transmission buffer 7 reaches an upper allowable limit, the transmission buffer 7 generates a quantization control signal (buffer feedback signal) to the quantization circuit 5 so that the following quantization operation is performed using an increased quantization scale thereby decreasing the amount of quantized data. Conversely, if the amount of residual data decreases to a lower allowable limit, the transmission buffer 7 generates a quantization control signal (buffer feedback signal) to the quantization circuit 5 so that the following quantization operation is performed using a decreased quantization scale thereby increasing the amount of quantized data. In this way, an overflow or underflow in the transmission buffer 7 is prevented. The encoded data stored in the transmission buffer 7 is read out at a specified time and output in the form of an encoded bit stream over a transmission line (not shown) or recorded on a recording medium (not shown).

The quantized data output by the quantization circuit 5 is also supplied to an inverse quantization circuit 8. The inverse quantization circuit 8 performs inverse quantization on the received data in accordance with the quantization scale given by the quantization circuit 5 thereby generating DCT coefficients corresponding to the output signal of the DCT circuit 4. The DCT coefficients generated by the inverse quantization circuit 8 are supplied to an IDCT (inverse DCT) circuit 9 which in turn performs an inverse DCT operation on the received data and generates a predicted residual signal corresponding to the output signal of the arithmetic operation circuit 3 (an input image signal is generated in the case of the intraframe prediction encoding mode). The predicted residual signal is then supplied to an arithmetic operation circuit 10. The arithmetic operation circuit 10 adds together the predicted reference image signal supplied from the motion compensation circuit and the predicted residual signal. The resultant data is stored as a predicted image signal in a frame memory 11.

With reference to FIG. 2, an example of a decoder for performing a decoding operation according to the MP@ML standard of the MPEG will be described below. A coded bit stream is transmitted over the transmission line and is supplied to a receiving circuit (not shown) or is reproduced by a reproducing apparatus. The coded bit stream is stored in a receiving buffer 21 temporarily and then supplied to a variable-length decoder 22. The variable-length decoder 22 performs an inverse variable-length encoding operation on the data supplied from the receiving buffer 21 and generates a motion vector. The obtained motion vector and the information indicating the associated prediction mode are supplied to a motion compensation circuit 27. The variable-length decoder 22 also supplies a quantization scale to the inverse quantization circuit 23. Furthermore, the quantized data obtained by the above inverse variable-length encoding operation, which corresponds to the data output by the quantization circuit 5 in the encoding apparatus, is supplied from the variable-length decoder 22 to the inverse quantization circuit 23.

The inverse quantization circuit 23 performs an inverse quantization operation on the quantized data supplied from the variable-length decoder 22 using the quantization scale supplied from the variable-length decoder 22 thereby generating DCT coefficients corresponding to the output signal of the DCT circuit 4 in the encoding apparatus. The resultant DCT coefficients are supplied to an IDCT circuit 24. The IDCT circuit 24 performs an inverse DCT operation on the received DCT coefficients thereby generating an image signal (in the case of the intraframe prediction encoding mode) corresponding to the output signal of the arithmetic operation circuit 4 of the encoding apparatus. The resultant image signal is supplied to an arithmetic operation circuit 25. The arithmetic operation circuit 25 directly outputs the input image signal as a decoded image signal without performing any operation on it. When the reproduced image signal output by the arithmetic operation circuit 25 is an I-picture data, the reproduced image signal is stored in a frame memory 26 so that a predicted reference signal can be produced later from this image signal, for use in processing an image signal (a P- or B-picture image signal). The above decoded image signal is output to the outside as a reproduced image signal.

In the case where the input encoded bit stream is a P- or B-picture signal, the output signal of the IDCT circuit 24 corresponds to the input image signal of the arithmetic operation circuit 4 (in the case of the intraframe prediction encoding mode). In this case, the image signal output by the IDCT circuit 24 is supplied to the arithmetic operation circuit 25 and the arithmetic operation circuit 25 directly outputs the input image signal as a reproduced image signal without processing it. On the other hand, if the output signal of the IDCT circuit 24 outputs a predicted residual signal corresponding to the predicted residual signal output by the arithmetic operation circuit 4 of the encoding apparatus (this is the case when the signal has been processed in the interframe prediction encoding mode), the above predicted residual signal output by the IDCT circuit 24 is supplied to the arithmetic operation circuit 25, and the arithmetic operation circuit 25 generates a reproduced image signal by adding together the predicted residual signal and a predicted reference image signal supplied from a motion compensation circuit 27. In the above operation, the motion compensation circuit 27 generates the predicted reference image signal by processing the motion vector supplied from the variable-length decoder 22 in the prediction mode specified by the data also supplied from the variable-length decoder 22. In the case where the given data is a P-picture, the decoded image signal output by the arithmetic operation circuit 5 is stored in the frame memory 6 so that it can be used as a reference image signal in processing a subsequent image signal to be decoded.

In the MPEG standard, various profiles at various levels are also defined, and various tools are available. For example, scalability is available as one of these tools. The scalability of the MPEG encoding technique makes it possible to encode various image signals having different image sizes at various frame rates. For example, when only a lower-layer bit stream is decoded in a spatially-scalable fashion, an image signal having a small image size may be decoded, while an image signal having a large image size may be decoded if both lower-layer and higher-layer bit streams are decoded.

With reference to FIG. 3, an example of an encoder having the spatial scalability will be described below. In the spatial scaling, an image signal having a small image size is given as a lower layer signal, while an image signal having a large image size is given as a higher layer signal. The input image in the lower layer is first stored in a frame memory 101, and then is encoded in a manner similar to the MP@ML signal described above except that the output signal (the predicted image signal) provided by an arithmetic operation circuit 110 is supplied not only to a frame memory 111 so that it is used as a predicted reference image signal in the lower layer, but also to an image signal expansion circuit 113. The image signal expansion circuit 113 expands the predicted reference image signal supplied from the arithmetic operation circuit 110 up to an image size equal to the image size in the higher layer so that it is used as a predicted reference image signal in the higher layer. The other parts are the same as those of the encoder shown in FIG. 1, and will not be described here in further detail.

On the other hand, the input image signal in the higher layer is first stored in a frame memory 115. A motion vector extraction circuit 116 extracts a higher-layer motion vector and determines a prediction mode, in a manner similar to the operation according to the MP@ML. A motion compensation circuit 126 generates a predicted reference image signal using the higher-layer motion vector in the prediction mode determined by the motion vector extraction circuit 116. The resultant signal is supplied as a predicted higher-layer reference image signal to a weighting circuit 127. The weighting circuit 127 multiplies the predicted higher-layer reference image signal by a weighting factor W. The weighted predicted higher-layer reference image signal is then supplied to an arithmetic operation circuit 128.

On the other hand, as described above, the predicted image signal from the arithmetic operation circuit 110 in the lower layer is supplied to the frame memory 111 and the image signal expansion circuit 113. The image signal expansion circuit 113 expands the predicted image signal generated by the arithmetic operation circuit 110 up to a size equal to that of the image in the higher layer. The expanded image signal is supplied as a predicted lower-layer reference image signal to a weighting circuit 114. The weighting circuit 114 multiplies the predicted lower-layer reference signal by a weighting factor W. The weighted value of the predicted lower-layer reference signal is then supplied to the arithmetic operation circuit 128. The arithmetic operation circuit 128 generates a predicted reference image signal by adding together the weighted value of the predicted higher-layer reference image signal and the weighted value of the predicted lower-layer reference image signal. The obtained signal is supplied to an arithmetic operation circuit 117 so that it is used as a predicted reference frame for the image signal in the higher layer. The arithmetic operation circuit 117 calculates the difference between the image signal to be encoded and the predicted reference image signal supplied from the arithmetic operation circuit 128, and outputs the result as a predicted residual signal. However, in the case where the macroblock is to be processed in the intraframe prediction encoding mode, the arithmetic operation circuit 117 directly supplies the image signal to be encoded to a DCT circuit 118 without performing any operation.

The DCT circuit 118 performs a DCT (discrete cosine transform) operation on the output signal of the arithmetic operation circuit 117 in units of macroblocks thereby generating DCT coefficients (wherein the output signal of the arithmetic operation circuit 117 is given as a predicted residual signal when the signal is to be processed in the interframe prediction encoding mode while it is given as an input image signal when the signal is to be processed in the intraframe prediction encoding mode). The generated DCT coefficients are supplied to a quantization circuit 119. The quantization circuit 119 quantizes the DCT coefficients, as in the operation for the MP@ML data, using a quantization scale determined in accordance with the amount of data stored in a transmission buffer 121. The quantized DCT coefficients are supplied to a variable-length encoder 120. The variable-length encoder 120 performs a variable-length encoding operation on the quantized DCT coefficients, and outputs the resultant encoded data as a higher-layer bit stream via the transmission buffer 121.

The quantized DCT coefficients from the quantization circuit 119 are supplied to an inverse quantization circuit 122. The inverse quantization circuit 122 performs an inverse quantization operation on the received signal using the same quantization scale as that employed by the quantization circuit 119 thereby generating DCT coefficients corresponding to the output signal of the DCT circuit 118. The generated DCT coefficients are supplied to an inverse DCT circuit 123. The inverse DCT circuit 123 performs an inverse DCT operation on the DCT coefficients thereby generating an image signal (in the case of the intraframe prediction encoding mode) or a predicted residual signal (in the case of the interframe prediction encoding mode) corresponding to the output signal of the arithmetic operation circuit 117. The resultant signal is supplied to an arithmetic operation circuit 124. The arithmetic operation circuit 124 generates a predicted image signal by adding together the predicted reference image signal supplied from the arithmetic operation circuit 128 and the predicted residual signal supplied from the inverse DCT circuit 123. The resultant predicted image signal is stored in a frame memory 125. In the case where the signal supplied from the arithmetic operation circuit 123 is an image signal (that is, in the case where the signal is to be processed in the intraframe prediction encoding mode), the image signal from the arithmetic operation circuit 123 is directly supplied as a predicted image signal via the arithmetic operation circuit 124 to the frame memory 125.

The variable-length encoder 120 also receives the higher-layer motion vector extracted by the motion vector extraction circuit 116 and the information indicating the associated prediction mode, the quantization scale employed by the quantization circuit 119, and the weighting factor W used by the weighting circuits 114 and 127. These data are encoded into variable-length codes, and output as an encoded data from the variable-length encoder 120.

Now referring to FIG. 4, an example of a decoder having the capability of spatial scaling will be described below. The lower-layer bit stream input to a reception buffer 201 is decoded in a similar manner to the MP@ML signal described above except that the output signal of an arithmetic operation circuit 205, that is a decoded image signal in the lower layer, is supplied not only to the outside and to a frame memory 206 so that the signal stored in the frame memory 206 can be used as a predicted reference image signal in processing a subsequent image signal to be decoded (for an I- or P-picture signal), but also to an image signal expansion circuit 208.

On the other hand, the higher-layer bit stream is stored in a reception buffer 209, and then supplied as an encoded data to a variable-length decoder 210. The variable-length decoder 210 performs a variable-length decoding operation on the received data thereby generating quantized DCT coefficients, a quantization scale, a higher-layer motion vector, prediction mode data, and a weighting factor W. The quantized DCT coefficients and the quantization scale decoded by the variable-length decoder 210 are supplied to an inverse quantization circuit 211. The inverse quantization circuit 211 performs an inverse quantization operation on the quantized DCT coefficients using the quantization scale thereby generating DCT coefficients corresponding to the output signal of the DCT circuit 118 of the encoder. The resultant DCT coefficients are supplied to an inverse DCT circuit 212. The inverse DCT circuit 212 performs an inverse DCT operation on the received DCT coefficients thereby generating an image signal (in the case of the intraframe prediction encoding mode) or a predicted residual signal (in the case of the interframe prediction encoding-mode). The generated signal is supplied to an arithmetic operation circuit 213.

The higher-layer motion vector and the associated prediction mode data decoded by the variable-length decoder 210 are supplied to a motion compensation circuit 215. The motion compensation circuit 215 compensates for the motion of the predicted image signal stored in the frame memory 214 using the higher-layer motion vector in the specified prediction mode thereby generating a predicted reference image signal. The resultant predicted higher-layer reference image signal is supplied to a weighting circuit 216. The weighting circuit also receives the weighting factor W decoded by the variable-length decoder 210. The weighting circuit multiplies the predicted higher-layer reference image signal by the weighting factor W. The weighted value of the predicted higher-layer reference image signal is supplied to an arithmetic operation circuit 217.

The decoded image signal output by the arithmetic operation circuit 205 is output as a reproduced lower-layer image signal and also supplied to the frame memory 206. Furthermore, the decoded image signal is also supplied to the image signal expansion circuit 218. The image signal expansion circuit 218 expands the decoded image signal supplied from the lower-layer circuit to the same size as that of the higher-layer image signal. The expanded image signal is then supplied to the weighting circuit 208 so that the expanded imaged signal can be used as a predicted reference image signal in the higher layer. The weighting circuit 208 also receives the weighting factor W decoded by the variable-length decoder 210. The weighting circuit 208 multiplies the expanded image signal supplied from the image signal expansion circuit 7 by the weighting factor (1−W). The result is supplied as a weighted value of the predicted lower-layer reference image signal to an arithmetic operation circuit 217.

The arithmetic operation circuit 217 generates a predicted reference image signal by adding together the weighted value of the predicted higher-layer reference image signal and the weighted value of the predicted lower-layer reference image signal. The obtained signal is supplied to an arithmetic operation circuit 213. The arithmetic operation circuit 213 adds the predicted residual signal supplied from the inverse DCT circuit 212 and the predicted reference image signal supplied from the arithmetic operation circuit 217, thereby generating a reproduced higher-layer image, which is supplied not only to the outside but also to a frame memory 214. The reproduced higher-layer image signal stored in the frame memory 214 is used as a predicted reference image signal in a later process to decode a subsequent image signal. If the output signal of the inverse DCT circuit 212 is an image signal (this is the case when the signal is an intraframe-prediction-encoded signal), the image signal is directly output from the arithmetic operation signal 213 as a reproduced higher-layer image signal.

Although in the above description the operation of dealing with a luminance signal is described, the operation for a color difference signal is also performed in a similar manner except that the motion vector used for the luminance signal is reduced to half in both vertical and horizontal directions.

In addition to the MPEG standard, there are various standards for converting a moving image signal into a compressed code in a highly efficient manner. For example, the H.261 and H.263 standards established by the ITU-T are employed in encoding process especially for communication. Although there are some differences in the details associated with for example header information, the H.261 and H.263 standards are also based on the combination of motion compensation prediction encoding and DCT encoding, and thus an encoder and a decoder can be implemented in a simlar manner to those described above.

It is also known in the art to compose an image by combining a plurality of images. An example of a conventional image composing system will be described below. In this technique, an image of an object (for example a human figure) is taken in front of a background having a particular uniform color such as blue. Areas having colors other than blue (image area of the human figure) are extracted from the image, and the extracted image of the human figure is combined with another image (for example another background image). In the above process, the signal representing the extracted areas is referred to as the key signal.

FIG. 5 illustrates the principle of a technique of encoding a composite image signal generated in the above-described manner. In FIG. 5, a background image F1 and a foreground image F2 are combined into a single image. The foreground image F2 is obtained by taking a picture of an object in front of a background having a particular color, and then extracting the areas having colors different from the background color. The extracted areas are represented by a key signal K1. A composite image F3 is obtained by combining the foreground image F2 and the background image F1 using the key signal K1. Then the composite image F3 is encoded according to an appropriate encoding technique such as the MPEG encoding technique. At the stage of the encoding of the composite image, the information of the key signal has already been lost. Therefore, when the decoded composite image is edited, as is the case where only the background image F1 is changed while maintaining the foreground image F2 unchanged, it is required to extract the foreground image from the composite image using a chromakey, and then combine the extracted foreground image with another background image. However, the above recomposition and the associated editing process are generally difficult. Furthermore, if a composite image signal is encoded in a scaled fashion, similar difficulty will be encountered when the composite image signal is decoded and edited.

SUMMARY OF THE INVENTION

It is an general object of the present invention to solve the above problems. More specifically, it is an object of the present invention to provide an image signal encoding method and an image signal encoding apparatus, an image signal decoding method and an image signal decoding apparatus, an image signal transmission method and an image signal transmission apparatus, and a recording medium on which information is recorded in the form which can be decoded by the image signal decoding apparatus, whereby a composite image can be effectively edited.

According to an aspect of the present invention, there is provided an image signal encoding method of encoding first and second image signals in decomposed forms and a key signal used to combine the first and second image signals, the method comprising the steps of: performing a scalable encoding process on the first image signal and the second image signal; and performing a scalable encoding process on the key signal, the scalable encoding process is similar to that employed for the image signals.

According to another aspect of the present invention, there is provided an image signal encoding method of encoding an image signal comprising a higher-layer image signal and a lower-layer image signal, the method comprising the steps of: encoding the lower-layer image signal using a prediction encoding method, and generating an encoded lower-layer image signal; encoding the higher-layer image signal and generating an encoded higher-layer image signal; wherein the step of generating the higher-layer image signal comprises the steps of: generating a predicted image signal in accordance with the same prediction method as that used to generate the lower-layer image signal corresponding to the higher-layer image signal, the predicted image signal being generated from the data generated in accordance with the prediction method; calculating the difference between the higher-layer image signal and the predicted image signal thereby generating a difference image signal; and encoding the difference image signal and generating an encoded difference image signal.

According to still another aspect of the present invention, there is provided an image signal encoding method of encoding an image signal comprising a higher-layer image signal and a lower-layer image signal, the method comprising the steps of: encoding the lower-layer image signal and generating an encoded lower-layer image signal; and encoding the higher-layer image signal only for such a part other than the part corresponding to a part of the lower-layer image signal in which no encoded lower-layer image signal is generated in the step of encoding the lower-layer image signal, thereby generating an encoded higher-layer image signal.

According to a further aspect of the present invention, there is provided an image signal encoding method of encoding an image signal comprising a higher-layer image signal and a lower-layer image signal, the method comprising the steps of: encoding the lower-layer image signal using a prediction encoding method thereby generating an encoded lower-layer image signal and information indicating the encoding mode employed; and encoding the higher-layer image signal and generating an encoded higher-layer image signal; wherein in the step of generating the higher-layer image signal, the higher-layer image signal is encoded in the same encoding mode as that employed to encode the lower-layer image signal.

According to still another aspect of the present invention, there is provided an image signal encoding method of encoding an image signal comprising a higher-layer image signal and a lower-layer image signal, the method comprising the steps of: quantizing the lower-layer image signal, and generating an encoded lower-layer image signal and a quantization scale; quantizing the higher-layer image signal, and generating an encoded higher-layer image signal and a quantization scale; and transmitting the encoded lower-layer image signal and the encoded higher-layer image signal; wherein in the transmission step, when the quantization scale associated with the lower layer is not transmitted, the quantization scale associated with the higher layer is not transmitted, while when the quantization scale associated with the lower layer is transmitted, the quantization scale associated with the higher layer is transmitted.

According to still another aspect of the present invention, there is provided an image signal transmission method in which a plurality of decomposed image signals are separately encoded and then the plurality of encoded image signals are multiplexed into a single bit stream and transmitted, the method comprising the steps of: separately encoding the plurality of image signals, and generating a plurality of encoded image signals; multiplexing the plurality of encoded image signals into a single bit stream, and generating the single bit stream; and transmitting the single bit stream; wherein the multiplexing step is performed so that the frames of the plurality of images which are to be displayed first before the other frames are located adjacent or near to each other in the bit stream.

According to still another aspect of the present invention, there is provided an image signal transmission method in which a plurality of decomposed image signals are separately encoded and then the plurality of encoded image signals are multiplexed into a single bit stream and transmitted, the method comprising the steps of: separately encoding the plurality of image signals, and generating a plurality of encoded image signals; multiplexing the plurality of encoded image signals into a single bit stream, and generating the single bit stream; and transmitting the single bit stream; wherein in the multiplexing step, the plurality of encoded image signals are multiplexed into the single bit stream together with two flags, one flag indicating a delay time of a frame to be displayed first in each image from the displaying time of another image indicated by the other flag.

According to still another aspect of the present invention, there is provided an image signal transmission method in which a plurality of decomposed image signals are separately encoded and then the plurality of encoded image signals are multiplexed into a single bit stream and transmitted, the method comprising the steps of: separately encoding the plurality of image signals, and generating a plurality of encoded image signals; multiplexing the plurality of encoded image signals into a single bit stream, and generating the single bit stream; and transmitting the single bit stream; wherein in the multiplexing step, to prohibit a particular image from being displayed after a particular time, a flag indicating a particular frame to be displayed last and a flag indicating the particular time at which the last frame to be displayed are also multiplexed.

According to still another aspect of the present invention, there is provided an image decoding method of decoding an encoded signal, the encoded signal comprising a signal obtained by encoding first and second image signals in decomposed forms and a key signal used to combine the first and second image signals, the method comprising the steps of: performing a scalable decoding process on the first encoded image signal and the second encoded image signal thereby generating a decoded first image signal and a second decoded image signal; and performing a scalable decoding process on the encoded key signal, the scalable decoding processed being similar to that employed for the image signals, thereby generating a decoded key signal.

According to still another aspect of the present invention, there is provided an image signal decoding method of decoding an encoded image signal, the encoded image signal comprising an encoded lower-layer image signal and an encoded higher-layer image signal, the encoded image signal having been encoded according to the procedure including the steps of: encoding the lower-layer image signal using a prediction encoding method, and generating an encoded lower-layer image signal; encoding the higher-layer image signal and generating an encoded higher-layer image signal; wherein the step of generating the higher-layer image signal comprises the steps of: generating a predicted image signal in accordance with the same prediction method as that used to generate the lower-layer image signal corresponding to the higher-layer image signal, the predicted image signal being generated from the data generated in accordance with the prediction method; calculating the difference between the higher-layer image signal and the predicted image signal thereby generating a difference image signal; and encoding the difference image signal and generating an encoded difference image signal, the image signal decoding method comprising the steps of: decoding the encoded image signal using the prediction method thereby generating a decoded lower-layer image signal; generating a predicted image signal in accordance with the same prediction method as that used to generate the lower-layer image signal corresponding to the higher-layer image signal, the predicted image signal being generated from the data generated in accordance with the prediction method; decoding the encoded difference image signal thereby generating a difference image signal; and calculating the sum of the predicted image signal and the decoded difference image signal so as to generate a higher-layer image signal.

According to still another aspect of the present invention, there is provided an image signal decoding method of decoding an encoded image signal, the encoded image signal comprising an encoded lower-layer image signal and an encoded higher-layer image signal obtained by encoding a higher-layer image signal only for such a part other than the part corresponding to a part of the lower-layer image signal in which no encoded lower-layer image signal is generated when encoding the lower-layer image signal, the method comprising the steps of: decoding the encoded lower-layer image signal thereby generating a decoded lower-layer image signal; and decoding the encoded higher-layer image signal thereby generating a higher-layer image signal consisting of an image part corresponding to the part of the lower-layer image signal in which no encoded lower-layer image signal is generated.

According to still another aspect of the present invention, there is provided an image signal decoding method of decoding an encoded image signal, the encoded image signal comprising an encoded lower-layer image signal and an encoded higher-layer image signal obtained by performing an encoding process in the same encoding mode as that employed to encoding the lower-layer image signal, the method comprising the steps of: decoding the encoded lower-layer image signal thereby generating a decoded lower-layer image signal; and decoding the encoded higher-layer image signal in the same decoding mode as that employed to decode the encoded lower-layer image signal.

According to still another aspect of the present invention, there is provided an image signal decoding method of decoding an encoded image signal, the encoded image signal comprising a quantized lower-layer image signal and a quantized higher-layer image signal, the encoded image signal including no quantization scale associated with the higher-layer image signal if the encoded image signal includes no quantization scale associated with the lower-layer image signal, the encoded image signal including a quantization scale associated with the higher-layer image signal if the encoded image signal includes a quantization scale associated with the lower layer image signal, the method comprising the steps of: performing an inverse quantization process on the encoded lower-layer image signal thereby generating a decoded lower-layer image signal; and performing an inverse quantization process on the encoded higher-layer image signal thereby generating a decoded higher-layer image signal.

According to still another aspect of the present invention, there is provided an image signal decoding method of receiving an encoded bit stream and decoding the encoded bit stream, the encoded bit stream being a single bit stream obtained by separately encoding a plurality of image signals in decomposed forms and then multiplexing the plurality of resultant encoded image signals, the method comprising the steps of: separating the plurality of encoded image signals from the encoded bit stream; and decoding each of the plurality of image signals thereby generating a plurality of decoded image signals.

According to still another aspect of the present invention, there is provided an image signal decoding method of receiving an encoded bit stream and decoding the encoded bit stream, the encoded bit stream being a single bit stream obtained by multiplexing: a plurality of encoded image signals obtained by separately encoding a plurality of image signals in decomposed forms; and two flags, one flag indicating a delay time of a frame to be displayed first in each image from the displaying time of another image indicated by the other flag, the method comprising the steps of: separating the plurality of encoded image signals from the encoded bit stream using the flag; and decoding each of the plurality of image signals thereby generating a plurality of decoded image signals.

According to still another aspect of the present invention, there is provided an image signal decoding method of receiving an encoded bit stream and decoding the encoded bit stream, the encoded bit stream being a single bit stream obtained by multiplexing a plurality of encoded image signals obtained by separately encoding a plurality of image signals in decomposed forms, a flag indicating a frame to be displayed last, and a flag indicating the last displaying time of the frame to be displayed last, the flags being used to prohibit a particular image from being displayed after the last displaying time, the method comprising the steps of: separating the plurality of encoded image signals from the encoded bit stream using the flag; and decoding each of the plurality of image signals thereby generating a plurality of decoded image signals.

According to still another aspect of the present invention, there is provided an image signal encoding apparatus for encoding first and second image signals in decomposed forms and a key signal used to combine the first and second image signals, the apparatus comprising: means for performing a scalable encoding process on the first image signal and the second image signal; and means for performing a scalable encoding process on the key signal wherein the scalable encoding process is similar to that employed for the image signals.

According to still another aspect of the present invention, there is provided an image signal encoding apparatus for encoding an image signal, the image signal comprising a higher-layer image signal and a lower-layer image signal, the apparatus comprising: means for encoding the lower-layer image signal using a prediction encoding method, and generating an encoded lower-layer image signal; means for encoding the higher-layer image signal and generating an encoded higher-layer image signal; wherein the means for generating the higher-layer image signal comprises: means for generating a predicted image signal in accordance with the same prediction method as that used to generate the lower-layer image signal corresponding to the higher-layer image signal, the predicted image signal being generated from the data generated in accordance with the prediction method, and then calculating the difference between the higher-layer image signal and the predicted image signal thereby generating a difference image signal; and means for encoding the difference image signal and generating an encoded difference image signal.

According to still another aspect of the present invention, there is provided an image signal encoding apparatus for encoding an image signal, the image comprising a higher-layer image signal and a lower-layer image signal, the apparatus comprising: method for encoding the lower-layer image signal and generating an encoded lower-layer image signal; and means for encoding the higher-layer image signal only for such a part other than the part corresponding to a part of the lower-layer image signal in which no encoded lower-layer image signal is generated in the step of encoding the lower-layer image signal, thereby generating an encoded higher-layer image signal.

According to still another aspect of the present invention, there is provided an image signal encoding apparatus for encoding an image signal, the image comprising a higher-layer image signal and a lower-layer image signal, the apparatus comprising: means for encoding the lower-layer image signal using a prediction encoding method thereby generating an encoded lower-layer image signal and information indicating the encoding mode employed; and means for encoding the higher-layer image signal and generating an encoded higher-layer image signal; wherein the means for generating the higher-layer image signal encodes the higher-layer image signal in the same encoding mode as that employed to encode the lower-layer image signal.

According to still another aspect of the present invention, there is provided an image signal encoding apparatus for encoding an image signal, the image comprising a higher-layer image signal and a lower-layer image signal, the apparatus comprising: means for quantizing the lower-layer image signal and generating an encoded lower-layer image signal and a quantization scale; means for quantizing the higher-layer image signal and generating an encoded higher-layer image signal and a quantization scale; and means for transmitting the encoded lower-layer image signal and the encoded higher-layer image signal, wherein when the quantization scale associated with the lower layer is not transmitted, the quantization scale associated with the higher layer is not transmitted, while when the quantization scale associated with the lower layer is transmitted, the quantization scale associated with the higher layer is transmitted.

According to still another aspect of the present invention, there is provided an image signal transmission apparatus in which a plurality of decomposed image signals are separately encoded and then the plurality of encoded image signals are multiplexed into a single bit stream and transmitted, the apparatus comprising: means for separately encoding the plurality of image signals thereby generating a plurality of encoded image signals; means for multiplexing the plurality of encoded image signals into a single bit stream and generating the single bit stream; and means for transmitting the single bit stream; wherein the multiplexing means perform the multiplexing operation such that the frames of the plurality of images which are to be displayed first before the other frames are located adjacent or near to each other in the bit stream.

According to still another aspect of the present invention, there is provided an image signal transmission apparatus in which a plurality of decomposed image signals are separately encoded and then the plurality of encoded image signals are multiplexed into a single bit stream and transmitted, the apparatus comprising: means for separately encoding the plurality of image signals and generating a plurality of encoded image signals; means for multiplexing the plurality of encoded image signals into a single bit stream and generating the single bit stream; and means for transmitting the single bit stream; wherein the multiplexing means multiplexes the plurality of the encoded image signals into the single bit stream together with two flags, one flag indicating a delay time of a frame to be displayed first in each image from the displaying time of another image indicated by the other flag.

According to still another aspect of the present invention, there is provided an image signal transmission apparatus in which a plurality of decomposed image signals are separately encoded and then the plurality of encoded image signals are multiplexed into a single bit stream and transmitted, the apparatus comprising: means for separately encoding the plurality of image signals and generating a plurality of encoded image signals; means for multiplexing the plurality of encoded image signals into a single bit stream and generating the single bit stream; and means for transmitting the single bit stream; wherein, to prohibit a particular image from being displayed after a particular time, the multiplexing means also multiplexes a flag indicating a particular frame to be displayed last and a flag indicating the particular time at which the last frame to be displayed.

According to still another aspect of the present invention, there is provided an image decoding apparatus for decoding an encoded signal, the encoded signal comprising a signal obtained by encoding first and second image signals in decomposed forms and a key signal used to combine the first and second image signals, the apparatus comprising: means for performing a scalable decoding process on the first encoded image signal and the second encoded image signal thereby generating a decoded first image signal and a second decoded image signal; and means for performing a scalable decoding process on the encoded key signal using a similar process to that employed for the image signals, thereby generating a decoded key signal.

According to still an other aspect of the present invention, there is provided an image signal decoding apparatus for decoding an encoded image signal, the encoded image signal comprising an encoded lower-layer image signal and an encoded higher-layer image signal, the encoded image signal having been encoded according to the procedure including the steps of: encoding the lower-layer image signal using a prediction encoding method, and generating an encoded lower-layer image signal; encoding the higher-layer image signal and generating an encoded higher-layer image signal; wherein the step of generating the higher-layer image signal comprises the steps of: generating a predicted image signal in accordance with the prediction method used when generating the lower-layer image signal corresponding to the higher-layer image signal, the predicted image signal being generated from the data generated in accordance with the prediction method, and then calculating the difference between the higher-layer image signal and the predicted image signal thereby generating a difference image signal; and encoding the difference image signal and generating an encoded difference image signal, the image signal decoding apparatus comprising: means for decoding the encoded image signal using the prediction method thereby generating a decoded lower-layer image signal; means for generating a predicted image signal in accordance with the prediction method used when generating the lower-layer image signal corresponding to the higher-layer image signal, the predicted image signal being generated from the data generated in accordance with the prediction method; means for decoding the encoded difference image signal thereby generating a difference image signal; and means for calculating the sum of the predicted image signal and the decoded difference image signal thereby generating a higher-layer image signal.

According to still another aspect of the present invention, there is provided an image signal decoding apparatus for decoding an encoded image signal, the encoded image signal comprising an encoded lower-layer image signal and an encoded higher-layer image signal obtained by encoding a higher-layer image signal only for such a part other than the part corresponding to a part of the lower-layer image signal in which no encoded lower-layer image signal is generated when encoding the lower-layer image signal, the apparatus comprising: means for decoding the encoded lower-layer image signal thereby generating a decoded lower-layer image signal; and means for decoding the encoded higher-layer image signal thereby generating a higher-layer image signal consisting of an image part corresponding to the part of the lower-layer image signal in which no encoded lower-layer image signal is generated.

According to still another aspect of the present invention, there is provided an image signal decoding apparatus for decoding an encoded image signal, the encoded image signal comprising an encoded lower-layer image signal and an encoded higher-layer image signal obtained by performing an encoding process in the same encoding mode as that employed to encoding the lower-layer image signal, the apparatus comprising: means for decoding the encoded lower-layer image signal thereby generating a decoded lower-layer image signal; and means for decoding the encoded higher-layer image signal in the same decoding mode as that employed to decode the encoded lower-layer image signal.

According to still another aspect of the present invention, there is provided an image signal decoding apparatus for decoding an encoded image signal, the encoded image signal comprising a quantized lower-layer image signal and a quantized higher-layer image signal, the encoded image signal including no quantization scale associated with the higher-layer image signal if the encoded image signal includes no quantization scale associated with the lower-layer image signal, the encoded image signal including a quantization scale associated with the higher-layer image signal if the encoded image signal includes a quantization scale associated with the lower layer image signal, the apparatus comprising: means for performing an inverse quantization process on the encoded lower-layer image signal thereby generating a decoded lower-layer image signal; and means for performing an inverse quantization process on the encoded higher-layer image signal thereby generating a decoded higher-layer image signal.

According to still another aspect of the present invention, there is provided an image signal decoding apparatus for receiving an encoded bit stream and decoding the encoded bit stream, the encoded bit stream being a single bit stream obtained by separately encoding a plurality of image signals in decomposed forms and then multiplexing the plurality of resultant encoded image signals, the apparatus comprising: means for separating the plurality of encoded image signals from the encoded bit stream; and means for decoding each of the plurality of image signals thereby generating a plurality of decoded image signals.

According to still another aspect of the present invention, there is provided An image signal decoding apparatus for receiving an encoded bit stream and decoding the encoded bit stream, the encoded bit stream being a single bit stream obtained by multiplexing: a plurality of encoded image signals obtained by separately encoding a plurality of image signals in decomposed forms; and two flags, one flag indicating a delay time of a frame to be displayed first in each image from the displaying time of another image indicated by the other flag, the apparatus comprising: means for separating the plurality of encoded image signals from the encoded bit stream using the flag; and means for decoding each of the plurality of image signals thereby generating a plurality of decoded image signals.

According to still another aspect of the present invention, there is provided an image signal decoding apparatus for receiving an encoded bit stream and decoding the encoded bit stream, the encoded bit stream being a single bit stream obtained by multiplexing a plurality of encoded image signals obtained by separately encoding a plurality of image signals in decomposed forms, a flag indicating a frame to be displayed last, and a flag indicating the last displaying time of the frame to be displayed last, the flags being used to prohibit a particular image from being displayed after the last displaying time, the apparatus comprising: means for separating the plurality of encoded image signals from the encoded bit stream using the flag; and means for decoding each of the plurality of image signals thereby generating a plurality of decoded image signals.

According to still another aspect of the present invention, there is provided a recording medium for recording information which can be decoded by an image signal decoding apparatus, the recording medium including a recorded signal which can be decoded by the image signal decoding apparatus, the recorded signal including an encoded signal, the encoded signal being generated according a procedure comprising the steps of: encoding the first image signal and the second image signal in a scalable manner; and encoding the key signal in a scalable manner similar to that employed in the image signals.

BRIEF DESCRIPTION OF THE DRAWINGS

FIGS. 8A and 8B are block diagrams of an encoding apparatus and a decoding apparatus according to the present invention;

FIGS. 11A and 11B are block diagrams illustrating a scalable key-signal encoder and a scalable key-signal decoder, according to the present invention;

FIG. 25 illustrates the syntax associated with a session layer according to the present invention;

FIG. 26 illustrates the syntax associated with a VOP layer according to the present invention;

FIG. 27 illustrates the syntax associated with a macroblock layer according to the present invention;

FIG. 28 illustrates the syntax associated with an enhancement layer according to the present invention;

FIG. 29 illustrates the syntax associated with macroblock types according to the present invention;

FIG. 30 illustrates the relationship between spatial_temporal_weight_code and spatial_temporal_weight_class according to the present invention;

FIG. 31 illustrates enhancement layer prediction encoding modes for various macroblock types according to the present invention;

FIG. 32 illustrates header information associated with the syntax of a VOP layer, according to the present invention;

FIGS. 33A and 33B are a schematic representation of a method of transmitting four VOPs in a bit stream at a fixed frame rate according to the present invention;

FIGS. 35A, 35B, and 35C are a schematic representation of a method of transmitting two different VOPs in the form of a bit stream at a variable frame rate according to the present invention;

FIG. 36 illustrates the syntax associated with a VOP layer transmitted at a variable frame rate according to the present invention;

FIG. 39 illustrates the syntax associated with an erasing frame of a VOP layer according to the present invention.

DESCRIPTION OF THE PREFERRED ENBODIMENTS

Figure 6:
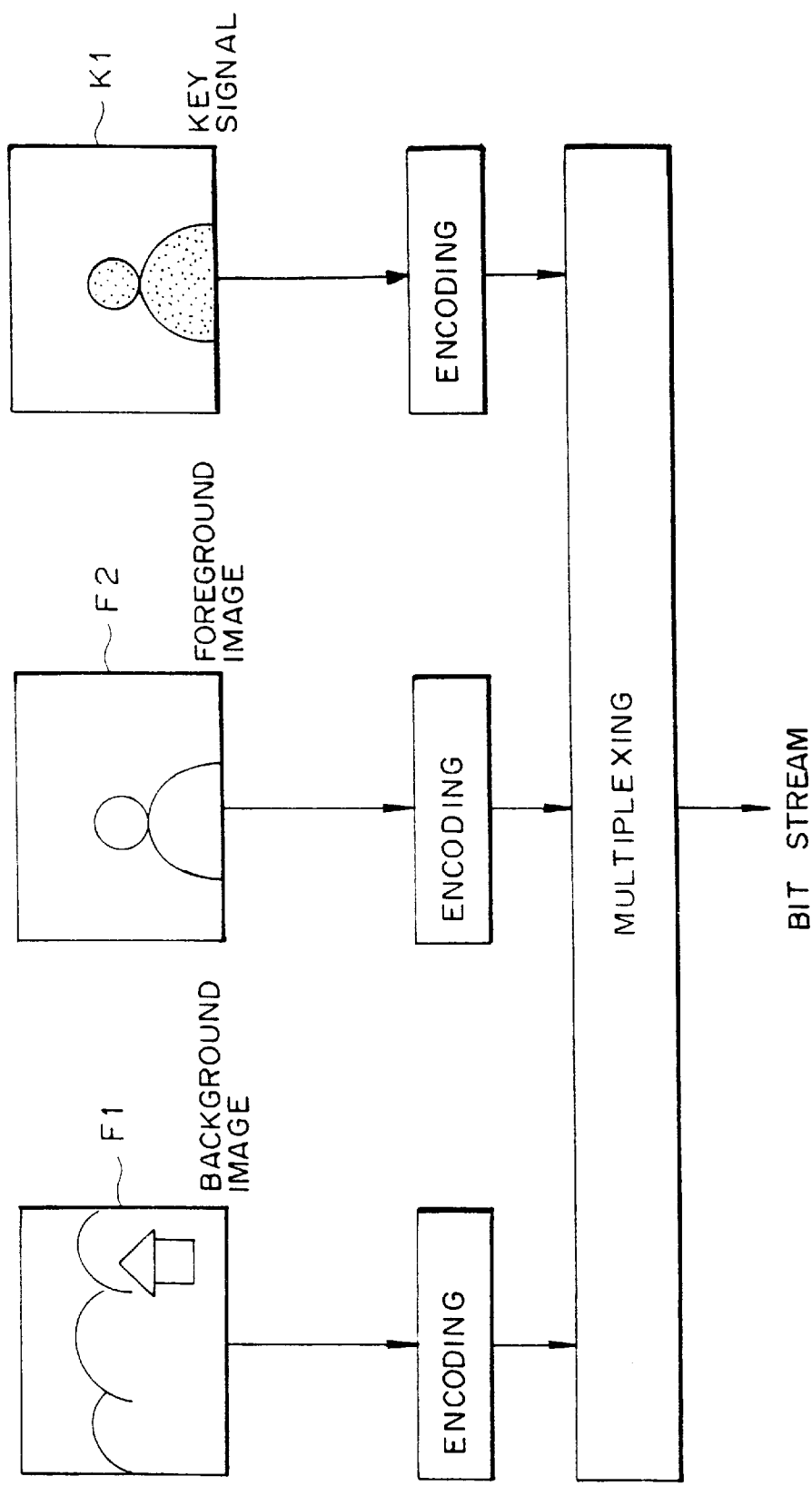
FIG. 6 is a schematic representation of a method of encoding a plurality of images and multiplexing the encoded signals into a single signal, according to the present invention.

Before describing preferred embodiments according to the present invention, the principle of encoding/multiplexing an image and the principle of generating a composite image according to the present invention will be described first. FIG. 6 illustrates the principle of a technique of encoding and multiplexing an image according to the present invention. In the figure, a background image F1 and a foreground image F2 are processed. The foreground image F2 is obtained by taking a picture of an object in front of a background having a particular color, and then extracting the areas having colors different from the background color. The extracted areas are represented by a key signal K1. The background image F1, the foreground image F2, and the key signal K1 are encoded separately. The encoded background image F1, the encoded foreground image F2, and the encoded key signal K1 are multiplexed into a single bit stream.

Figure 7:
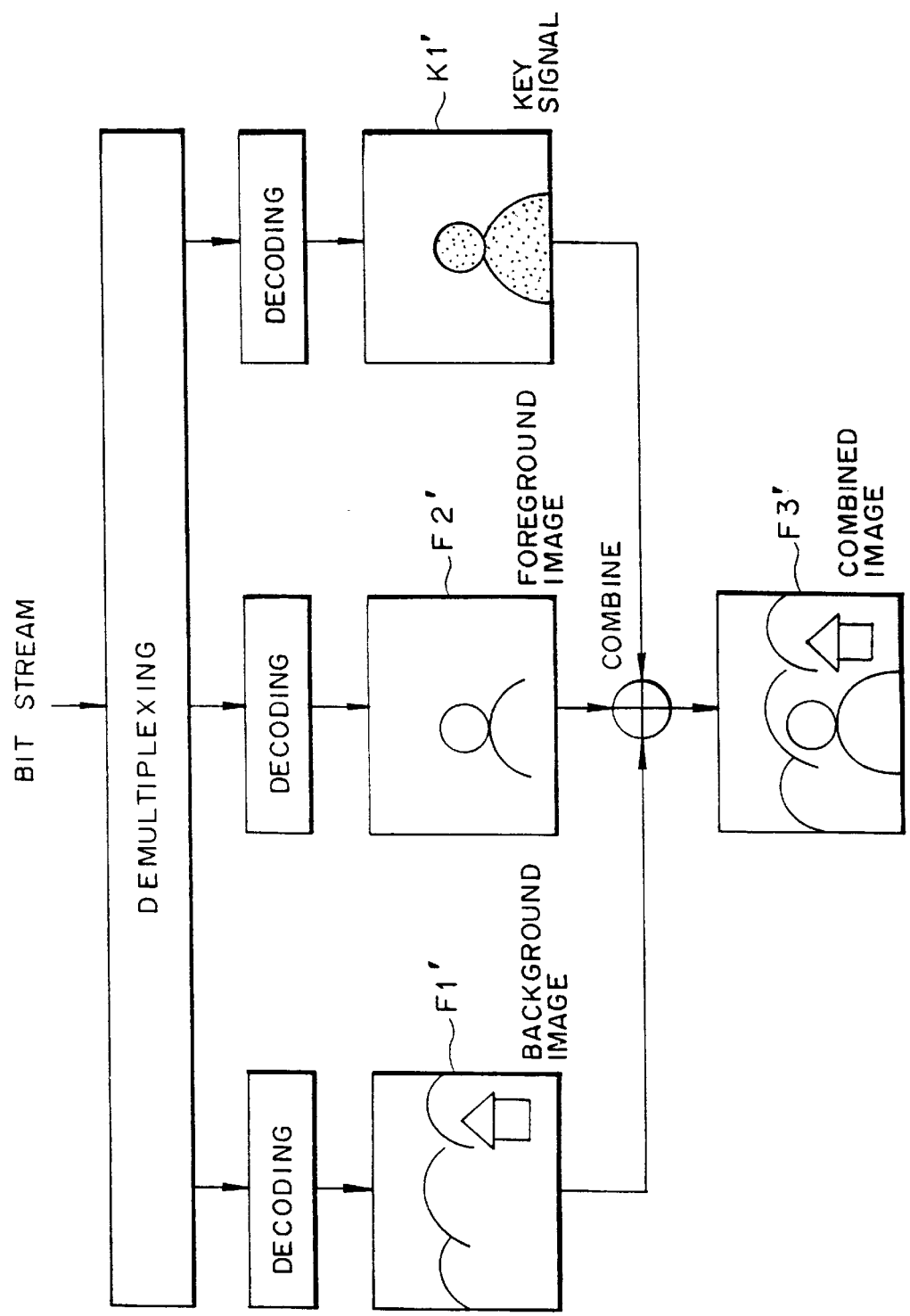
FIG. 7 is a schematic representation of a method of decoding an encoded signal in the form of a bit stream and obtaining a composite image, according to the present invention.

FIG. 7 illustrates the principle of a technique of decoding the bit stream shown in FIG. 6 into a composite image F3. The bit stream is subjected to a demultiplexing process and is decomposed into separate bit streams of an encoded background image F1, an encoded foreground image F2, and an encoded key signal K1, respectively. These bit streams are decoded separately. Thus, a decoded background image F1', a decoded foreground image F2', and a decoded key signal K1' are obtained. If the decoded background image F1' is combined with the decoded foreground image F2' using the decoded key signal K1', then it is possible to obtain a decoded composite image F3'. In this technique, it is possible to easily carry out re-edit or recomposition. For example it is possible to change the background image F1 while maintaining the foreground image F2.

Now referring to FIGS. 8A and 8B, an encoder for encoding/multiplexing a plurality of images and a decoder for decoding an encoded signal into a plurality of images corresponding to the original images will be described below. The encoder and the decoder which will be described below may be used not only to simply encode/decode a plurality of images, but also to encode a plurality of images in a scaled fashion. First, the technique of simply decoding/encoding a plurality of images will be described, and then the technique of encoding a plurality of images in a scaled fashion.

1. EMBODIMENT OF ENCODING TECHNIQUE

In this following description, a plurality of separate images such as a background image F1 and a foreground image F2 to be combined into a single composite image are referred to as VOPs (video object planes). Each VOP consists of an image signal having luminance and color difference components and a key signal. However, when the image signal of a VOP is a background image signal, no key signal is included in the VOP. That is, when the image signal of a VOP is a foreground image signal, the VOP includes a key signal as well as the image signal, while a background VOP includes only the image signal. A VOP generator 31 separates a given input signal into a plurality of VOPs. For example, when the input signal is an image signal generated using a chromakey as shown in FIG. 6, the VOP generator 31 decomposes the input signal into a background image signal, a foreground image signal, and an associated key signal. The background image signal is supplied to a 0th VOP encoder 32, and the foreground image signal and the associated key signal are supplied to a 1st VOP encoder 33. When the input image signal includes no key signal or the key signal has been lost, the VOP generator 31 extracts a particular area from the input image signal and generates a key signal. In this way, each VOP is generated. In the case where the input signal further includes an nth foreground image signal or background image signal, the nth foreground or background image signal is supplied to a corresponding nth VOP encoder 35 (the nth encoder has a similar structure and operates in a similar manner, and thus the nth encoder and its operation will not be described here in further detail).

The 0th VOP encoder 32 encodes the background image signal, and supplies the resultant bit stream of background image signal to a multiplexer 36. The 1st VOP encoder 33 encodes the foreground image signal and the associated key signal, and supplies the resultant bit streams of foreground image signals and key signals to the multiplexer 36. The multiplexer 36 multiplexes the received bit streams of background image signal, foreground image signal, and key signal into a single encoded bit stream. The generated bit stream is transmitted over a transmission line 37 in a broadcasting system or other network system, or otherwise recorded on a recording medium 38 such as a tape, a disk, or a semiconductor memory.

The encoded bit stream supplied via the transmission line 37, or the encoded bit stream reproduced from the recording medium is supplied to a demultiplexer 39. The demultiplexer 39 separates the received bit stream into a bit stream of background image signal, a bit stream of foreground image signal, and a bit stream of key signal. The bit stream of background image signal is supplied to a 0th VOP decoder 40. The 0th VOP decoder 40 decodes the bit stream of background image signal into a background image signal corresponding to the background image signal input to the 0th VOP encoder of the encoding apparatus. The generated background image signal is supplied to a combiner 44. The bit stream of foreground image signal and the bit stream of key signal are supplied to a 1st VOP decoder 41. The 1st VOP decoder 41 decodes the bit streams of foreground image signal and key signal into a foreground image signal and a key signal corresponding to the input signal provided to the 1st VOP encoder of the encoding apparatus. The generated foreground image signal and key signal are supplied to the combiner 44. The combiner combines the background image signal and the foreground image signal using the key signal thereby generating a reproduced image.

Figure 1:
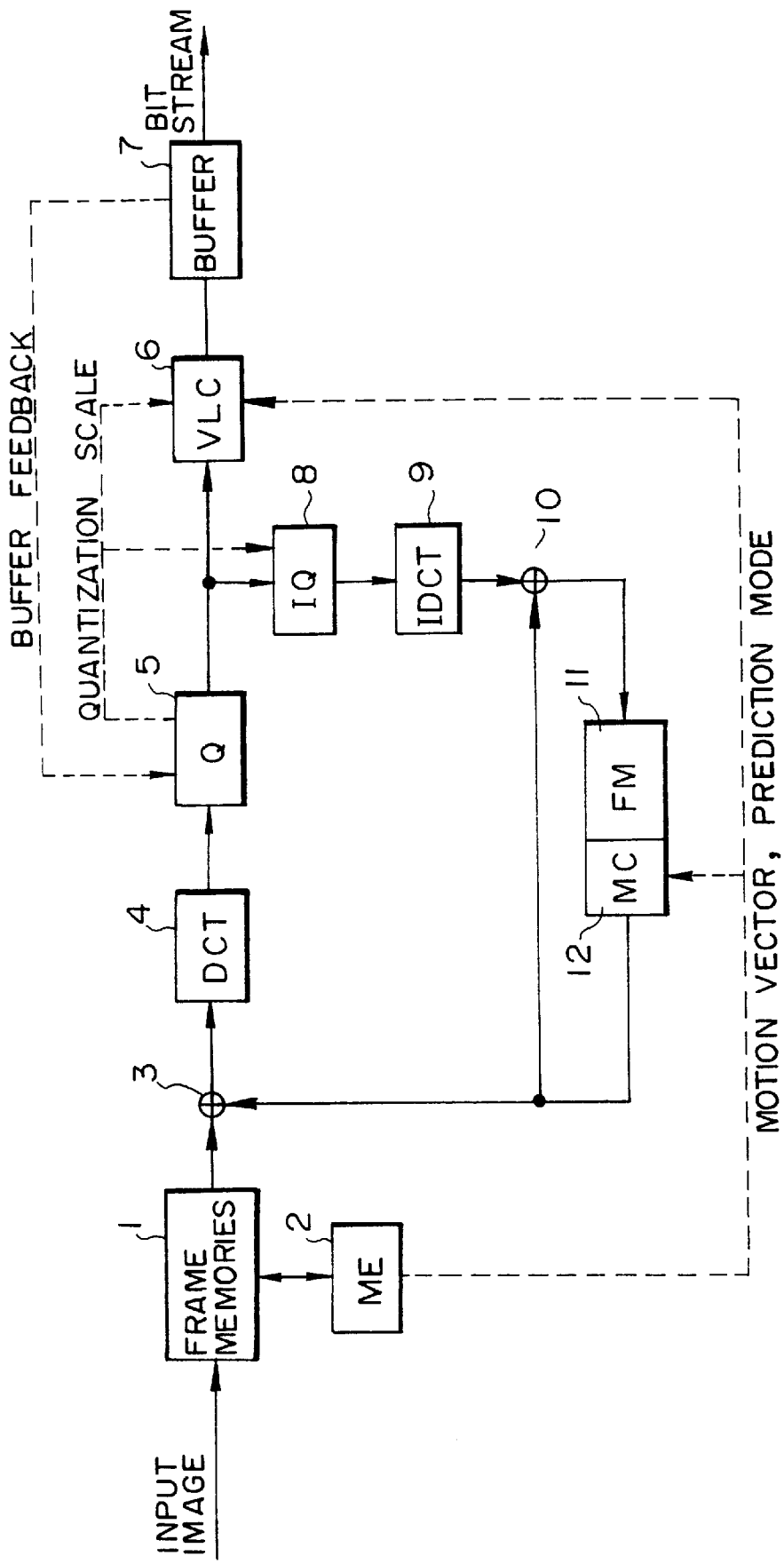
FIG. 1 is a block diagram illustrating an example of the construction of an encoder according to the main profile at the main level of the MPEG standard.
Figure 2:
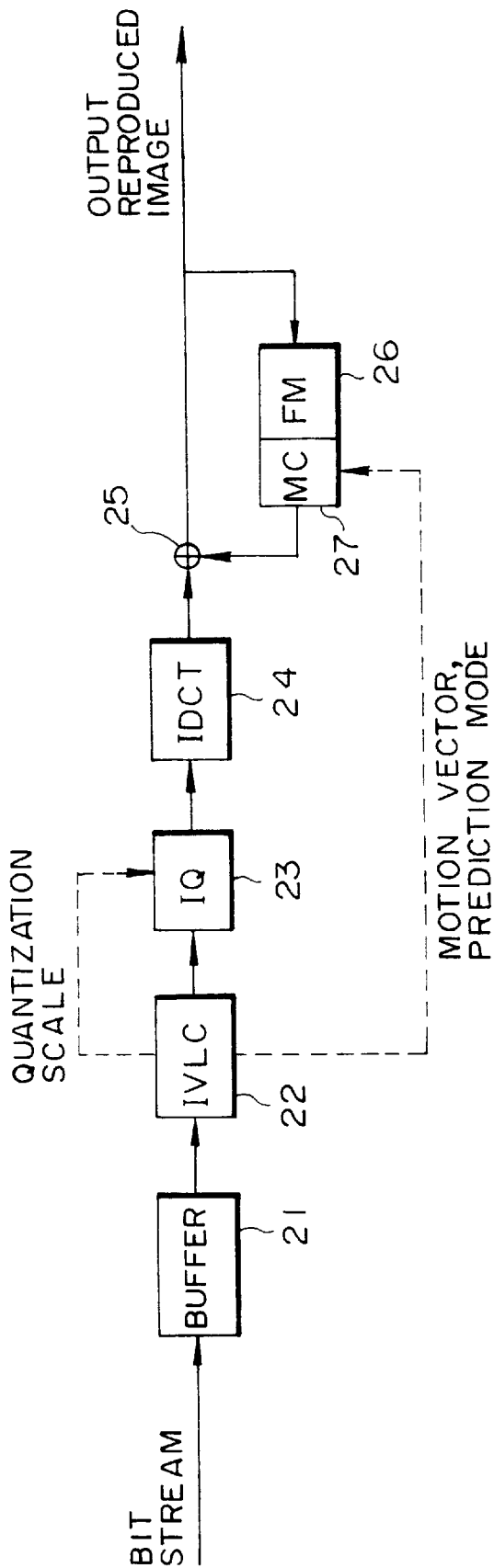
FIG. 2 is a block diagram illustrating an example of the construction of a decoder according to the main profile at the main level of the MPEG standard.
Figure 9A:
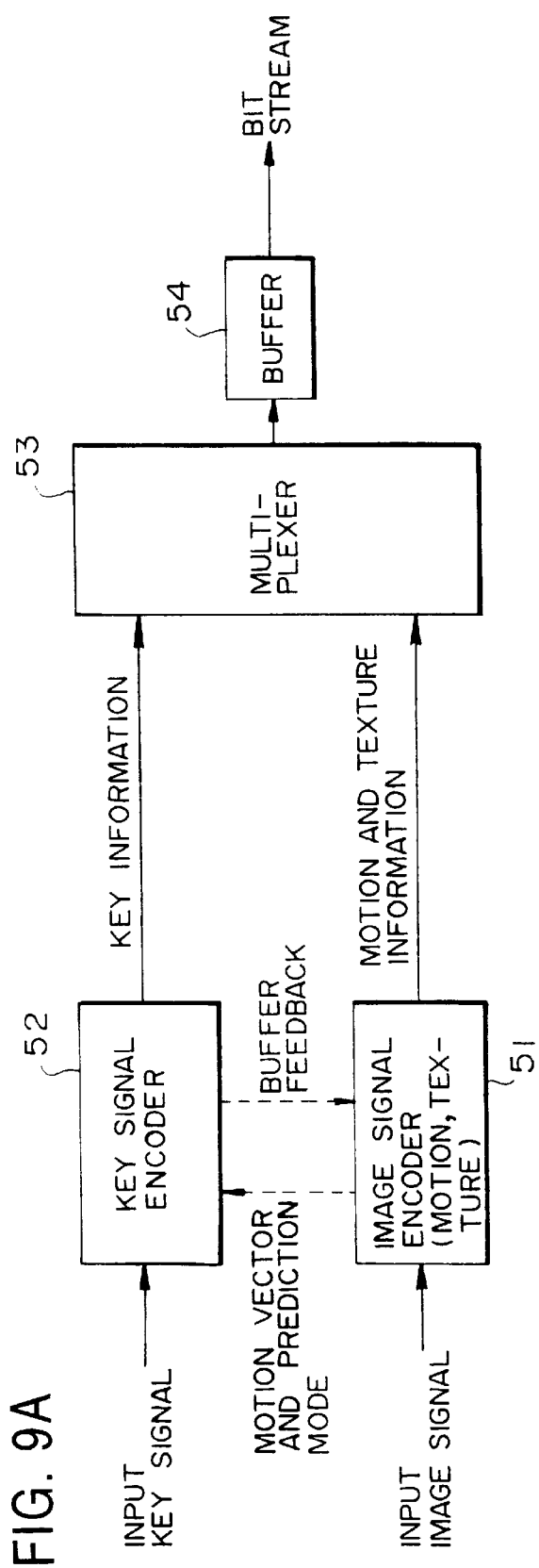
FIGS. 9A and 9B are block diagrams illustrating a VOP encoder and a VOP decoder, according to the present invention.
Figure 9B:
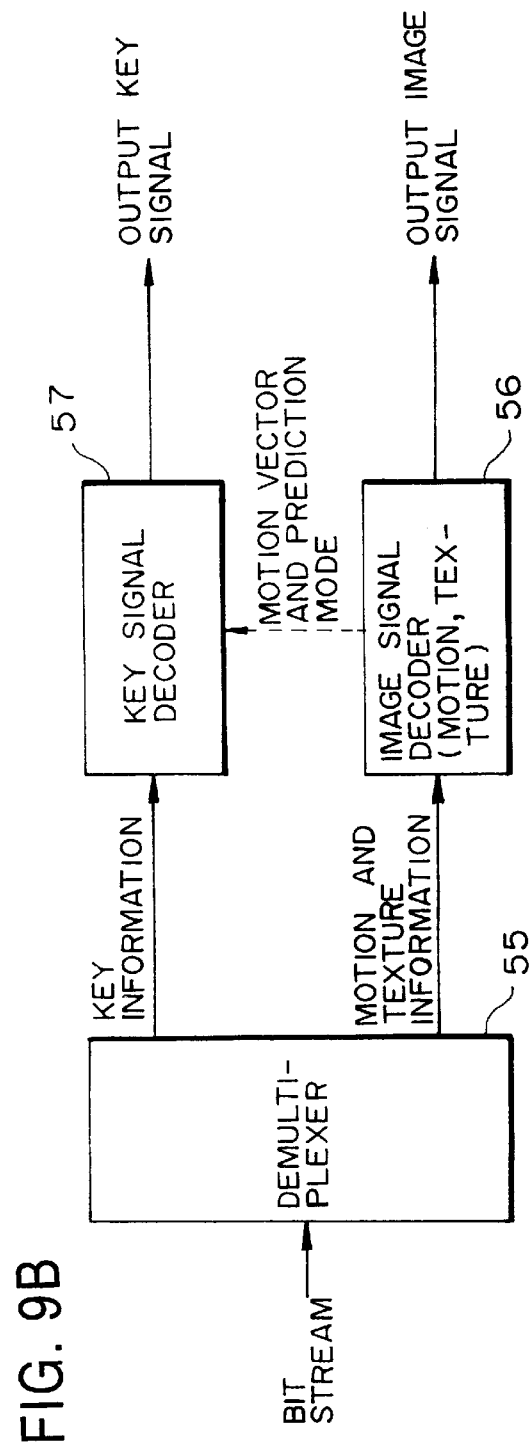

Now referring to FIGS. 9A and 9B, an example of a technique of encoding and decoding a signal with a VOP decoder or a VOP encoder will be described below. In the following description, it is assumed that encoding and decoding are performed for a foreground image signal. The encoding and decoding for a background image signal may be performed according to the conventional technique described above (refer to FIGS. 1 and 2) and thus they are not described here in further detail.

The foreground image signal is supplied to an image signal encoder 51 while the key signal is supplied to a key signal encoder 52. The image signal encoder 51 encodes the input foreground image signal according to the MPEG or H.263 standard. The key signal encoder 52 encodes the key signal for example according to the DPCM (differential pulse code modulation) scheme. Alternatively, the key signal encoder 52 may perform motion compensation processing on the key signal using the motion vector extracted by the image signal encoder 51 and may encode a difference signal associated with the key signal. The key signal encoder 52 also supplies information representing the number of generated bits to the image signal encoder 51. The image signal encoder 51 control the encoding process using the information representing the number of generated bits so that the encoded image signal is generated at a specified particular bit rate.

The image signal encoder 51 supplies the bit stream of encoded image signal (motion vector and texture information) to a multiplexer 53. The key signal encoder 52 supplies the bit stream of encoded key signal (key information) to the multiplexer 53. The multiplexer 53 multiplexes the bit stream of encoded image signal and the bit stream of encoded key signal into a single encoded bit stream. The resulting encoded bit stream is output via a transmission buffer 54. The above encoded bit streams correspond to the foreground image bit stream and the key bit stream output by the 1st VOP encoder 33 described above.

In the decoder, the input decoded bit stream is supplied to a demultiplexer 55. The demultiplexer 44 separates the input bit stream into a bit stream of encoded image signal (motion vector and texture information) and a bit stream of encoded key signal (key information). The bit stream of encoded image signal is supplied to an image signal decoder 56. The bit stream of encoded key signal is supplied to a key signal decoder 57. The image signal decoder 56 (refer to FIG. 2) decodes the encoded image signal thereby generating an image signal corresponding to the input signal supplied to the image signal encoder 51 of the encoding apparatus. The resultant signal is output as a reproduced image signal. The key signal decoder 57 decodes the encoded key signal thereby generating a key signal corresponding to the input signal supplied to the key signal encoder 52 of the encoding apparatus. In the case where the key signal has been subjected, in the key signal encoder 52, to motion compensation processing using the motion vector, the key signal decoder 56 performs, in the key signal decoding operation, motion compensation processing on the key signal using the motion vector supplied from the image signal decoder 56.

2. EMBODIMENT OF SCALABLE ENCODING TECHNIQUE

Referring again to FIGS. 8A and 8B, an encoder and a decoder used to encode and decode an image signal in a scaled fashion will be described below.

In this case, the VOP generator 31 generates, from the input image signal, a higher-layer image signal of a background image, a higher-layer image signal of a foreground image and an associated higher-layer key signal, a lower-layer image signal of the background image, and a lower-layer image signal of the foreground image and an associated lower-layer key signal. In the case where the lower-layer image signal is generated from the higher-layer image signal, the lower-layer image signal may be generated by performing a down-sampling operation on the higher-layer image signal. The VOP generator 31 supplies the higher-layer image signal of the background image and the lower-layer image signal of the background image to the 0th VOP encoder 32. Similarly, the VOP generator 31 also supplies the higher-layer image signal of the foreground image as well as the associated higher-layer key signal and the lower-layer image signal of the foreground image as well as the associated lower-layer key signal to the 1st VOP encoder 33. In the case where the input signal further includes an nth foreground image signal or background image signal, the nth foreground or background image signal is supplied to a corresponding nth VOP encoder 35 (the nth encoder has a similar structure and operates in a similar manner, and thus the nth encoder and its operation will not be described here in further detail).

Figure 3:
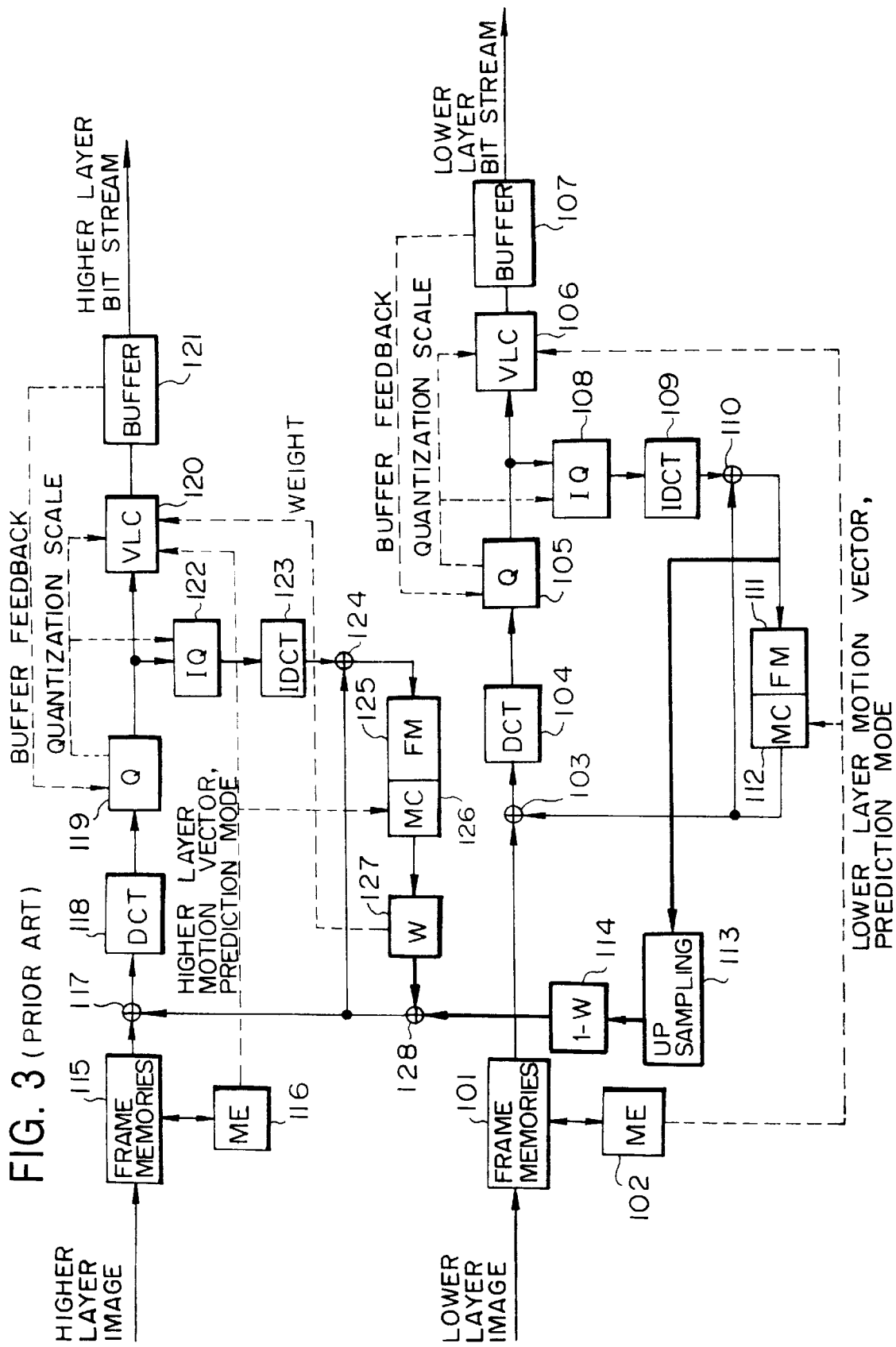
FIG. 3 is a block diagram illustrating an example of the construction of an encoder having the capability of spatial scaling.

The 0th VOP encoder 32 encodes the higher-layer image signal of the background image and the lower-layer image signal of the background image using the scalable encoding technique described above (refer to FIG. 3). The obtained higher-layer bit stream of background image and lower-layer bit stream of background image are supplied to the multiplexer 36. The 1st VOP encoder 33 encodes the higher-layer image signal of the foreground image and the lower-layer image signal of the foreground image using the scalable encoding technique described above (refer to FIG. 3). The 1st VOP encoder 33 also encodes the higher-layer key signal and the lower-layer key signal using an encoding technique which will be described later. The obtained bit streams of the higher- and lower-layer image signals and key signals are all supplied to the multiplexer 36.

The multiplexer 36 multiplexes the higher-layer bit stream of background image, the lower-layer bit stream of background image, the higher-layer bit stream of foreground image, the lower-layer bit stream of foreground image, the higher-layer bit stream of key signal, and the lower-layer bit stream of key signal into a single encoded bit stream. The generated bit stream is transmitted over a transmission line 37 in a broadcasting system or other network system, or otherwise recorded on a recording medium 38 such as a tape, a disk, or a semiconductor memory.

Figure 4:
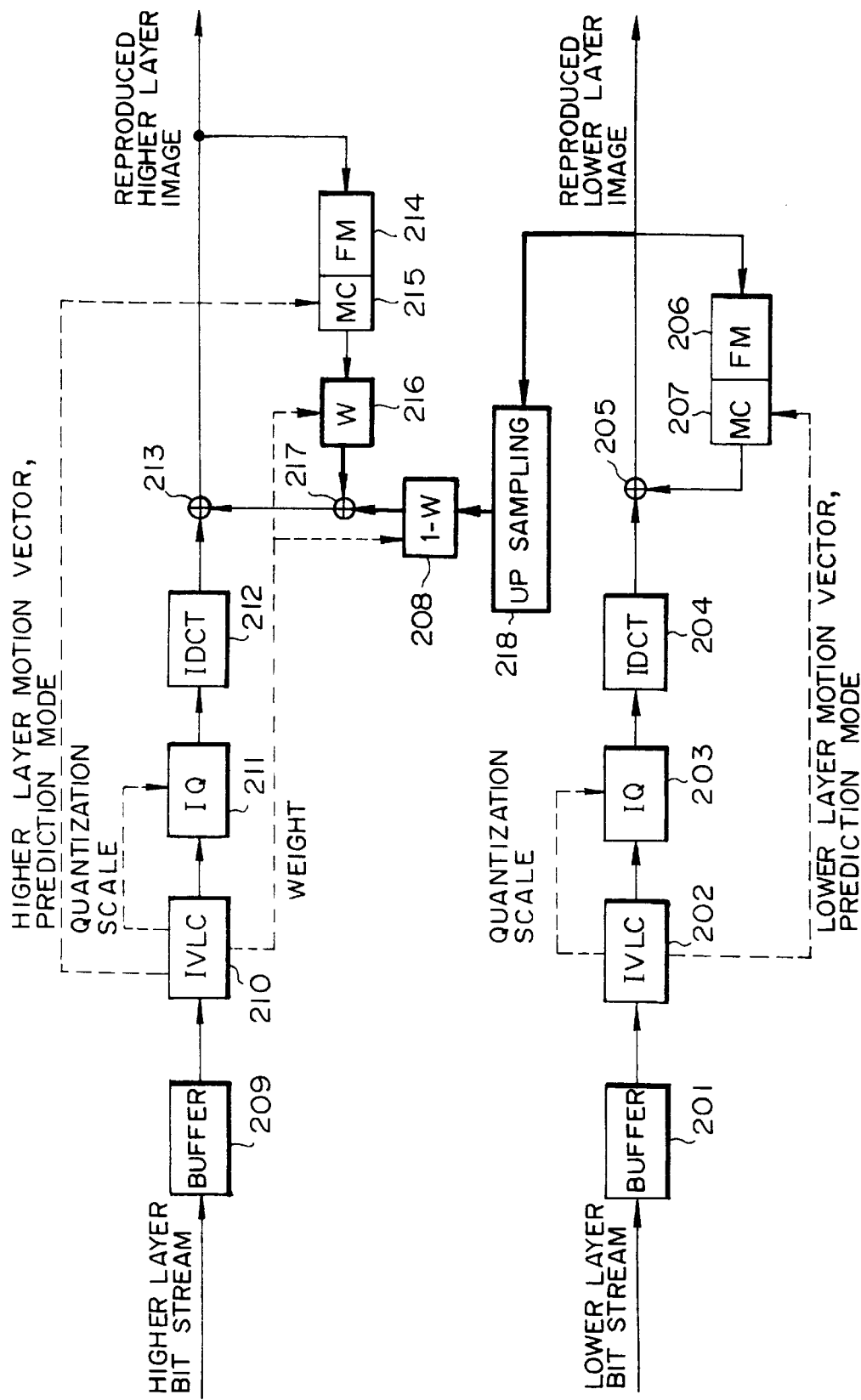
FIG. 4 is a block diagram illustrating an example of the construction of a decoder having the capability of spatial scaling.
Figure 5:
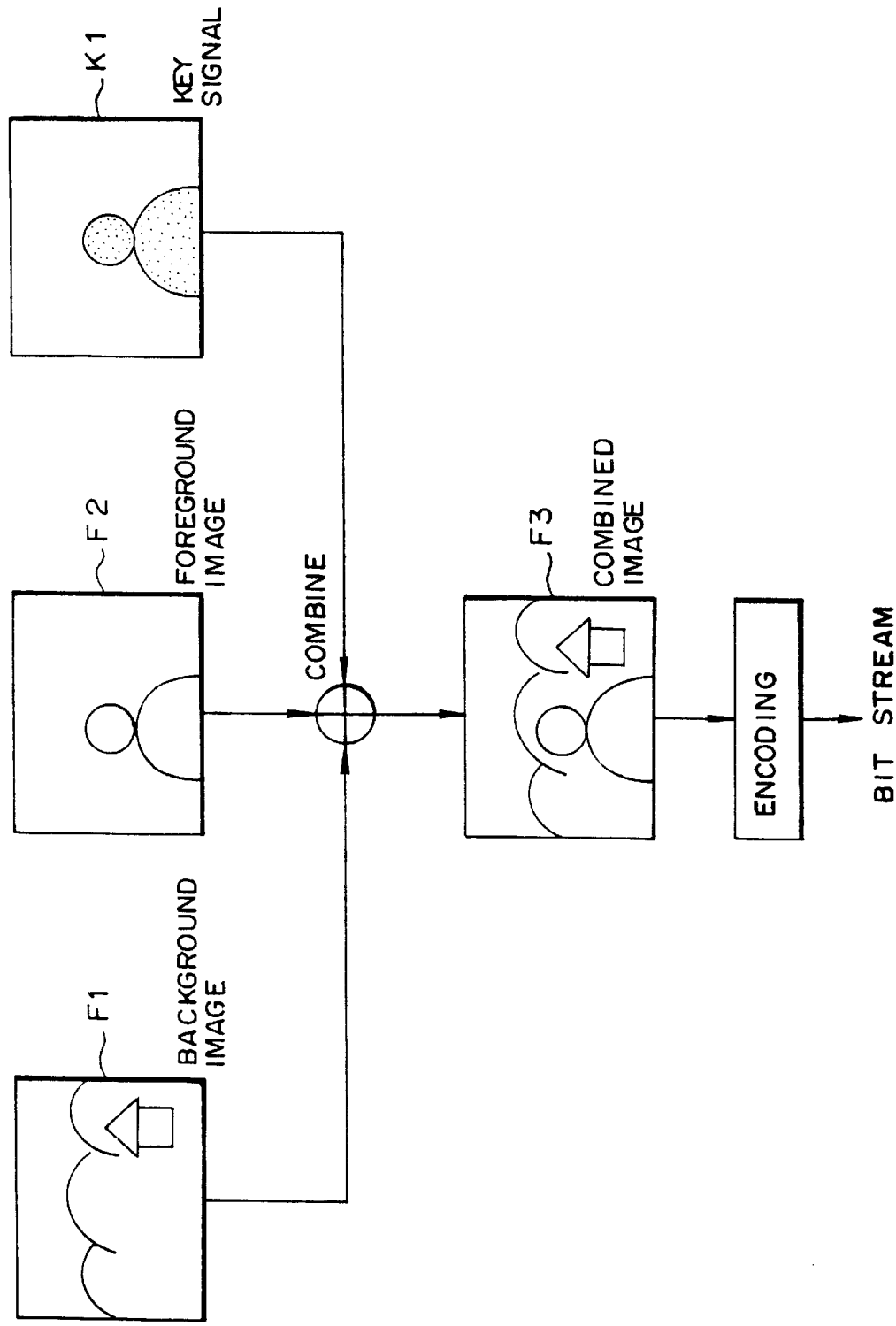
FIG. 5 is a schematic representation of a method of generating a composite image and encoding it.

The encoded bit stream supplied via the transmission line 37, or the encoded bit stream reproduced from the recording medium is supplied to the demultiplexer 39. The demultiplexer 39 separates the encoded bit stream into a higher-layer bit stream of background image, a lower-layer bit stream of background image, a higher-layer bit stream of foreground image and a higher-layer bit stream of associated key signal, and a lower-layer bit stream of foreground image and a lower-layer bit stream of associated key signal. The higher-layer bit stream of background image and the lower-layer bit stream of background image are supplied to the 0th VOP decoder 40. The 0th VOP decoder 40 decodes the higher-layer bit stream of background image and the lower-layer bit stream of background image using the scalable decoding technique described above (refer to FIG. 4) thereby generating a higher-layer background image signal and a lower-layer background image signal corresponding to the input signal supplied to the 0th VOP encoder of the encoding apparatus. The resultant signals are supplied to the combiner 44. The higher-layer bit stream of foreground image and the bit stream of higher-layer key signal are supplied to the 1st VOP decoder 41. The 1st VOP decoder 41 decodes the higher-layer bit stream of foreground image and the lower-layer bit stream of foreground image using the scalable decoding technique described above (refer to FIG. 4), and also decodes the higher-layer bit stream of key signal and the lower-layer bit stream of key signal using the decoding technique which will be described later thereby generating the higher-layer image signal of the foreground image and the associated higher-layer key signal and also the lower-layer image signal of the foreground image and the associated lower-layer key signal corresponding to the input signal supplied to the 1st VOP encoder 33 of the encoding apparatus. The generated signals are supplied to the combiner 44. The combiner 44 combines the higher-layer image signal of the background image and the higher-layer image signal of the foreground image using the higher-layer key signal thereby generating a reproduced higher-layer image signal. The combiner 44 also combines the lower-layer image signal of the background image and the lower-layer image signal of the foreground image using the lower-layer key signal thereby generating a reproduced lower-layer image signal.

Now, an image signal encoding apparatus and an image signal decoding apparatus used to encode and decode the respective VOPs will be described below. In the encoding and decoding method described below, it is assumed that a higher-layer key signal associated with a higher-layer foreground image signal and a lower-layer key signal associated with a lower-layer foreground image signal are encoded in a scalable fashion, and the scalably-encoded higher-layer key signal associated with the higher-layer foreground image signal and the scalably-encoded lower-layer key signal associated with the lower-layer foreground image signal are decoded. A higher-layer background image signal and a lower-layer background image signal may be encoded and the encoded higher-layer background image signal and the encoded lower-layer background image may be decoded using the conventional technique (refer to FIG. 4) and thus these processes will not be described here. Furthermore, a higher-layer foreground image signal and a lower-layer foreground image signal may be encoded and the encoded higher-layer foreground image signal and the encoded lower-layer foreground image may also be decoded using the conventional technique (refer to FIGS. 3 and 4) and thus these processes will not be described here. That is, the following description deals with a specific implementation of the 1st scalable VOP encoder 33 for encoding higher-layer and lower-layer image signals as well as higher-layer and lower-layer key signals, and also a specific implementation of the 1st VOP decoder 41 for decoding the encoded higher-layer and lower-layer key signals.

Figure 10A:
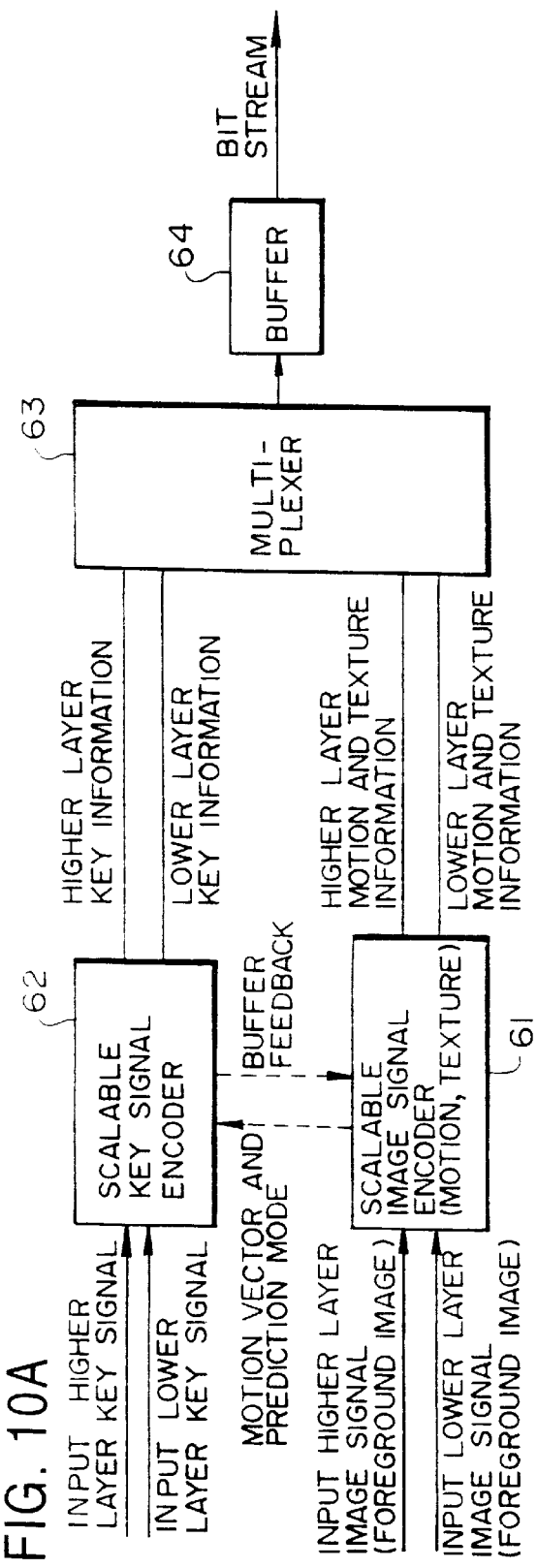
FIGS. 10A and 10B are block diagrams illustrating a scalable VOP encoder and a scalable VOP decoder, according to the present invention.
Figure 10B:
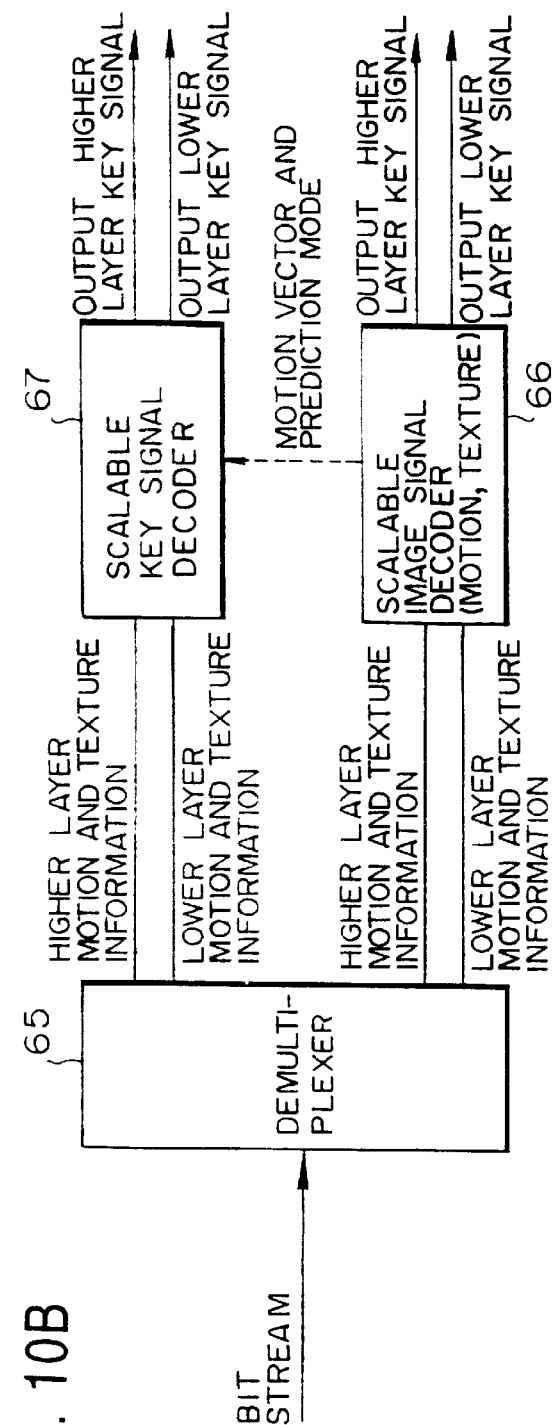

Referring first to FIGS. 10A and 10B, a specific scalable encoding device implementing the 1st VOP encoder 33 for encoding higher-layer and lower-layer image signal and higher-layer and lower-layer key signals will be described below.

Higher-layer and lower-layer image signals of a foreground image are supplied to an image signal encoder 61, and higher-layer and lower-layer key signals are supplied to a key signal encoder 62. The image signal encoder 61 encodes the higher-layer and lower-layer image signals of the foreground image using a scalable encoding technique according to a proper standard such as the MPEG or H.263 standard. The key signal encoder 62 encodes the higher-layer and lower-layer key signals according to the motion vector and the information of the prediction mode supplied from the image signal encoder 61 using the scalable encoding method which will be described later. That is, the key signal encoder 62 performs a motion compensation process on the higher-layer key signal and the lower-layer key signal using the motion vector extracted by the image signal encoder 61, and encodes the resultant difference signals associated with the higher-layer key signal and the lower-layer key signal. The key signal encoder 62 may supply the information representing the number of generated bits to the image signal encoder 61 and the image signal encoder 61 may control its encoding process using the information about the number of generated bits so that the encoded image signal is generated at a specified bit rate.

The image signal encoder 61 supplies the bit streams of encoded higher-layer and lower-layer image signals (motion vector and texture information) to a multiplexer 63. The key signal encoder 62 supplies the bit streams of encoded higher-layer and lower-layer key signals (key information) to the multiplexer 63. The multiplexer 63 multiplexes the bit streams of encoded higher-layer and lower-layer image signals and the bit streams of encoded higher-layer and lower-layer key signal into a single encoded bit stream. The resultant bit stream is output vie a transmission buffer 64. In the above processing, the respective encoded bit streams correspond to the higher-layer bit stream of foreground image, the lower-layer bit stream of foreground image, the higher-layer bit stream of key signal, and the lower-layer bit stream of key signal.

In the decoding apparatus, the encoded bit stream is supplied to a demultiplexer 65. The demultiplexer 65 decomposes the received bit stream into a bit stream of encoded higher-layer image signal (motion vector and texture information), a bit stream of encoded lower-layer image signal (motion vector and texture information), a bit stream of encoded higher-layer key signal, and a bit stream of encoded lower-layer key signal. The bit streams of encoded higher-layer and lower-layer image signals are supplied to an image signal decoder 66. On the other hand, the bit streams of encoded higher-layer and lower-layer key signals (key information) are supplied to a key signal decoder 67. The image signal decoder 66 decodes the encoded higher-layer image signal and the encoded lower-layer image signal using the scalable decoding method described earlier with reference to FIG. 4 thereby generating a higher-layer image signal and a lower-layer image signal corresponding to the input signal supplied to the image signal encoder 61 of the encoding apparatus. The resultant signals are output as reproduced image signals. The key signal decoder 67 decodes the encoded higher-layer key signal and the encoded lower-layer key signal using the scalable decoding method which will be described later thereby generating a higher-layer key signal and a lower-layer key signal corresponding to the input signal supplied to the key signal encoder 62 of the encoding apparatus. In the case where the higher-layer key signal and the lower-layer key signal have been subjected to motion compensation processing using the motion vector in the encoding process performed by the key signal encoder 62, the key signal decoder 66 performs, in the key signal decoding operation, motion compensation processing on the higher-layer and lower-layer key signals using the motion vector supplied from the image signal decoder 66.

Referring now to FIG. 11A, a scalable key signal encoding circuit implementing the 1st VOP decoder 33 will be described below. Among various scaling techniques such as spatial scaling, temporal scaling, and SNR scaling, the spatial scaling process will be described here by way of example.

The lower-layer key signal is used here as a key signal to handle an image with a small size, while the higher-layer key signal is used to handle a higher-layer image with a large size.

The format of a key signal will be described below. A key signal can take a particular value for each pixel (luminance signal) of an image. This means that the key signal is equal in magnitude to the luminance signal of the corresponding image. There are two types of key signals: a soft key and a hard key. In a hard key, the key signal takes a value of 1 in an extracted area corresponding to an object, and takes a value of 0 in the other area or the background area. Therefore, the hard key is a bilevel signal. In contrast, the soft key can take continuous values. For example, in the case of an 8-bit soft key, the soft key can take a value of 255 for an extracted area corresponding to an object, while the soft key takes a value of 0 for the other area where no object exists (background area). In an edge area (transition area) between the extracted area and the background area, the soft key takes various values between 0 and 255.

In this specific embodiment, it is assumed that the key signal consists of 8 bits although the invention is not limited to that. In the case of the hard key, a bilevel hard key signal is expanded to an 8-bit key signal such that a hard key having a value of 1 is converted to an 8-bit key signal having a value of 255, and a hard key having a value of 0 is converted to an 8-bit key signal having a value of 0. The present invention can be applied to both the soft key and the hard key.

Referring to FIG. 11A, the scalable encoding of a key signal will be described below. A lower-layer key signal is supplied to a key signal encoder 70 for encoding the lower-layer key signal. The key signal encoder 70 encodes the lower-layer key signal using the encoding method which will be described later, and outputs an encoded lower-layer key data in the form of a bit stream.

The key signal encoder 70 also supplies a locally-decoded lower-layer key signal to a key signal expander 74. The key signal expander 74 expands the lower-layer key signal up to the same size as that of the higher-layer key signal using the method which will be described later.

A higher-layer key signal is supplied to an arithmetic operation circuit 72 via a delay circuit 71. The higher-layer key signal is delayed by the delay circuit 71 by an amount corresponding to the time required to encode the lower-layer key signal. The arithmetic operation circuit 72 calculates the difference between the higher-layer key signal and the predicted reference key signal provided from the key signal expander 74. The resultant key difference signal is supplied to a higher-layer key signal encoder (key difference signal encoder) 73. In the above operation, although the key difference signal is generated in the case where the signal is processed in the interframe prediction encoding mode, the input signal to the arithmetic operation circuit 72 is directly output from it without being processed when the signal is processed in the intraframe prediction encoding mode.

The key difference signal encoder 73 encodes the received key difference signal (or an input key signal when the signal is processed in the intraframe prediction mode) using the encoding method which will be described later. The result is output as a higher-layer encoded data in the form of a bit stream. The key difference signal encoder 73 also supplies a locally-decoded higher-layer key signal to the key signal expander 74. The key signal expander 74 generates a predicted reference key signal from the higher-layer key signal and the expanded lower-layer key signal using the method described later, and supplies the resultant signal to the arithmetic operation circuit 72.

Referring now to FIG. 11B, the scalable decoding operation of a key signal will be described below. The lower-layer key bit stream is supplied to a key signal decoder 75. The key signal decoder 75 decodes the received lower-layer key bit stream using the method which will be described later, and outputs a resultant decoded lower-layer key signal. The decoded lower-layer key signal is supplied to a key signal expander 78. The key signal expander 78 expands the lower-layer key signal to the same size as that of a higher-layer key signal. The decoded lower-layer key signal is also fed back as a predicted key signal to the key signal decoder 75.

On the other hand, the bit stream of higher-layer key signal is supplied to a key difference signal decoder 76. The key difference signal decoder 76 decodes the bit stream of higher-layer key signal using the decoding method which will be described later. The resultant key difference signal is supplied to an arithmetic operation circuit 77. The arithmetic operation circuit 77 calculates the sum of the key difference signal and the predicted reference key signal supplied from the key signal expander, and outputs a resultant higher-layer key signal. In the case where the output signal supplied from the key difference signal decoder 76 is a key signal processed in the intraframe prediction encoding mode, the arithmetic operation circuit 77 directly outputs the key signal as a higher-layer key signal without processing it.

The higher-layer key signal is also supplied to the key signal expander 78. The key signal expander 78 generates a predicted reference key signal from the higher-layer key signal and the expanded lower-layer key signal. The resultant predicted reference key signal is supplied to the arithmetic operation circuit 77.

(1) SCALABLE ENCODING OF A KEY SIGNAL ACCORDING TO A FIRST EMBODIMENT

The scalable encoding of a key signal will be described in further detail with reference to a first embodiment of the invention in conjunction with FIG. 12. In this specific embodiment, a key signal is encoded using a scalable encoding method similar to that employed for an image signal. First, an input lower-layer key signal is supplied to an arithmetic operation circuit 303 via a frame memory 301. A motion compensation circuit 312 generates a predicted reference key signal according to the motion vector of a lower-layer image signal and information of the associated prediction mode supplied from the image signal encoder 51 shown in FIG. 9A. The resultant predicted reference key signal is supplied to the arithmetic operation circuit 303 and an arithmetic operation circuit 310. The encoding of the lower-layer key signal is performed in units of macroblocks as in the encoding process for an image signal. In this specific embodiment, the encoding and decoding for the key signal are performed using the same method as those employed for background and foreground image signals.

If the macroblock being processed is an intraframe macroblock (the intraframe macroblock refers to a macroblock which is processed in the intraframe prediction encoding mode), the input lower-layer key signal is directly supplied to a DCT circuit 304. In the other case (that is, the macroblock is an interframe macroblock which is processed in the interframe prediction encoding mode), the arithmetic operation circuit 303 calculates the difference between the input lower-layer key signal and the predicted reference key signal supplied from the motion compensation circuit 312, and supplies the resultant signal to the DCT circuit 304. The DCT circuit 304 performs a DCT process on the key difference signal (or the input signal when the signal is to be processed in the intraframe prediction encoding mode), thereby generating DCT coefficients. The resultant DCT coefficients are supplied to a quantization circuit 305. The quantization circuit 305 quantizes the DCT coefficients for each macroblock using a quantization scale determined by the buffer feedback information supplied from a transmission buffer 307. The quantized DCT coefficients are supplied to a variable-length encoder 306. The variable-length encoder 306 performs a variable-length encoding operation on the quantized DCT coefficients, and supplies the result to the transmission buffer 307. After storing the variable-length-encoded lower-layer key signal temporarily, the transmission buffer 307 outputs it as a bit stream of lower-layer key signal. The variable-length encoder 306 also performs a variable-length encoding operation on the quantization scale supplied from the quantization circuit 305.

The quantized DCT coefficients output from the quantization circuit 305 is also supplied to an inverse quantization circuit 308. The inverse quantization circuit 308 performs an inverse quantization process on the received data using the same quantization scale as that used by the quantization circuit 305 thereby generating DCT coefficients corresponding to the output signal of the DCT circuit 304. The generated DCT coefficients are supplied to an inverse DCT circuit 309. The inverse DCT circuit 309 performs an inverse DCT process on the supplied DCT coefficients thereby generating a key difference signal corresponding to the output signal of the arithmetic operation circuit 303. The resultant key difference signal is supplied to an arithmetic operation circuit 310. The arithmetic operation circuit 310 calculates the sum of the predicted reference key signal supplied from the motion compensation circuit 312 and the key difference signal supplied from the inverse DCT circuit 309. When the output signal of the inverse DCT circuit 309 is a key signal processed in the intraframe prediction encoding mode, the arithmetic operation circuit 310 directly outputs that key signal without processing it. A frame memory 311 stores the predicted key signal supplied from the arithmetic operation circuit 310, in a proper memory area, so that the predicted key signal can be used in processing a subsequent key signal.

The predicted lower-layer key signal output from the arithmetic operation circuit 310 is supplied to a key signal expander 313. The key signal expander 313 expands the predicted lower-layer key signal to the same size as that of the higher-layer key signal so that the expanded key signal can be used as a predicted reference key signal in processing the higher-layer key signal. The predicted lower-layer key signal expanded by the key signal expander 313 is supplied to a weighting circuit 314. The weighting circuit 314 multiplies the predicted lower-layer key signal expanded in size by a weighting factor (1−W). The weighted value of the predicted lower-layer reference key signal is supplied to an arithmetic operation circuit 328.

On the other hand, a higher-layer key signal is supplied to an arithmetic operation circuit 317 via a delay circuit 315 composed of memory. The higher-layer key signal is delayed by the delay circuit 315 by a time period required to encode the lower-layer key signal relative to the time for the higher-layer signal. A motion compensation circuit 326 generates a predicted reference key signal associated with the higher-layer key signal according to the motion vector of the higher-layer image signal supplied from the image signal encoder shown in FIG. 10A in the specified prediction encoding mode. The generated signal is supplied to a weighting circuit 327. The weighting circuit 327 multiplies the predicted reference key signal associated with the higher-layer key signal by a weighting factor W, and supplies the result to the arithmetic operation circuit 328.

The arithmetic operation circuit 328 calculates the sum of the weighted value of the predicted lower-layer reference key signal supplied from the weighting circuit 314 and the weighted value of the predicted higher-layer reference key signal supplied from the weighting circuit 327. The result is supplied to the arithmetic operation circuit 317 as a predicted reference key signal for the higher-layer key signal. The predicted reference key signal output from the arithmetic operation circuit 328 is also supplied to the arithmetic operation circuit 324, and the arithmetic operation circuit 324 calculates the sum of the predicted reference key signal and the key difference signal supplied from the inverse DCT circuit 323. The result is supplied as a predicted key signal to a frame memory 325 so that it can be used as a predicted key signal in processing a subsequent higher-layer key signal.

The arithmetic operation circuit 317 calculates the difference between the higher-layer key signal to be encoded and the predicted reference key signal supplied from the arithmetic operation circuit 328, thereby generates a higher-layer difference signal. The generated higher-layer difference signal is supplied to a DCT circuit 318. In the case where the input higher-layer key signal is an intraframe macroblock (to be processed in the intraframe prediction encoding mode), the arithmetic operation circuit 317 directly supplies the higher-layer key signal to be encoded to the DCT circuit 318 without processing it. The DCT circuit 318 performs a DCT (discrete cosine transform) operation on the higher-layer key difference signal (or the input higher-layer key signal when the signal is to be processed in the intraframe prediction encoding mode) supplied from the arithmetic operation circuit 317 thereby generating DCT coefficients. The generated DCT coefficients are supplied to a quantization circuit 319. The quantization circuit 319 quantizes the DCT coefficients using a quantization scale determined by the amount of data stored in a transmission buffer 321. The quantized DCT coefficients are supplied to a variable-length encoder 320. The variable-length encoder 320 performs a variable-length encoding process on the quantized DCT coefficients, and supplies the resultant variable-length-encoded signal to the transmission buffer 321. The transmission buffer 321 stores the received signal temporarily, and transmits it as a bit stream of higher-layer key signal. The variable-length encoder 320 also performs a variable-length encoding process on the quantization scale used by the quantization circuit 319 and the weighting factors used by the weighting circuits 314 and 327.

The quantized DCT coefficients output from the quantization circuit 319 are supplied to an inverse quantization circuit 322. The inverse quantization circuit 322 performs an inverse quantization process on the quantized DCT coefficients using the quantization scale employed by the quantization circuit 319 thereby generating DCT coefficients corresponding to the output signal of the DCT circuit 318. The resultant DCT coefficients are supplied to an inverse DCT circuit. The inverse DCT circuit 323 performs an inverse DCT process on the supplied DCT coefficients thereby generating a key difference signal corresponding to the output signal of the arithmetic operation circuit 317. The generated key difference signal is supplied to the arithmetic operation circuit 324. The arithmetic operation circuit 324 calculates the sum of the key difference signal supplied from the arithmetic operation circuit 328 and the predicted reference key signal from the inverse DCT circuit 323 thereby generating a predicted key signal for use in processing the higher-layer key signal. When the output signal of the inverse DCT circuit 323 is a key signal processed in the intraframe prediction encoding mode, the arithmetic operation circuit 324 directly outputs the key signal without processing it.

Figure 13:
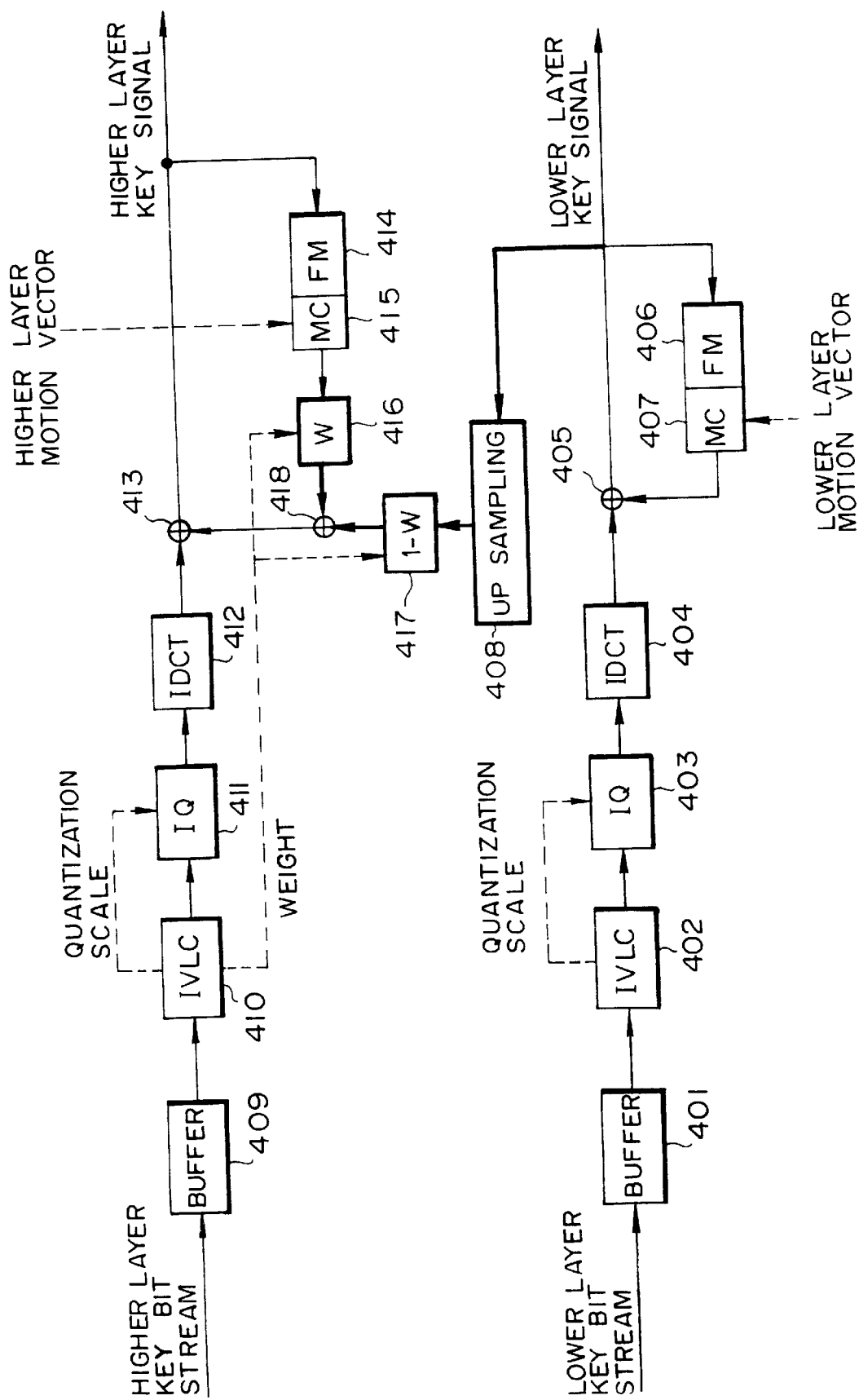
FIG. 13 is a block diagram illustrating a first embodiment of a scalable key-signal decoder according to the present invention.

Referring to FIG. 13, an example of a scalable key signal decoder will be described below. In this specific example, it is assumed that the decoder has the capability of spatial scaling.

A bit stream of lower-layer key signal is stored in a reception buffer 401 temporarily, and then supplied to a variable-length decoder 402. The variable-length decoder 402 performs a variable-length decoding process on the variable-length-encoded lower-layer key signal supplied from the reception buffer 401. thereby generating variable-length-decoded data of quantized DCT coefficients associated with a lower-layer signal. The resultant data is supplied to an inverse quantization circuit 403. The variable-length decoder 402 also supplies a quantization scale to the inverse quantization circuit 403. The above variable-length-decoded data of quantized DCT coefficients associated with the lower-layer key signal corresponds to the output signal of the quantization circuit 305 of the scalable encoding apparatus shown in FIG. 12.

Figure 12:
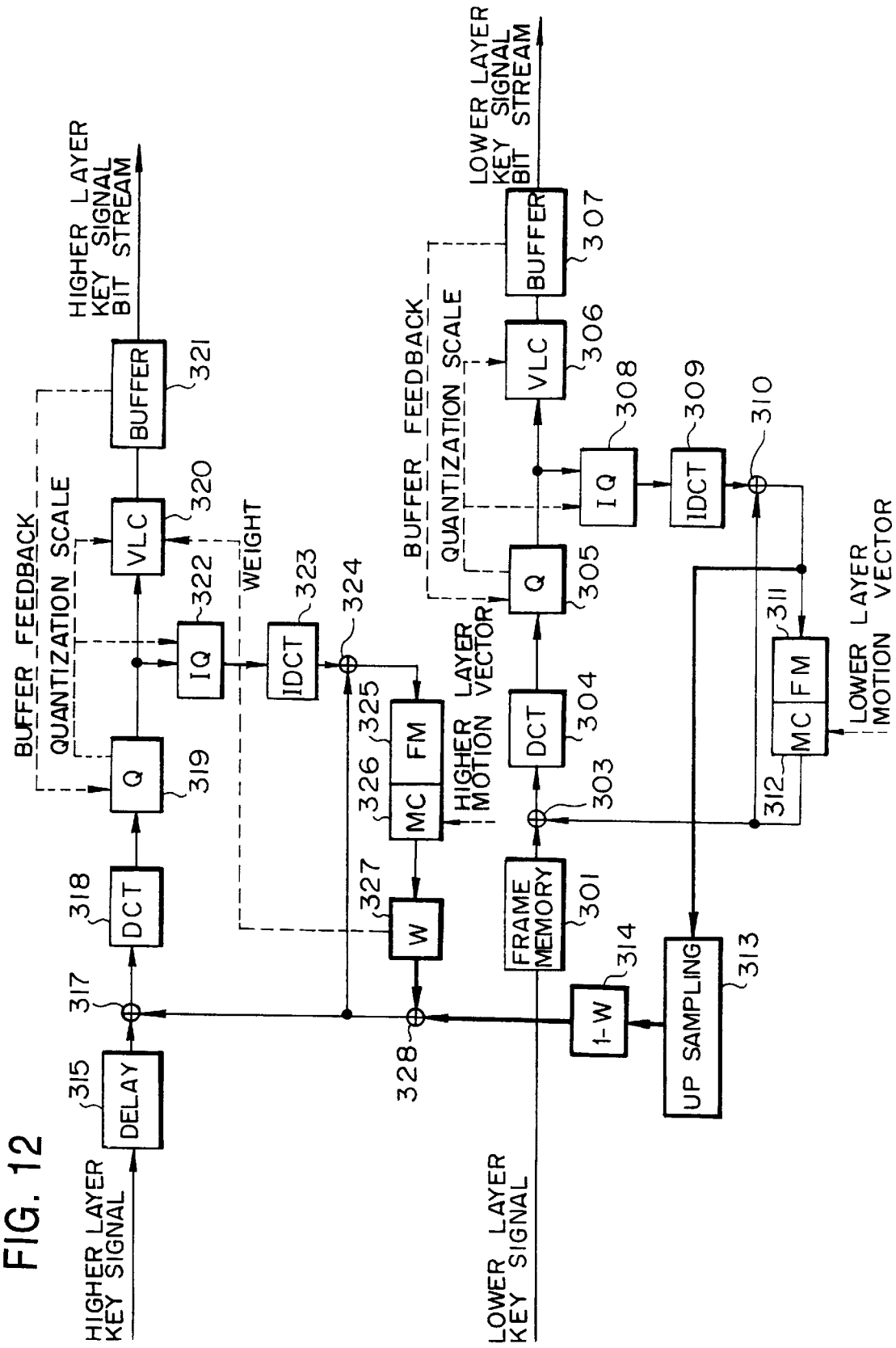
FIG. 12 is a block diagram illustrating a first embodiment of a scalable key-signal encoder according to the present invention.

The inverse quantization circuit 403 performs an inverse quantization process on the quantized DCT coefficients supplied from the variable-length decoder 402 using the quantization scale also supplied from the variable-length decoder 402 thereby generating DCT coefficients corresponding to the output signal of the DCT circuit 304 in the scalable decoding apparatus shown in FIG. 12. The generated DCT coefficients are supplied to an inverse DCT circuit 404. The inverse DCT circuit 404 performs an inverse DCT process on the supplied DCT coefficients thereby generating a key difference signal The generated key difference signal is supplied to an arithmetic operation circuit 405. The arithmetic operation circuit 405 calculates the sum of the key difference signal and a predicted reference key signal supplied from a motion compensation circuit 407 thereby generating a lower-layer key signal. The resultant lower-layer key signal is output as a reproduced key signal. When the output signal of the inverse DCT circuit 404 is a key signal processed in the intraframe prediction encoding mode, the arithmetic operation circuit 405 directly outputs the key signal without processing it.

Furthermore, in the case where the key signal output from the inverse DCT circuit 404 is an I-picture signal, the arithmetic operation circuit 405 also directly outputs the key signal without processing it. In this case, the key signal is stored in a frame memory 406 so that it can be used to generate a predicted reference key signal for use in decoding a subsequent key signal (P- or B-picture signal).

On the other hand, when the key signal is a P- or B-picture signal, that is, when the key signal output from the inverse DCT circuit 404 is a key difference signal, the motion compensation circuit 407 generates a predicted lower-layer reference key signal according to the motion vector of a lower-layer image signal supplied from the image signal decoder 56 shown in FIG. 10B in a specified prediction mode, and supplies the generated predicted lower-layer reference key signal to the arithmetic operation circuit 405. The arithmetic operation circuit 405 calculates the sum of the key difference signal supplied from the inverse DCT circuit 404 and the predicted reference key signal supplied from the motion compensation circuit 407, thereby generating a lower-layer key signal. The generated signal is output as a reproduced key signal. When the above key difference signal is a P-picture signal, the lower-layer key signal output from the arithmetic operation circuit 405 is supplied to the frame memory 406. The frame memory 406 stores the received signal so that it can be used as a predicted reference key signal in processing a subsequent key signal.

The lower-layer key signal output from the arithmetic operation circuit 405 is output to the outside. The above lower-layer key signal is not only stored in the frame memory 406 for use as a predicted reference key in processing a subsequent key signal, but also expanded by a key signal expander 408 to the same size as that of a higher-layer key signal so that the expanded signal is used as a predicted reference key in processing the higher-layer key signal.

On the other hand, a bit stream of higher-layer key signal is supplied to a variable-length decoder 410 via a reception buffer 409. The variable-length decoder 410 performs a variable-length decoding process on the variable-length-encoded higher-layer key signal thereby generating quantized DCT coefficients, a quantization scale, and a weighting factor. The quantized DCT coefficients output from the variable-length decoder 410 are supplied to an inverse quantization circuit 411. The inverse quantization circuit 411 performs an inverse quantization process on the quantized DCT coefficients using the quantization scale supplied from the variable-length decoder thereby generating DCT coefficients corresponding to the output signal of the DCT circuit 318 in the scalable encoding apparatus shown in FIG. 12. The resultant DCT coefficients are supplied to an inverse DCT circuit 412. The inverse DCT circuit 412 performs an inverse DCT process on the received DCT coefficients thereby generating a key difference signal (or a key signal for an intraframe-prediction-encoded signal) corresponding to the output signal of the arithmetic operation circuit 317 of the scalable encoding apparatus shown in FIG. 12.

A motion compensation circuit 415 generates a predicted reference key signal for use in processing a higher-layer key signal according to the motion vector of a higher-layer image signal supplied from the image signal decoder shown in FIG. 10B in a specified prediction mode. The resultant predicted reference key signal is supplied to a weighting circuit 416. The weighting circuit 416 multiplies the predicted reference key signal by the weighting factor W supplied from the variable-length decoder 410 thereby generating a weighted value of the predicted higher-layer reference key signal. The result is supplied to an arithmetic operation circuit 418. The predicted lower-layer reference key signal expanded by the key signal expander 408 is supplied to a weighting circuit 417. The weighting circuit 417 multiplies the expanded signal of the predicted lower-layer reference key signal by a factor (1−W) using the weighting factor W supplied from the variable-length decoder 410 thereby generating a weighted value of the predicted lower-layer reference key signal. The generated signal is supplied to the arithmetic operation circuit 418.

The arithmetic operation circuit 418 calculates the sum of the weighted value of the predicted lower-layer reference signal supplied from the weighting circuit 417 and the weighted value of the predicted higher-layer reference signal supplied from the weighting circuit 416 thereby generating a predicted reference key signal for use in processing the higher-layer key signal. The generated signal is then supplied to an arithmetic operation circuit 413. The arithmetic operation circuit 413 calculates the sum of the key difference signal (in the case where the signal is an interframe-prediction-encoded signal) supplied from the inverse DCT circuit 412 and the predicted reference key signal supplied from the arithmetic operation circuit 417. The result is output as a higher-layer key signal. When the output signal of the inverse DCT circuit 412 is an intraframe-prediction-encoded key signal, the arithmetic operation circuit 412 directly outputs the key signal as a higher-layer reference key signal without processing it. On the other hand, when the higher-layer key signal supplied from the arithmetic operation circuit 413 is an I- or P-picture signal, the higher-layer key signal is supplied to a frame memory 414. The frame memory stores the received higher-layer key signal so that it can be sued as a prediction reference key signal in processing a subsequent higher-layer key signal.

Although in the above embodiment the operation of dealing with a luminance signal is described, the operation for a color difference signal is performed in a similar manner except that the motion vector used for the luminance signal is reduced to half in both vertical and horizontal directions.

Furthermore, although in the above embodiment, it is assumed that the encoding and decoding apparatus have the capability of spatial scaling, the invention may also be applied to the temporal scaling and SNR scaling. In any case, a reference key signal for use in processing a higher-layer key signal is generated from a lower-layer key signal, and a difference between the higher-layer key signal and the lower-layer key signal is encoded.

(2) SCALABLE ENCODING OF A KEY SIGNAL ACCORDING TO A SECOND EMBODIMENT

This second embodiment is a variation of the first embodiment described above. In contrast to the first embodiment in which a higher-layer key signal is subjected to a motion compensation process, motion compensation is not performed on the higher-layer key signal in this second embodiment. In this second embodiment, instead of decoding and encoding foreground and background image signals using the scalable encoding and decoding method described above, they are encoded and decoded using the same scalable encoding and decoding method as that employed for key signals. In the third through sixth embodiments which will be described layer, the encoding and decoding on foreground and background image signals are dealt with in a similar manner.

Figure 14:
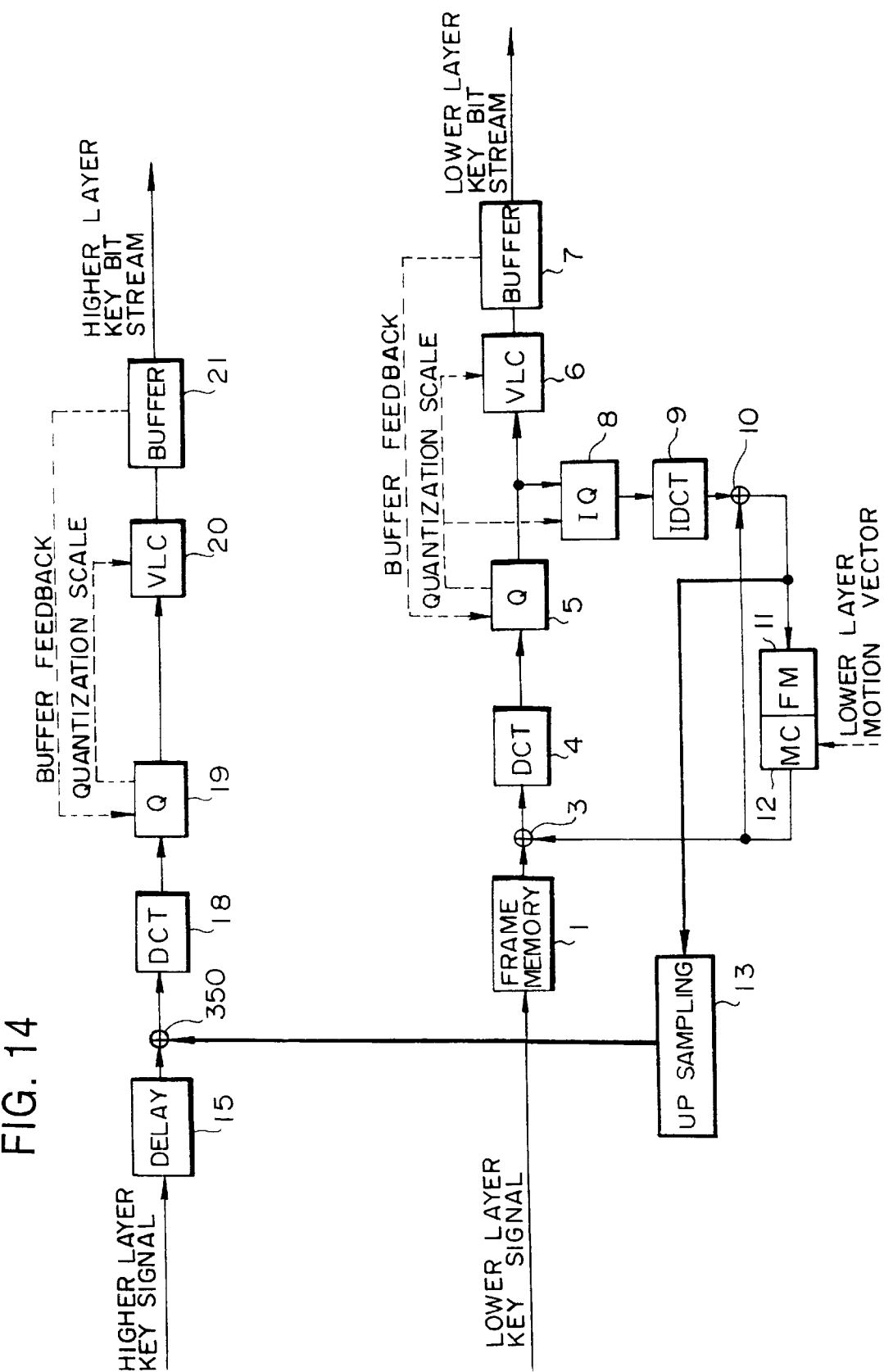
FIG. 14 is a block diagram illustrating a second embodiment of a scalable key-signal encoder according to the present invention.

FIG. 14 illustrates an example of a scalable key signal encoding apparatus according to the second embodiment of the invention. The encoding process for a lower-layer key signal is performed in the same manner as in the encoding process according to the first embodiment, and thus those parts relating to the encoding process for the lower-layer key sigal are denoted by similar reference numerals to those in the first embodiment, and they are not described in further detail here. Furthermore, in the decoding process for a higher-layer key signal, some parts are similar to those employed in the first embodiment. Such parts are denoted by similar reference numerals and they are not described in further detail here. Thus in the following description, only those essential to the second embodiment will be described.

In an encoding operation, a predicted lower-layer key signal is output by an arithmetic operation circuit 310 in a local decoder, and supplied to a key signal expander 313. The key signal expander 313 expands the predicted lower-layer key signal up to the same size as that of a higher-layer key signal. The expanded signal is supplied to an arithmetic operation circuit 350 as a predicted reference key signal for use in processing the higher-layer key signal. The input higher-layer key signal is delayed by an amount corresponding to the time required to encode the lower-layer key signal, and then supplied to an arithmetic operation circuit 350. The arithmetic operation circuit 350 calculates the difference between the higher-layer key signal and the predicted reference key signal supplied from the key signal expander 313. The resultant key difference signal is supplied to a DCT circuit 318. In the case where the input higher-layer key signal is to be processed in the intraframe prediction encoding mode, the arithmetic operation circuit 350 directly outputs the higher-layer key signal without processing it. The DCT circuit 318 performs a DCT process on the supplied key difference signal (to be processed in the interframe prediction encoding mode) or the key signal (to be processed in the intraframe prediction encoding mode) thereby generating DCT coefficients. The generated DCT coefficients are supplied to a quantization circuit 319. The quantization circuit 319 quantizes the DCT coefficients using a quantization scale determined by the amount of data stored in a transmission buffer 321. The quantized DCT coefficients are supplied to a variable-length encoder 320. The variable-length encoder 320 performs a variable-length encoding process on the quantized DCT coefficients and the quantization scale, and outputs the resultant as a bit stream of higher-layer key signal via the transmission buffer 321.

Figure 15:
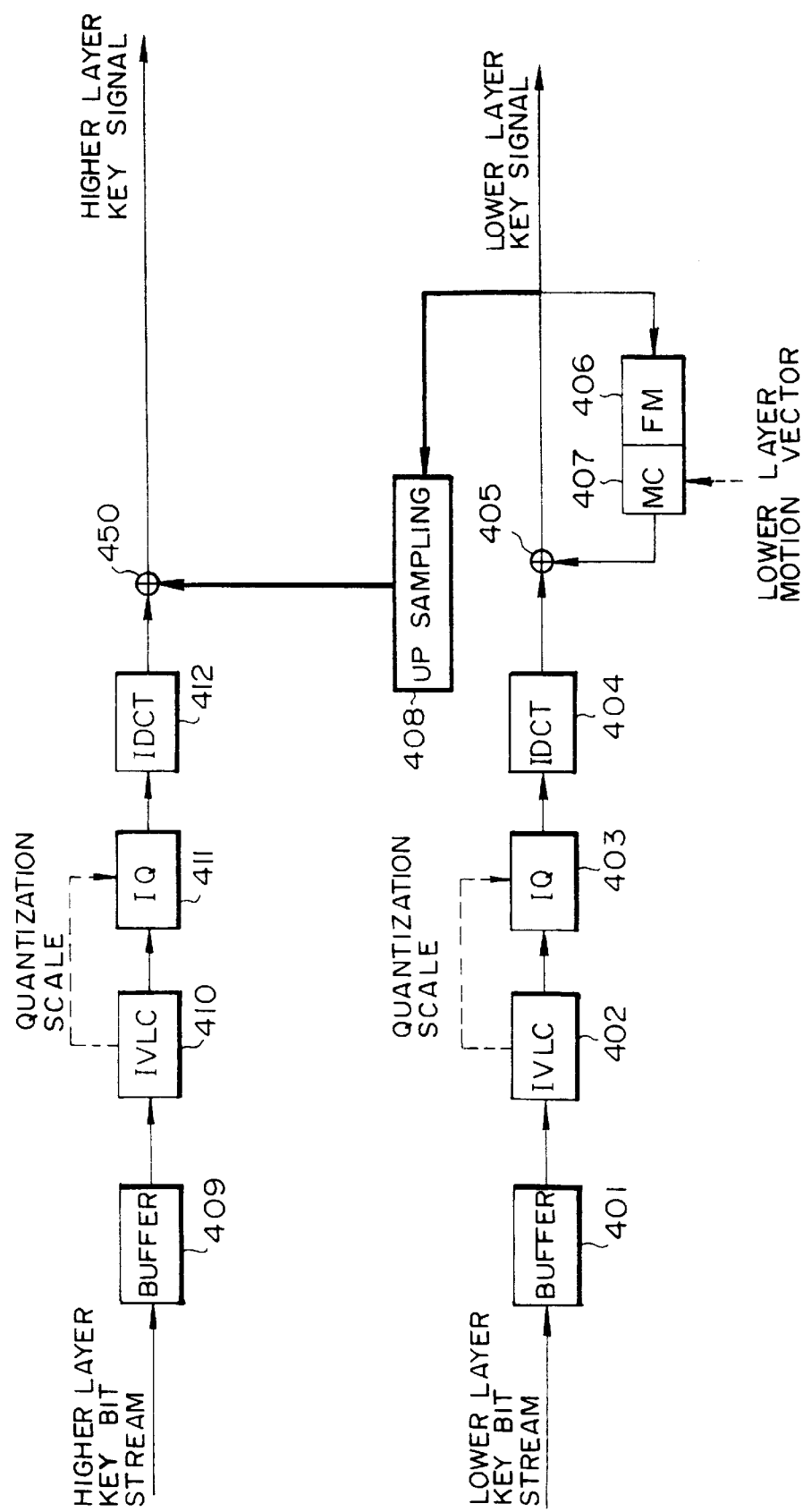
FIG. 15 is a block diagram illustrating a second embodiment of a scalable key-signal decoder according to the present invention.

FIG. 15 illustrates an example of a scalable key signal decoding apparatus according to the second embodiment of the invention. The decoding process for a lower-layer key signal is performed in a similar manner to the decoding process according to the first embodiment described above, and those parts relating to the process for the lower-layer key signal are denoted by reference numerals similar to those employed in the first embodiment, and they are not described in further detail here. Furthermore, in the decoding process for a higher-layer key signal, some parts are similar to those employed in the first embodiment. Such parts are denoted by similar reference numerals and they are not described in further detail here. Thus in the following description, only those essential to the second embodiment will be described.

A bit stream of higher-layer key signal is supplied to a variable-length decoder 410 via a reception buffer 409. The variable-length decoder 410 performs a variable-length decoding process on the variable-length-encoded signal thereby generating quantized DCT coefficients and a quantization scale, which are supplied to an inverse quantization circuit 411. The inverse quantization circuit 411 performs an inverse quantization process on the quantized DCT coefficients using the specified quantization scale thereby generating DCT coefficients. The generated DCT coefficients are supplied to an inverse DCT circuit 412. The inverse DCT circuit 412 performs an inverse DCT process on the supplied DCT coefficients thereby generating a key difference signal (for the signal processed in the interframe prediction encoding mode) or a key signal (for the signal processed in the intraframe prediction encoding mode). The generated signal is supplied to an arithmetic operation circuit 450.

The reconstructed lower-layer key signal supplied from the arithmetic operation circuit 405 is output as a reproduced key signal to the outside, and also supplied to a key signal expander 408. If the decoded lower-layer key signal is an I- or P-picture signal, the lower-layer key signal is supplied to a frame memory 406. The frame memory stores the lower-layer key signal so that it can be used as a predicted reference key signal in processing a subsequent lower-layer key signal. The key signal expander 408 expand the supplied lower-layer key signal up to the same size as that of a higher-layer key signal and supplies the expanded key signal to an arithmetic operation circuit 450 for use as a predicted reference key signal in processing the higher-layer key signal.

The arithmetic operation circuit 450 calculates the sum of the key difference signal (in the case of the signal processed in the interframe prediction encoding mode) supplied from the inverse DCT circuit 412 and the predicted reference key signal supplied from the key signal expander 408, thereby generating a higher-layer key signal. The generated higher-layer key signal is output to the outside. In the case where the output signal of the inverse DCT circuit 412 is a key signal processed in the intraframe prediction encoding mode, the arithmetic operation circuit 450 directly outputs the key signal supplied from the inverse DCT circuit 412 without processing it.

(3) SCALABLE ENCODING OF A KEY SIGNAL ACCORDING TO A THIRD EMBODIMENT

This third embodiment is another variation of the first embodiment described above. In contrast to the first embodiment in which a higher-layer key signal and a lower-layer key signal are compressed by means of the DCT processing and the quantization processing, the higher-layer key signal and the lower-layer key signal are compressed by means of the quantization processing and the DPC processing in the third embodiment.

Figure 16:
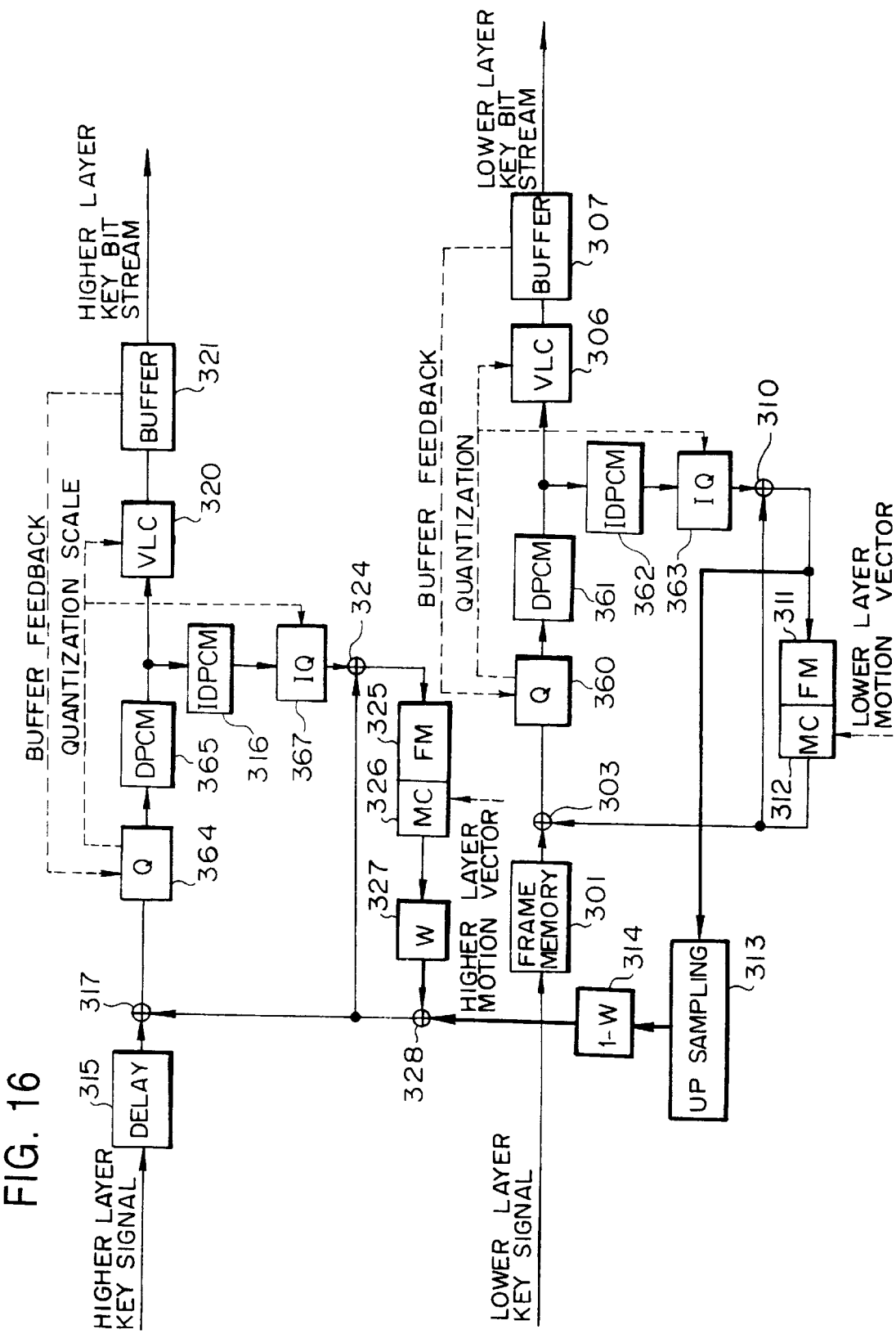
FIG. 16 is a block diagram illustrating a third embodiment of a scalable key-signal encoder according to the present invention.

FIG. 16 illustrates an example of a scalable key signal encoding apparatus according to the third embodiment of the invention. The processing for the higher-layer key signal and the lower-layer key signal is performed in a manner similar to the encoding process according to the first embodiment except for the DCT processing and the quantization process, and thus those similar parts are denoted by similar reference numerals and they are not described in further detail here. Thus in the following description, only those essential to the third embodiment will be described.

As in the first embodiment described above, a lower-layer key signal is supplied to an arithmetic operation circuit 303 via a frame memory 301. A key difference signal (in the case of the interframe prediction encoding mode) or a key signal (in the case of the intraframe prediction encoding mode) are generated in the same manner as in the first embodiment and supplied to a quantization circuit 360 via the arithmetic operation circuit 303. The quantization circuit 360 quantizes the key difference signal (to be processed in the interframe prediction encoding mode) or the key signal (to be processed in the intraframe prediction encoding mode) supplied from the arithmetic operation circuit 303 using a quantization scale determined by the amount of residual data stored in a transmission buffer 307. The quantized signal is supplied to a DPCM circuit 361. The DPCM circuit 361 performs a DPCM process on the quantized signal and supplies the resultant signal to a variable-length encoder 406. The variable-length encoder 406 performs a variable-length encoding process on the supplied DPCM-processed signal. The result is output as a bit stream of lower-layer key signal via the transmission buffer 307. The variable-length decoder 406 also performs a variable-length decoding process on the quantization scale output supplied from the quantization circuit 360, and result is output as a part of the bit stream of lower-layer key signal.

The DPCM-processed signal output from the DPCM circuit 361 is also supplied to an inverse DPCM circuit 362. The inverse DPCM circuit 362 performs an inverse DPCM process on the supplied DCPM-processed signal thereby generating a quantized signal corresponding to the output signal of the quantization circuit 360. The resultant signal is supplied to an inverse quantization circuit 363. The inverse quantization circuit 363 performs an inverse quantization process on the received signal using the quantization scale equal to that employed by the quantization circuit 360 thereby generating a difference signal (in the case of the interframe prediction encoding mode) or a key signal (in the case of the intraframe prediction encoding mode) corresponding to the output signal of the arithmetic operation circuit 303. The resultant signal is supplied to an arithmetic operation circuit 310.

The arithmetic operation circuit 310 calculates the sum of the key difference signal supplied from the inverse quantization circuit 310 and a predicted reference key signal supplied from motion compensation circuit 312 thereby generating a predicted key signal. The predicted key signal (in the case of an I- or P-picture signal) is supplied to a frame memory 311 and also to a key signal expander 313 so that it can be used as a predicted reference key signal for use in processing a higher-layer key signal as in the first embodiment. The predicted lower-layer reference key signal expanded by the key signal expander 313 is supplied to a weighting circuit 314. The weighting circuit 314 multiplies the predicted lower-layer reference key signal expanded in size by a weighting factor (1−W). The result is supplied to an arithmetic operation circuit 328. A motion compensation circuit 326 generates a predicted lower-layer reference key signal using the predicted key signal stored in the frame memory according to the higher-layer motion vector and the information of the prediction mode supplied from the image signal encoder 61 shown in FIG. 10. The resultant predicted reference key signal is supplied to the arithmetic operation circuit 303.

On the other hand, the input higher-layer key signal is delayed by a delay circuit 315 composed of memory by an amount of time corresponding to the processing time required for the encoding of the lower-layer key signal. The delayed signal is then supplied to an arithmetic operation circuit 317. The arithmetic operation circuit 317 calculates the difference between the predicted reference key signal for use in processing the higher-layer key signal, supplied from the arithmetic operation circuit 328, and the input higher-layer key signal. The resultant difference signal is supplied to a quantization circuit 364. In the case where the input higher-layer key signal is to be processed in the intraframe prediction encoding mode, the arithmetic operation circuit 317 directly outputs the higher-layer key signal to the quantization circuit 364 without processing it. The quantization circuit 365 quantizes the supplied key difference signal (in the case of the interframe prediction encoding mode) or the key signal (in the case of the intraframe prediction encoding mode)using a quantization scale determined by the amount of residual data in a transmission buffer 321. The quantized signal is supplied to a DPCM circuit 365. The DCPM circuit 365 performs a DPCM process on the above quantized signal. The resultant DPCM-processed signal is supplied to a variable-length decoder 320. The variable-length decoder 320 performs a variable-length decoding process on the supplied DPCM-processed signal. The result is output via a transmission buffer 307 as a bit stream of higher-layer key signal. The variable-length decoder 320 also performs a variable-length decoding process on the quantization scale supplied from the quantization circuit 364. The result is output as a part of the bit stream of higher-layer key signal.

The DPCM-processed signal output from the DPCM circuit 365 is also supplied to an inverse DPCM circuit 366. The inverse DPCM circuit 366 performs an inverse DPCM process on the supplied DPCM-processed signal thereby generating a quantized signal corresponding to the output signal of the quantization circuit 364. The resultant signal is supplied to an inverse quantization circuit 367. The inverse quantization circuit 366 performs an inverse quantization process on the received signal using a quantization scale equal to that used by the quantization circuit 364 thereby generating a key difference signal (in the case of the interframe prediction encoding mode) or a key signal (in the case of the intraframe prediction encoding mode) corresponding to the output signal of the arithmetic operation circuit 317. The resultant signal is supplied to an arithmetic operation circuit 324. The arithmetic operation circuit 324 calculates the sum of the key difference signal supplied from the inverse quantization circuit 367 and the predicted reference key signal supplied from the arithmetic operation circuit 328 thereby generating a predicted key signal. The generated signal is then supplied to a frame memory 325. The frame memory 325 stores the predicted key signal so that it can be used in processing a subsequent higher-layer key signal.

A motion compensation circuit 326 generates a predicted higher-layer reference key signal according to the higher-layer motion vector and the information of the prediction mode supplied from the image signal encoder 61 shown in FIG. 10, as in the first embodiment described above. The generated signal is supplied to a weighting circuit 327. The weighting circuit 327 multiplies the predicted higher-layer reference key signal supplied from the motion compensation circuit 326 by a weighting factor W. The weighted value of the higher-layer reference key signal is supplied to the arithmetic operation circuit 328. The arithmetic operation circuit 328 calculates the sum of the weighted value of the predicted lower-layer reference key signal supplied from the weighting circuit 314 and the weighted value of the predicted higher-layer reference key signal supplied from the weighting circuit 327 thereby generating a predicted higher-layer reference key signal. The resultant signal is supplied to the arithmetic operation circuit 317. The weighting factor W output from the weighting circuit 327 is also supplied to the variable-length encoder 320, which in turn performs a variable-length decoding process on the received weighting factor W. The resultant signal is output as a part of the bit stream of higher-layer key signal.

Figure 17:
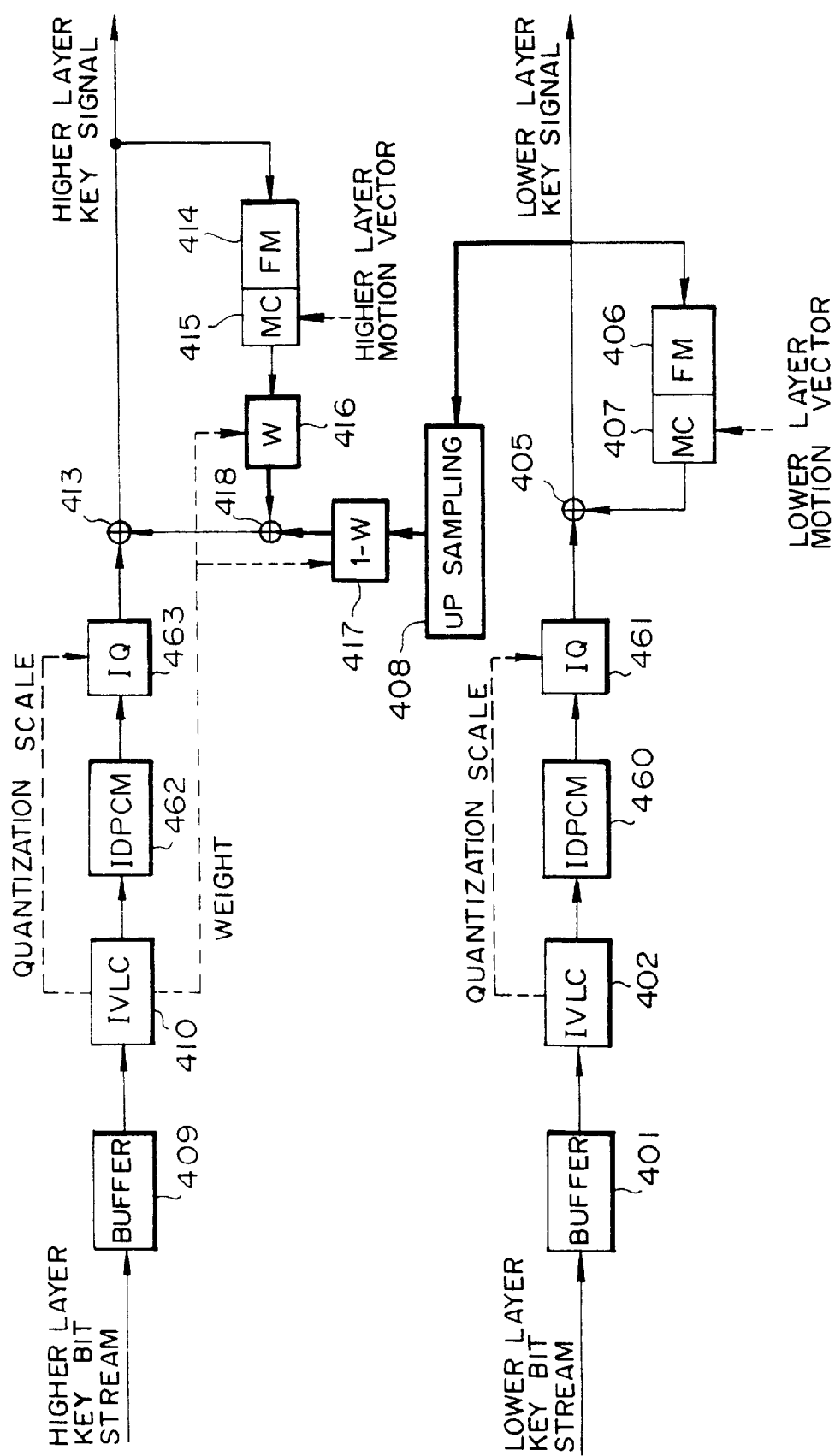
FIG. 17 is a block diagram illustrating a third embodiment of a scalable key-signal decoder according to the present invention.

FIG. 17 illustrates an example of a scalable key signal decoding apparatus according to the third embodiment of the invention. In this third embodiment, operation except for an inverse DCT process and an inverse quantization on a higher-layer and lower-layer key signals is performed in a similar manner to the decoding process according to the first embodiment described above, and those parts relating to the similar process are denoted by reference numerals similar to those employed in the first embodiment, and they are not described in further detail here. Thus in the following description, only those essential to the third embodiment will be described.

A bit stream of a lower-layer key signal is supplied to a variable-length decoder 402 via a reception buffer 401. The variable-length decoder 402 performs a variable-length decoding process on the variable-length-encoded lower-layer key signal thereby generating a DPCM-processed signal and a quantization scale. The DPCM-processed signal is supplied to an inverse DPCM circuit 460. The inverse DPCM circuit 460 performs an inverse DPCM process on the supplied DPCM-processed signal thereby generating a quantized signal. The resultant signal is supplied to an inverse quantization signal 461. The inverse quantization circuit 461 performs an inverse quantization process on the quantized signal using the decoded quantization scale supplied from the variable-length decoder 402 thereby generating a key difference signal (in the case of the interframe prediction encoding mode) or a key signal (in the case of the intraframe prediction encoding mode). The generated signal is supplied to an arithmetic operation circuit 405. A motion compensation circuit 407 generates a predicted lower-layer reference key signal according to the lower-layer motion vector and the information of the prediction mode supplied from the image signal decoder 66 shown in FIG. 10B. The generated signal is supplied to an arithmetic operation circuit 405.

The arithmetic operation circuit 405 calculates the sum of the key difference signal supplied from the inverse quantization circuit 461 and the predicted lower-layer reference key signal supplied from the motion compensation circuit

407 thereby generating a decoded lower-layer key signal. The generated signal is output to the outside. In the case where the output signal of the inverse quantization circuit 461 is a key signal processed in the intraframe prediction encoding mode, the arithmetic operation circuit 405 directly outputs the key signal as a lower-layer key signal without processing it. In the case where the decoded lower-layer key signal is an I- or P-picture signal, the lower-layer key signal output from the arithmetic operation circuit 405 is stored in a frame memory 406 so that it can be used as a predicted reference signal in processing a subsequent lower-layer key signal. The lower-layer key signal output from the arithmetic operation circuit 405 is supplied to a key signal expander 408. The key signal expander 408 expands the lower-layer key signal up to the same size as that of a higher-layer key signal. The expanded signal is used as a predicted reference key signal in processing the higher-layer key signal.

On the other hand, a bit stream of higher-layer key signal is supplied to a variable-length decoder 410 via a reception buffer 409. The variable-length decoder 410 performs a variable-length decoding process on the variable-length-encoded higher-layer key signal thereby generating a DPCM-processed signal, a quantization scale, and a weighting scale W. The DPCM-processed signal output from the variable-length decoder 410 is supplied to an inverse DPCM circuit 462. The inverse DPCM circuit 462 performs an inverse DPCM process on the supplied DPCM-processed signal thereby generating a quantized signal. The generated signal is supplied to an inverse quantization circuit 412. The inverse quantization circuit 412 performs an inverse quantization process on the quantized signal using the quantization scale supplied from the variable-length decoder 410 thereby generating a key difference signal (in the case of the interframe prediction encoding mode) or a key signal (in the case of the intraframe prediction encoding mode). The generated signal is supplied to an arithmetic operation circuit 413. A motion compensation circuit 415 generates a predicted higher-layer reference key signal according to the motion vector and the information of the prediction mode supplied from the image signal decoder 66 shown in FIG. 10B thereby generating a predicted higher-layer reference key signal. The resultant signal is supplied to a weighting circuit 416. The weighting circuit 416 multiplies the predicted higher-layer reference key signal supplied from the variable-length decoder 410 by the decoded weighting factor W. The weighted value of the predicted higher-layer reference key signal is supplied to an arithmetic operation circuit 418. The lower-layer key signal expanded by the key signal expander 408 is supplied to a weighting circuit 417. The weighting circuit 417 multiplies the expanded lower-layer key signal by a weighting factor (1−W) using the decoded value W supplied from the variable-length decoder 410. The weighted value of the predicted lower-layer reference key signal is supplied to the arithmetic operation circuit 418.

The arithmetic operation circuit 418 calculates the sum of the weighted value of the predicted higher-layer reference key signal supplied from the weighting circuit 416 and the weighted value of the predicted lower-layer reference key signal supplied from the weighting circuit 417 thereby generating a predicted reference key signal for use in processing the higher-layer key signal. The resultant signal is supplied to the arithmetic operation circuit 413. The arithmetic operation circuit 413 calculates the sum of the key difference signal (in the case of the interframe prediction encoding mode) supplied from the inverse quantization circuit 12 and the predicted higher-layer reference key signal supplied from the arithmetic operation circuit 418 thereby generating a decoded higher-layer key signal. The generated signal is output to the outside. In the case where output signal of the inverse quantization circuit 463 is a key signal processed in the intraframe prediction encoding mode, the arithmetic operation circuit 413 directly outputs the key signal as a lower-layer key signal without processing it. The lower-layer key signal output from the arithmetic operation signal 413 is stored in a frame memory 414 so that it can be used as a predicted reference key signal in processing a subsequent lower-layer key signal.

(4) SCALABLE ENCODING OF A KEY SIGNAL ACCORDING TO A FOURTH EMBODIMENT

This fourth embodiment is a variation of the third embodiment described above. In contrast to the third embodiment in which motion compensation is performed on a higher-layer key signal, the higher-layer key signal is not subjected to motion compensation.

Figure 18:
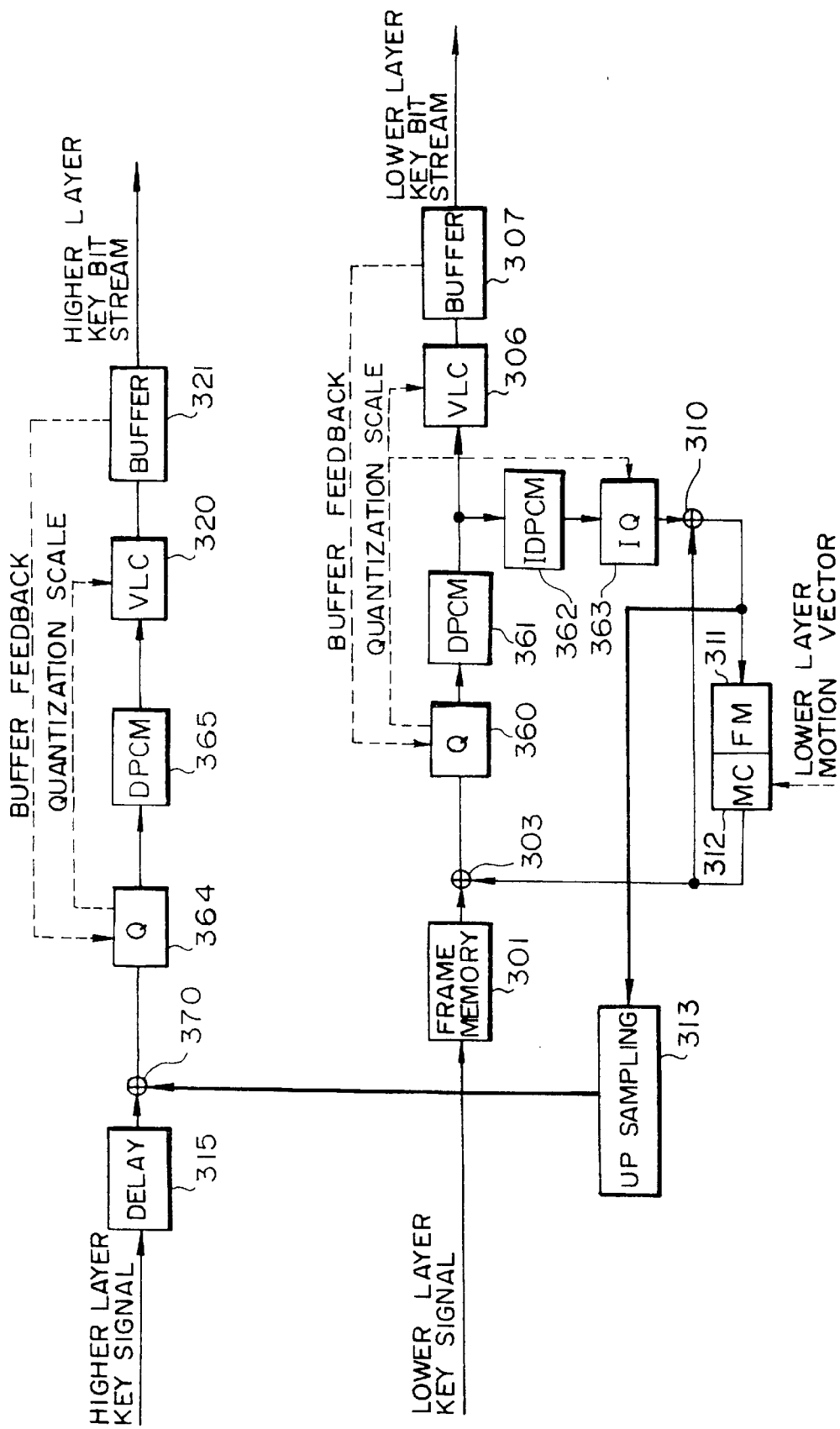
FIG. 18 is a block diagram illustrating a fourth embodiment of a scalable key-signal encoder according to the present invention.

FIG. 18 illustrates an example of a scalable key signal encoding apparatus according to the fourth embodiment of the invention. The decoding process for a lower-layer key signal is performed in a similar manner to the decoding process according to the third embodiment described above, and those parts relating to the process for the lower-layer key signal are denoted by reference numerals similar to those employed in the third embodiment, and they are not described in further detail here. Furthermore, in the decoding process for a higher-layer key signal, some parts are similar to those employed in the third embodiment. Such parts are denoted by similar reference numerals, and they are not described in further detail here. Thus in the following description, only those essential to the fourth embodiment will be described.

In an encoding operation, a predicted lower-layer key signal is output by an arithmetic operation circuit 310 in a local decoder, to a key signal expander 313. The key signal expander 313 expands the predicted lower-layer key signal up to the same size as that of a higher-layer key signal. The expanded signal is supplied to an arithmetic operation circuit 350 as a predicted reference key signal for use in processing the higher-layer key signal. The input higher-layer key signal is delayed by an amount corresponding to the time required to encode the lower-layer key signal, and then supplied to an arithmetic operation circuit 350. The arithmetic operation circuit 350 calculates the difference between the higher-layer key signal and the predicted reference key signal supplied from the key signal expander 313. The resultant key difference signal is supplied to a quantization circuit 360. In the case where the input higher-layer key signal is to be processed in the intraframe prediction encoding mode, the arithmetic operation circuit 350 directly outputs the higher-layer key signal without processing it. The quantization circuit 360 quantizes the key difference signal (in the case of the interframe prediction encoding mode) or a key signal (in the case of the intraframe prediction encoding mode) using a quantization scale determined by the amount of data stored in a transmission buffer 321. The quantized signal is supplied to a DPCM circuit 361. The DPCM circuit 361 performs a DPCM process on the quantized signal. The DPCM-processed signal is supplied to a variable-length encoder 320. The variable-length encoder 320 performs a variable-length encoding process on the DPCM-processed signal and the quantization scale and outputs the result as a bit stream of higher-layer key signal via the transmission buffer 321.

Figure 19:
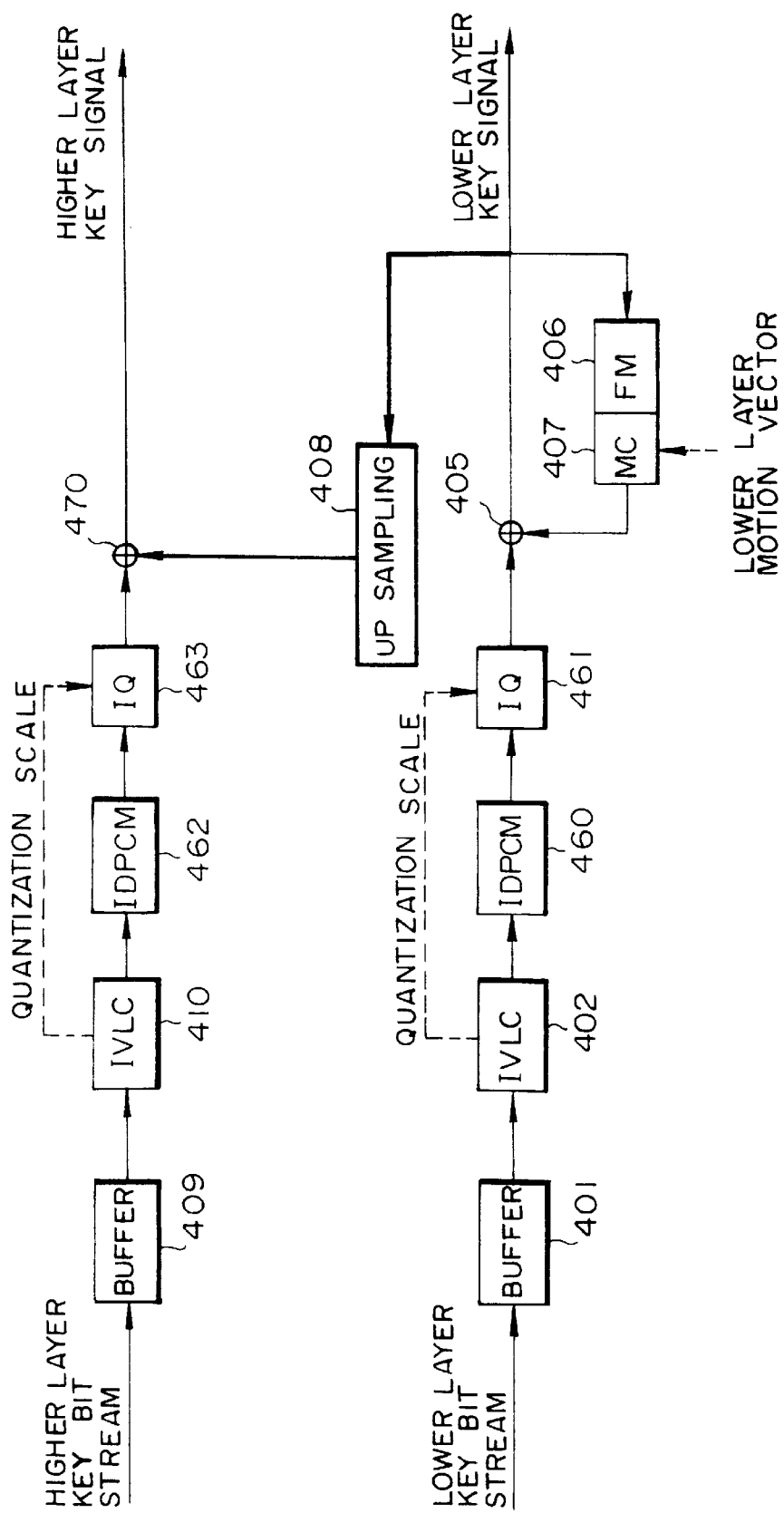
FIG. 19 is a block diagram illustrating a fourth embodiment of a scalable key-signal decoder according to the present invention.

FIG. 19 illustrates an example of a scalable key signal decoding apparatus according to the fourth embodiment of the invention. The decoding process for a lower-layer key signal is performed in a similar manner to the decoding process according to the third embodiment described above, and those parts relating to the process for the lower-layer key signal are denoted by reference numerals similar to those employed in the third embodiment, and they are not described in further detail here. Furthermore, in the decoding process for a higher-layer key signal, some parts are similar to those employed in the third embodiment. Such parts are denoted by similar reference numerals and they are not described in further detail here. Thus in the following descriptions only those essential to the fourth embodiment will be described.

A bit stream of higher-layer key signal is supplied to a variable-length decoder 410 via a reception buffer 409. The variable-length decoder 410 performs a variable-length decoding process on the variable-length-encoded DPCM-processed signal and the quantization scale. The DPCM-processed signal is supplied to an inverse DPCM circuit 462. The inverse DPCM circuit 462 performs an inverse DPCM process on the DPCM-processed signal thereby generating a quantized signal. The generated signal is supplied to an inverse quantization circuit 463. The inverse quantization circuit 463 performs an inverse quantization process on the quantized signal using the quantization scale supplied from the variable-length decoder 410 thereby generating a key difference signal (in the case of the interframe prediction encoding mode) or a key signal (in the case of the intraframe prediction encoding mode). The generated signal is then supplied to an arithmetic operation circuit 470.

On the other hand, a decoded lower-layer key signal is output from an arithmetic operation circuit 405. The decoded lower-layer key signal is output as a reproduced key signal to the outside, and also supplied to a key signal expander 408. If the decoded lower-layer key signal is an I- or P-picture signal, the lower-layer key signal is supplied to a frame memory 406. The frame memory stores the lower-layer key signal so that it can be used as a predicted reference key signal in processing a subsequent lower-layer key signal. The key signal expander 408 expand the supplied lower-layer key signal up to the same size as that of a higher-layer key signal and supplies the expanded key signal to an arithmetic operation circuit 450 for use as a predicted reference key signal in processing the higher-layer key signal.

The arithmetic operation circuit 470 calculates the sum of the key difference signal supplied from the inverse quantization circuit 463 (in the case of the interframe prediction encoding mode) and the predicted reference key signal supplied from the key signal expansion circuit 418 thereby generating a higher-layer key signal. The generated higher-layer key signal is output to the outside. In the case where the output signal of the inverse quantization circuit 463 is a key signal processed in the intraframe prediction encoding mode, the arithmetic operation circuit 470 directly outputs the key signal supplied from the inverse quantization circuit 463 as a higher-layer key signal without processing it.

(5) SCALABLE ENCODING OF A KEY SIGNAL ACCORDING TO A FIFTH EMBODIMENT

This fifth embodiment is a variation of the first embodiment described above. In contrast to the first embodiment in which a higher-layer key signal and a lower-layer key signal are compressed by means of the DCT processing and the quantization processing, the higher-layer key signal and the lower-layer key signal are compressed by means of quad tree encoding in this fifth embodiment.

Figure 20:
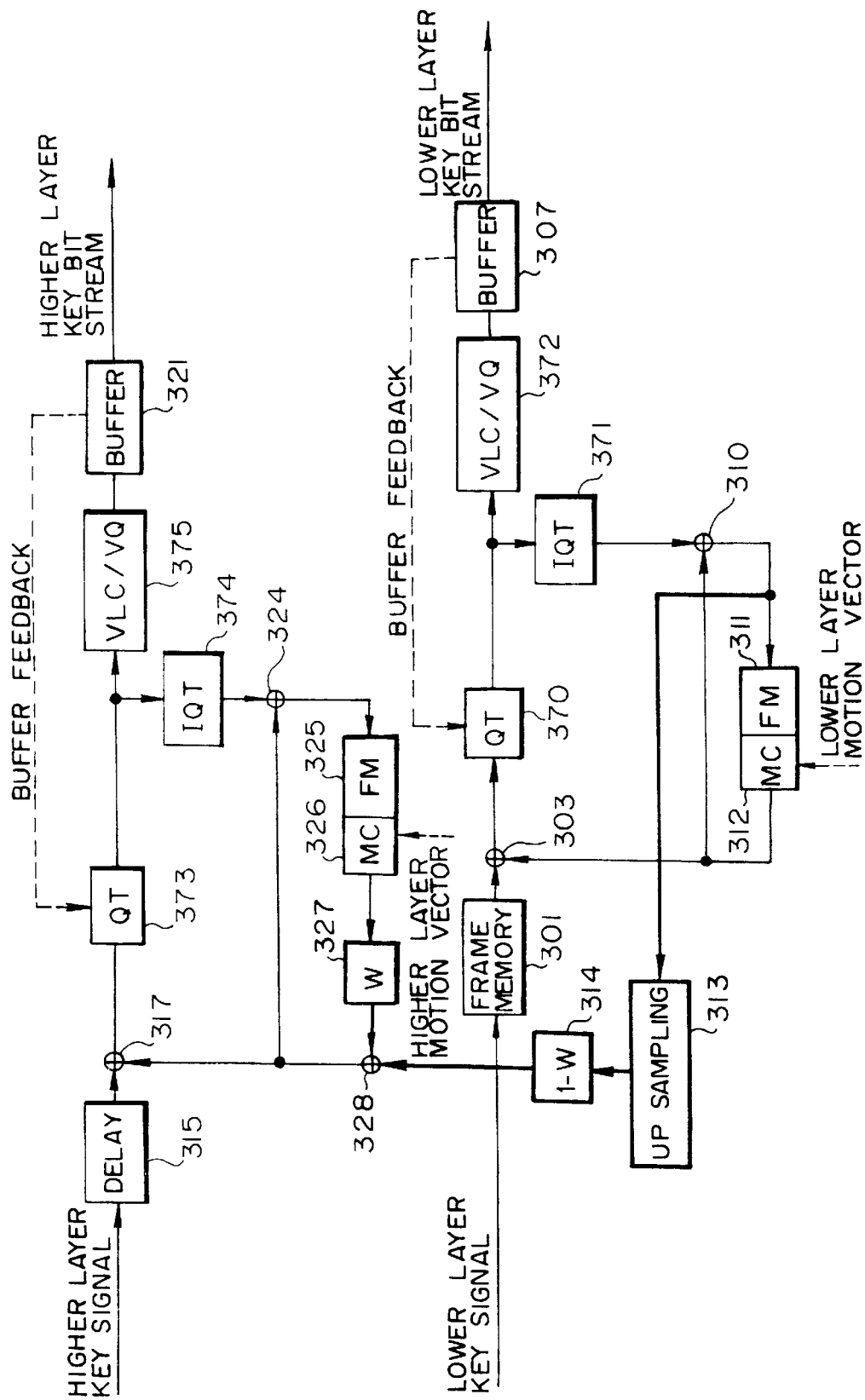
FIG. 20 is a block diagram illustrating a fifth embodiment of a scalable key-signal encoder according to the present invention.

FIG. 20 illustrates an example of a scalable key signal encoding apparatus according to the fifth embodiment of the invention. The processing for the higher-layer key signal and the lower-layer key signal is performed in a manner similar to the encoding process according to the first embodiment except for the DCT processing and the quantization process, and thus those similar parts are denoted by similar reference numerals and they are not described in further detail here. Thus in the following description, only those essential to the fifth embodiment will be described.

Figure 24:
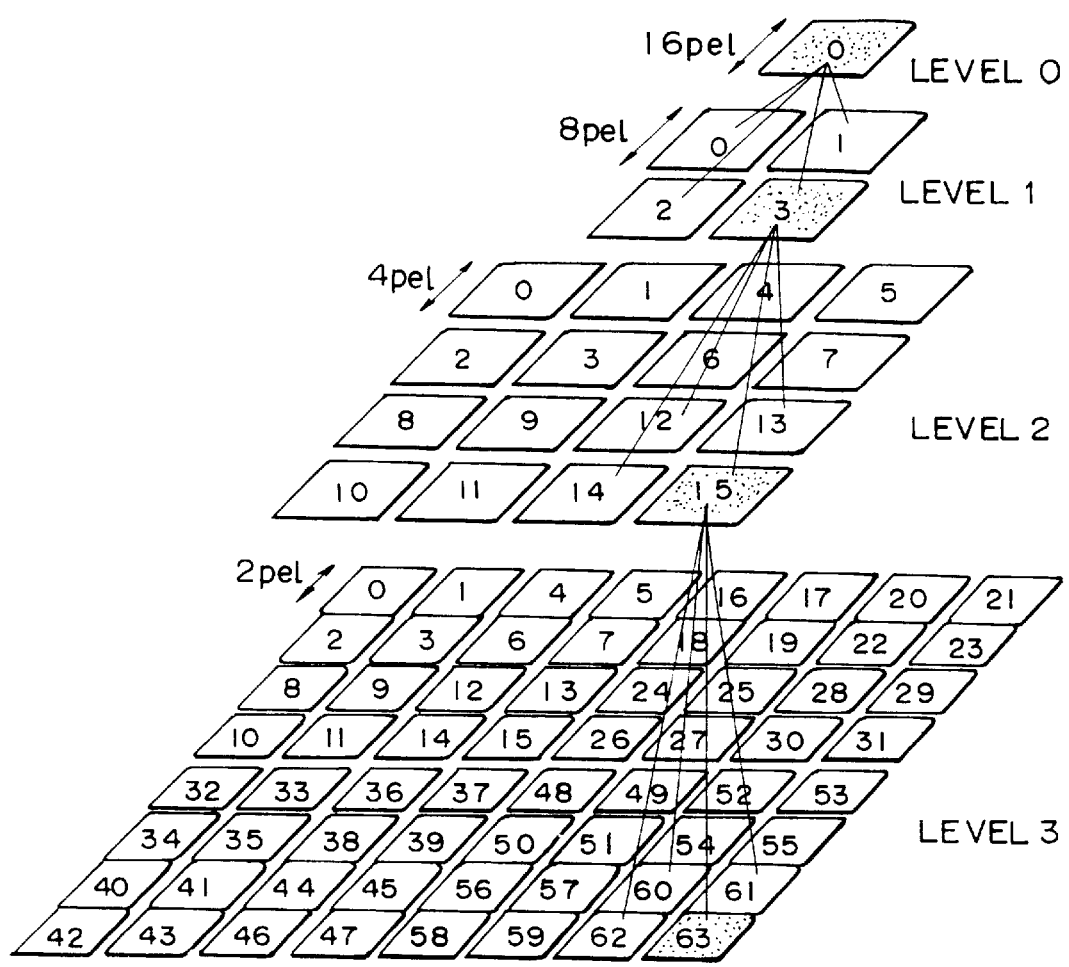
FIG. 24 illustrates a quad tree data structure used in a quad tree encoding process.

As in the first embodiment described above, a lower-layer key signal is supplied to an arithmetic operation circuit 303 via a frame memory 301. A key difference signal (in the case of the interframe prediction encoding mode) or a key signal (in the case of the intraframe prediction encoding mode) are generated in the same manner as in the first embodiment. The generated key difference signal or key signal are supplied to a quad tree encoder 370 via the arithmetic operation circuit 303 in accordance with the amount of data stored in a transmission buffer 307. The quad tree encoder 370 encodes the key signal or the key difference signal in a hierarchical fashion for individual macroblocks. For example, each 2×2 data in a 16×16 macroblock is grouped so as to produce a higher-level block. Similarly, each 2×2 data at the resultant level is grouped so as to produce a further higher level block. The above process is repeated so that a final tree data structure is obtained. In this structure, a value at a higher level depends on a value at a lower level. FIG. 24 illustrates an example of a quad tree structure. The quad-tree-encoded signal output from the quad tree encoder 370 is supplied to an encoder 372. If the given signal is a hard key, the encoder 372 performs a variable-length encoding process on the given quad-tree-encoded signal.

On the other hand, if the given signal is a soft key, the encoder 372 performs a vector quantization process on the quad-tree-encoded signal. The signal encoded by the encoder 372 is output as a bit stream of lower-layer key signal via the transmission buffer 307.

The quad-tree-encoded signal output from the quad tree encoder 370 is also supplied to an inverse quad tree encoder 371. The inverse quad tree encoder 371 performs an inverse quad tree encoding process on the supplied quad-tree-encoded signal thereby generating a difference signal (in the case of the interframe prediction encoding mode) or a key signal (in the case of the intraframe prediction encoding mode) corresponding to the output signal of the arithmetic operation circuit 303. The resultant signal is supplied to an arithmetic operation circuit 310.

The arithmetic operation circuit 310 calculates the sum of the key difference signal supplied from the inverse quantization circuit 310 and a predicted reference key signal supplied from motion compensation circuit 312 thereby generating a predicted key signal. The resultant predicted key signal (in the case where the signal is given as an I- or P-picture signal) is supplied to a frame memory 311 and also to a key signal expander 313 so that it can be used as a predicted reference key signal in processing a subsequent higher-layer key signal as in the first embodiment. The predicted lower-layer reference key signal expanded by the key signal expander 313 is supplied to a weighting circuit 314. The weighting circuit 14 multiplies the predicted lower-layer reference key signal expanded in size by a weighting factor (1−W). The resultant signal is supplied to an arithmetic operating circuit 328. As in the first embodiment, a motion compensation circuit 326 generates a predicted lower-layer reference key signal from the predicted key signal stored in the frame memory 311 according to the higher-layer motion vector and the information of the prediction mode supplied from the image signal encoder 61 shown in FIG. 10. The resultant predicted reference key signal is supplied to the arithmetic operation circuit 303.

On the other hand, the input higher-layer key signal is delayed by a delay circuit 315 composed of memory by an amount of time corresponding to the processing time required for the encoding of the lower-layer key signal. The delayed signal is then supplied to an arithmetic operation circuit 317. The arithmetic operation circuit 317 calculates the difference between the predicted reference key signal for use-in processing the higher-layer key signal, supplied from the arithmetic operation circuit 328, and the input higher-layer key signal. The resultant difference signal is supplied to a quantization circuit 364. In the case where the input higher-layer key signal is to be processed in the intraframe prediction encoding mode, the arithmetic operation circuit 317 directly outputs the higher-layer key signal as a key signal to the quad tree decoder 373 without processing it. The quad tree encoder 373 encodes the key signal or the key difference signal in a hierarchical fashion for individual macroblocks in accordance with the amount of data stored in a transmission buffer 321. The quad-tree-encoded signal output from the quad tree encoder 373 is supplied to an encoder 375. If the given signal is a hard key, the encoder 375 performs a variable-length encoding process on the supplied quad-tree-encoded signal. On the other hand, if the given signal is a soft key, the encoder 375 performs a vector quantization process on the supplied quad-tree-encoded signal. The resultant signal encoded by the encoder 375 is output as a stream of higher-layer key signal via the transmission buffer 321.

The quad-tree-encoded signal output from the quad tree encoder 373 is also supplied to an inverse quad tree encoder 374. The inverse quad tree encoder 374 performs an inverse quad tree encoding process on the supplied signal thereby generating a key difference signal (in the case of the interframe prediction encoding mode) or a key signal (in the case of the intraframe prediction encoding mode) corresponding to the output signal of the arithmetic operation circuit 317. The resultant signal is supplied to an arithmetic operation circuit 324. The arithmetic operation circuit 324 calculates the sum of the key difference signal supplied from the inverse quad tree encoder 374 and a predicted reference key signal supplied from an arithmetic operation circuit 328 thereby generating a predicted key signal. The resultant predicted key signal is supplied to a frame memory 325. The frame memory stores the predicted key signal so that it can be used as a higher-layer reference key signal in processing a subsequent higher-layer key signal.

A motion compensation circuit 326 generates a predicted higher-layer reference key signal according to the higher-layer motion vector and the information of the prediction mode supplied from the image signal encoder 61 shown in FIG. 10, as in the first embodiment described above. The generated signal is supplied to a weighting circuit 327. The weighting circuit 327 multiplies the predicted higher-layer reference key signal supplied from the motion compensation circuit 326 by a weighting factor W. The weighted value of the higher-layer reference key signal is supplied to the arithmetic operation circuit 328. The arithmetic operation circuit 328 calculates the sum of the weighted value of the predicted lower-layer reference key signal supplied from the weighting circuit 314 and the weighted value of the predicted higher-layer reference key signal supplied from the weighting circuit 327 thereby generating a predicted higher-layer reference key signal. The resultant signal is supplied to the arithmetic operation circuit 317. The variable length encoder 320 also performs a variable length encoding process on the weighting factor W supplied from the weighting circuit 327. The result signal is output as a part of the bit stream of higher-layer key signal.

Figure 21:
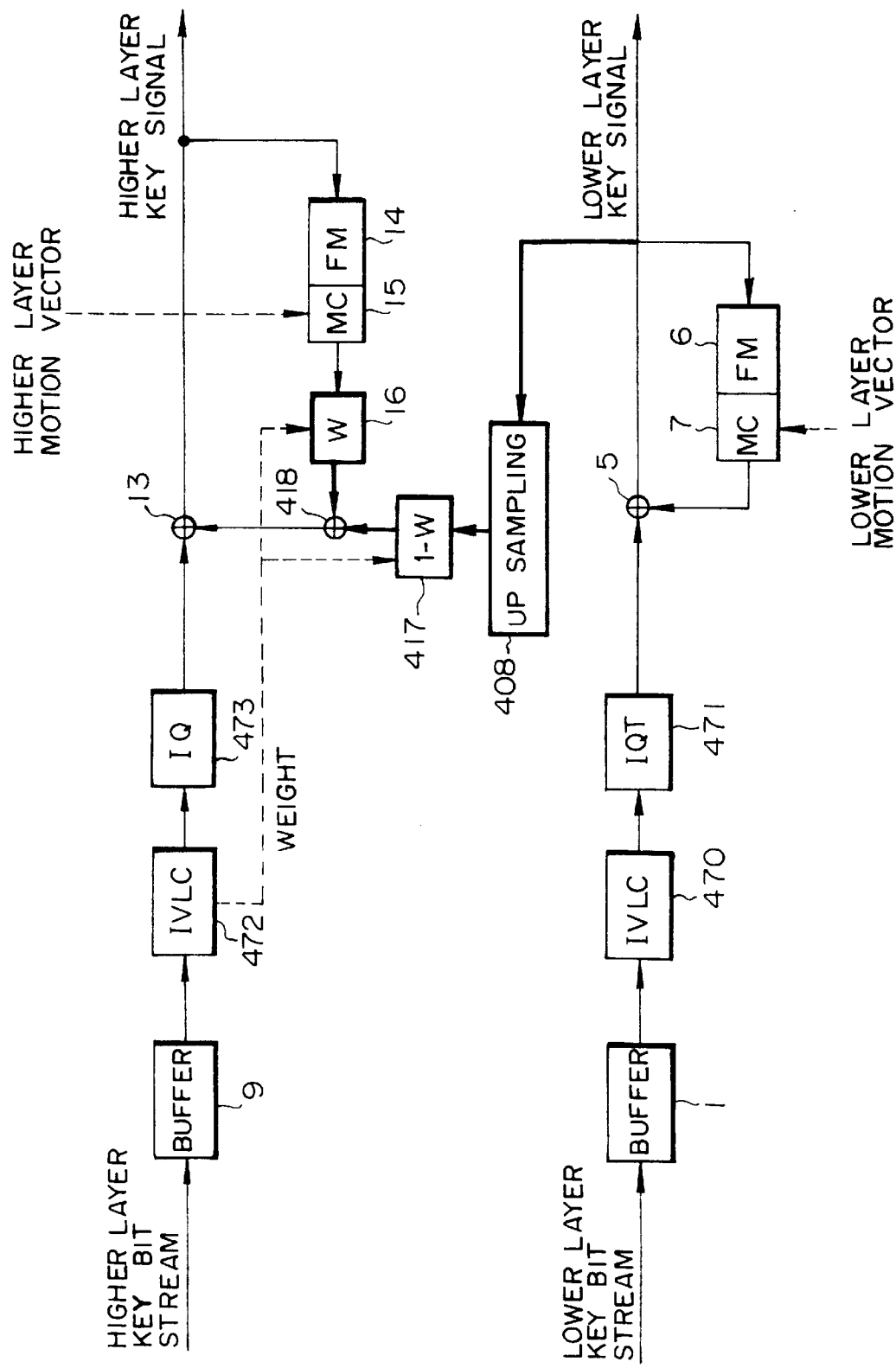
FIG. 21 is a block diagram illustrating a fifth embodiment of a scalable key-signal decoder according to the present invention.

FIG. 21 illustrates an example of a scalable key signal decoding apparatus according to the fifth embodiment of the invention. In this third embodiment, operation except for an inverse DCT process and an inverse quantization on a higher-layer and lower-layer key signals is performed in a similar manner to the decoding process according to the first embodiment described above, and those parts relating to the similar process are denoted by reference numerals similar to those employed in the first embodiment, and they are not described in further detail here. Thus in the following description, only those essential to the fifth embodiment will be described.

A bit stream of lower-layer key signal is supplied to a decoder 470 via a reception buffer 401. The decoder 470 decodes the encoded lower-layer key signal depending on the type of the given signal. In the case where the given lower-layer key signal is a hard key, the lower-layer key signal has been subjected to a variable length encoding process, and thus the decoder 470 performs a variable length decoding process on it thereby generating a quad-tree-encoded lower-layer key signal. On the other hand, in the case where the give lower-layer key signal is a soft key, the lower-layer key signal has been subjected to a vector quantization process, and thus the decoder 470 performs an inverse vector quantization process on the lower-layer key signal thereby generating a quad-tree-encoded lower-layer key signal. The resultant quad-tree-encoded signal is supplied to an inverse quad tree encoder 471. The inverse quad tree encoder 471 performs an inverse quad tree encoding process on the quad-tree-encoded signal thereby generating a key difference signal (in the case of the interframe prediction encoding mode) or a key signal (in the case of the intraframe prediction encoding mode). The generated signal is supplied to an arithmetic operation circuit 405. A motion compensation circuit 407 generates a predicted lower-layer reference key signal according to the lower-layer motion vector and the information of the prediction mode supplied from the image signal decoder 66 shown in FIG. 10B. The generated signal is supplied to an arithmetic operation circuit 405.

The arithmetic operation circuit 405 calculates the sum of the key difference signal supplied from the inverse quad tree encoder 471 and the predicted lower-layer reference key signal supplied from the motion compensation circuit 407 thereby generating a decoded lower-layer key signal. The generated signal is output to the outside. In the case where the output signal of the inverse quad tree encoder 471 is a key signal processed in the intraframe prediction encoding mode, the arithmetic operation circuit 405 directly outputs the key signal as a lower-layer key signal without processing it. In the case where the decoded lower-layer key signal is an I- or P-picture signal, the lower-layer key signal output from the arithmetic operation circuit 405 is stored in a frame memory 406 so that it can be used as a predicted reference key signal in processing a subsequent lower-layer key signal. The lower-layer key signal output from the arithmetic operation circuit 405 is supplied to a key signal expander 408. The key signal expander 408 expands the lower-layer key signal up to the same size as that of a higher-layer key signal. The expanded signal is used as a predicted reference key signal in processing the higher-layer key signal.

On the other hand, a bit stream of higher-layer key signal is supplied to a decoder 472 via a reception buffer 409. The decoder 472 decodes the encoded higher-layer key signal depending on the type of the signal. In the case where the given higher-layer key signal is a hard key, the higher-layer key signal has been subjected to a variable length encoding process, and thus the decoder 472 performs a variable length decoding process on it thereby generating a quad-tree-encoded higher-layer key signal. On the other hand, in the case where the give higher-layer key signal is a soft key, the higher-layer key signal has been subjected to a vector quantization process, and thus the decoder 472 performs an inverse vector quantization process on the higher-layer key signal thereby generating a quad-tree-encoded higher-layer key signal. The resultant quad-tree-encoded signal is supplied to an inverse quad tree encoder 473. The inverse quad tree encoder 473 performs an inverse quad tree encoding process on the quad-tree-encoded signal thereby generating a key difference signal (in the case of the interframe prediction encoding mode) or a key signal (in the case of the intraframe prediction encoding mode). The generated signal is supplied to an arithmetic operation circuit 413. A motion compensation circuit 415 generates a predicted higher-layer reference key signal according to the motion vector and the information of the prediction mode supplied from the image signal decoder 66 shown in FIG. 10B thereby generating a predicted higher-layer reference key signal. The resultant signal is supplied to a weighting circuit 416. The weighting circuit 416 multiplies the predicted higher-layer reference key signal supplied from the variable-length decoder 410 by the decoded weighting factor W. The weighted value of the predicted higher-layer reference key signal is supplied to an arithmetic operation circuit 418. The lower-layer key signal expanded by the key signal expander 408 is supplied to a weighting circuit 417. The weighting circuit 417 multiplies the expanded lower-layer key signal by a weighting factor (1−W) using the decoded value W supplied from the variable-length decoder 410. thereby generating a weighted value of the predicted lower-layer reference key signal. The generated signal is supplied to the arithmetic operation circuit 418.

The arithmetic operation circuit 418 calculates the sum of the weighted value of the predicted higher-layer reference key signal supplied from the weighting circuit 416 and the weighted value of the predicted lower-layer reference key signal supplied from the weighting circuit 417 thereby generating a predicted reference key signal for use in processing the higher-layer key signal. The resultant signal is supplied to the arithmetic operation circuit 413.

The arithmetic operation circuit 413 calculates the sum of the key difference signal (in the case of the interframe prediction encoding mode) supplied from the inverse quad tree encoder 473 and the predicted higher-layer reference key supplied from the arithmetic operation circuit 418 thereby generating a decoded higher-layer key signal. The generated signal is output to the outside. In the case where the output of the inverse quad tree encoder 473 is a key signal processed in the intraframe prediction encoding mode, the arithmetic operation circuit 413 directly outputs the key signal as a lower-layer key signal without processing it. The lower-layer key signal output from the arithmetic operation signal 413 is stored in a frame memory 414 so that it can be used as a predicted lower-layer reference key signal in processing a subsequent lower-layer key signal.

(6) SCALABLE ENCODING OF A KEY SIGNAL ACCORDING TO A SIXTH EMBODIMENT

This sixth embodiment is a variation of the fifth embodiment described above. In contrast to the fifth embodiment in which motion compensation is performed on a higher-layer key signal, motion compensation is not performed on the higher-layer key signal in this sixth embodiment.

Figure 22:
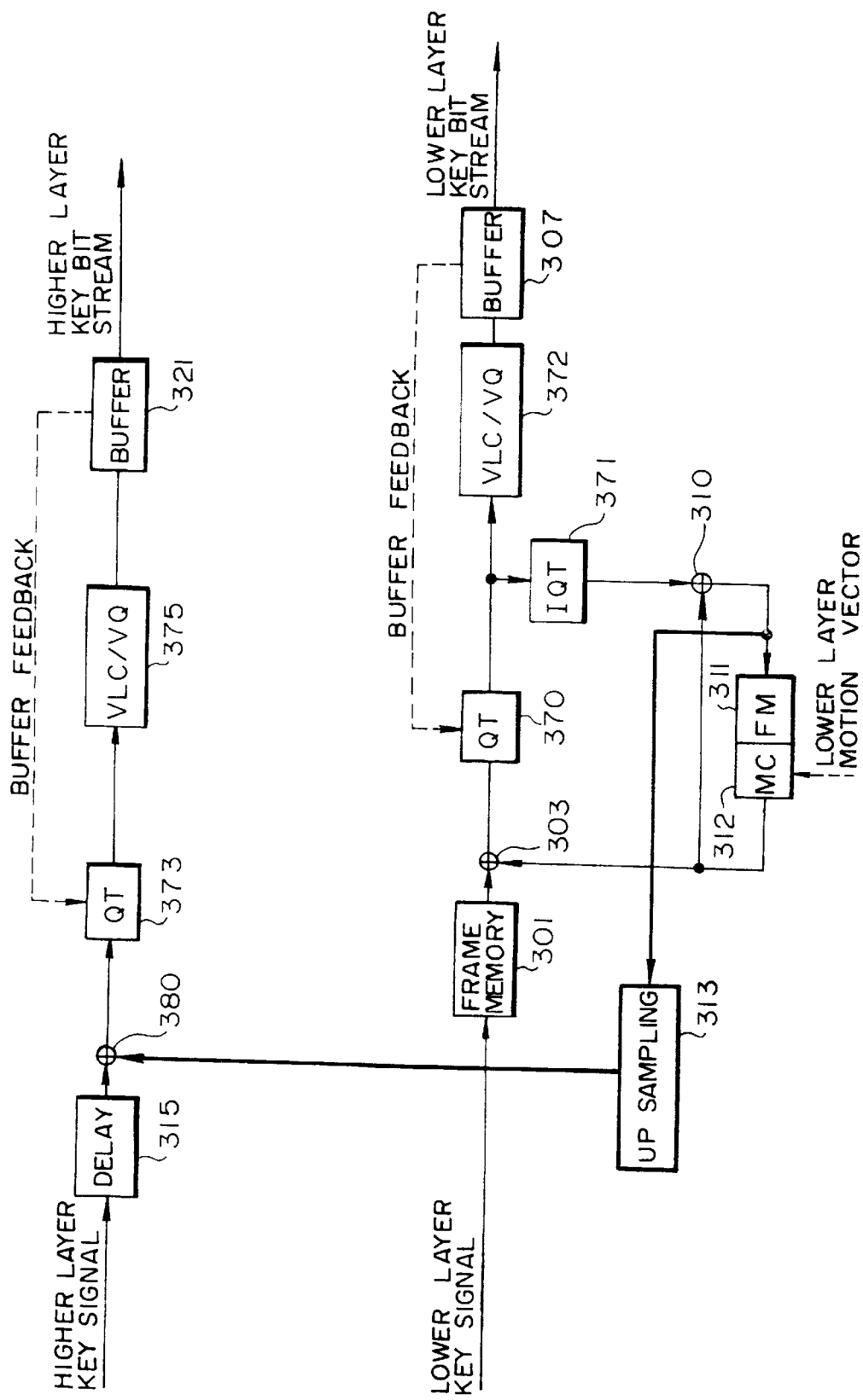
FIG. 22 is a block diagram illustrating a sixth embodiment of a scalable key-signal encoder according to the present invention.

FIG. 22 illustrates an example of a scalable key signal encoding apparatus according to the sixth embodiment of the invention. The decoding process for a lower-layer key signal is performed in a similar manner to the decoding process according to the fifth embodiment described above, and those parts relating to the process for the lower-layer key signal are denoted by reference numerals similar to those employed in the fifth embodiment, and they are not described in further detail here. Furthermore, in the decoding process for a higher-layer key signal, some parts are similar to those employed in the fifth embodiment. Such parts are denoted by similar reference numerals and they are not described in further detail here. Thus in the following description, only those essential to the sixth embodiment will be described.

In an encoding operation, a predicted lower-layer key signal is output by an arithmetic operation circuit 310 in a local decoder, and supplied to a key signal expander 313. The key signal expander 313 expands the predicted lower-layer key signal up to the same size as that of a higher-layer key signal. The expanded signal is supplied to an arithmetic operation circuit 350 as a predicted reference key signal for use in processing the higher-layer key signal. The input higher-layer key signal is delayed by an amount of time corresponding to the time required to encode the lower-layer key signal, and then supplied to an arithmetic operation circuit 380. The arithmetic operation circuit 380 calculates the difference between the input higher-layer key signal and the predicted reference key signal supplied from the key signal expander 313. The resultant key difference signal is supplied to a quantization circuit 360. In the case where the input higher-layer key signal is to be processed in the intraframe prediction encoding mode, the arithmetic operation circuit 350 directly outputs the higher-layer key signal without processing it. The quad tree encoder 370 performs a quad tree encoding process on the key difference signal (in the case of the interframe prediction encoding mode) or a key signal (in the case of the intraframe prediction encoding mode) according to the amount of data stored in a transmission buffer 307 thereby generating a quad-tree-encoded signal. The generated signal is supplied to an encoder 372. In the case where the given signal is a hard key, the encoder 372 performs a variable length encoding process on the quad-tree-encoded signal. On the other hand, if the given signal is a soft key, the encoder 372 performs a vector quantization on the quad-tree-encoded signal. In each case, the resultant signal is output as a bit stream of higher-layer key signal via the transmission buffer 321.

Figure 23:
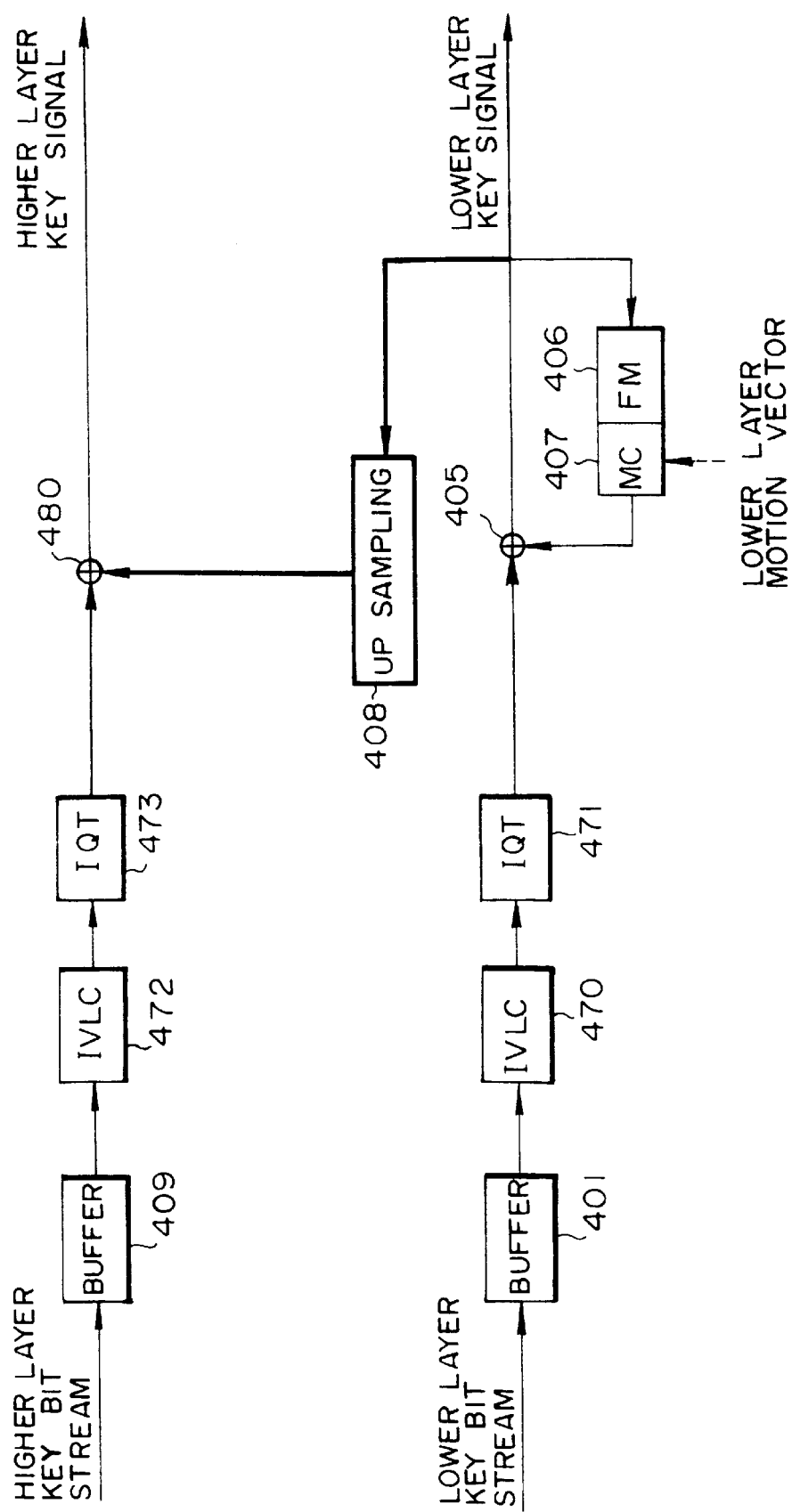
FIG. 23 is a block diagram illustrating a sixth embodiment of a scalable key-signal decoder according to the present invention.

FIG. 23 illustrates an example of a scalable key signal decoding apparatus according to the sixth embodiment of the invention. The decoding process for a lower-layer key signal is performed in a similar manner to the decoding process according to the third embodiment described above, and those parts relating to the process for the lower-layer key signal are denoted by reference numerals similar to those employed in the third embodiment, and they are not described in further detail here. Furthermore, in the decoding process for a higher-layer key signal, some parts are similar to those employed in the third embodiment. Such parts are denoted by similar reference numerals and they are not described in further detail here. Thus in the following description, only those essential to the sixth embodiment will be described.

A bit stram of higher-layer key signal is supplied to a decoder 472 via a reception buffer 409. The decoder 472 decodes the encoded higher-layer key signal depending on the type of the given signal. In the case where the given higher-layer key signal is a hard key, the higher-layer key signal has been subjected to a variable length encoding process, and thus the decoder 472 performs a variable length decoding process on it thereby generating a quad-tree-encoded higher-layer key signal. On the other hand, in the case where the give higher-layer key signal is a soft key, the higher-layer key signal has been subjected to a vector quantization process, and thus the decoder 472 performs an inverse vector quantization process on the higher-layer key signal thereby generating a quad-tree-encoded higher-layer key signal. The resultant quad-tree-encoded signal is supplied to an inverse quad tree encoder 473. The inverse quad tree encoder 473 performs an inverse quad tree encoding process on the quad-tree-encoded signal thereby generating a key difference signal (in the case of the interframe prediction encoding mode) or a key signal (in the case of the intraframe prediction encoding mode). The generated signal is supplied to an arithmetic operation circuit 480.

The arithmetic operation circuit 480 calculates the sum of the key difference signal (in the case of the interframe prediction encoding mode) supplied from the inverse quad tree encoder 473 and the predicted reference key signal supplied from the key signal expander 408 thereby generating a higher-layer key signal. The generated higher-layer key signal is output to the outside. In the case where the output signal of the inverse quad tree encoder 473 is a key signal processed in the intraframe prediction encoding mode, the arithmetic operation circuit 480 directly outputs the key signal supplied from the inverse quad tree encoder 473 without processing it.

In the above first through sixth embodiments, methods of encoding a key signal in a scalable fashion are described. Although the scaling is performed in terms of space in these embodiment, the invention may also be applied to temporal scaling and SNR scaling. In each case, key signals may be encoded in a manner similar to image signals. (That is, a key signal is regarded as an image signal having the same magnitude as a luminance signal.)

Furthermore, the present invention may also be applied to other methods of encoding the key signal and key difference signal different from those disclosed in the above embodiments.

3. METHOD OF IMPORVING THE EFFICIENCY IN SPATIALLY-SCALABLE ENCODING AND RELATED SYNTAX

A method of improving the coding efficiency in the scalable image signal encoding will be described below. In the MPEG2 standard, various scaling techniques are prescribed. However, these scaling techniques are optimized at rather high bit rates. Therefore, these scaling techniques lead to redundancy at lower bit rates. The coding efficiency can be improved by removing such redundancy.

In this embodiment, the encoding mode for a higher-layer signal is determined depending on the encoding mode for a lower-layer signal. Syntax in the present embodiment is as follows.

The scalability can be realized either by constructing a bit stream in each layer with one session or by introducing a scalable layer in a VOP layer. In the former technique, a session header is added to each bit stream in higher and lower layers thereby distinguishing them. In the latter technique, only one session header is used, and a lower layer and a higher layer are identified by a syntax layer VOP layer header. Although either technique may be employed in the present invention, it is assumed in the following description that the latter technique is used.

Hereinafter, the syntax of a bit stream will be represented by the syntax used in the ISO standard document. The syntax will be described only for those parts which are essential to the present invention.

FIG. 25 illustrates session layer syntax.

In FIG. 25, the "session layer" corresponds to a sequence layer defined in the MPEG2 standard. "number_of_scalable_layers" represents the number of scalable layers. For each scalable layer of number_of_scalable_layers, scalable_mode, scalable_layer_dependency, more_than_one_VOP, session_width, and session_height are defined.

"scalable_mode" is a flag indicating the mode of scaling process. When "scalable_mode" is "01", it indicates a spatial scaling mode, and "11" indicates a temporal scaling mode.

"scalable_layer_dependency" is a flag indicating whether the higher-layer encoding mode depends on the lower-layer mode. When "scalable_layer_dependency" is equal to "1", the higher-layer mode depends on the lower-layer mode.

The size of a session or the size of a scalable layer frame is represented by "session_width," and "session_height."

"more_than_one_VOP" is a 1-bit flag indicating whether the session of interest includes only one VOP or a plurality of VOPs. If "more_than_one_VOP" is equal to "1", the session includes a plurality of VOPs. If "more_than_one_VOP" is equal to "0", the session includes only one VOP as is the case in MPEG or H.263. In this case, encoding is performed frame by frame.

FIG. 26 illustrates the syntax of "VOP layer". "VOP layer" corresponds to a picture layer in the MPEG2 standard. However, "VOP layer" has some additional features and only those features of the syntax of "VOP layer" will be described below.

"VOP_scl_layer_ID" is a flag indicating a particular scalable layer. A base layer is denoted by "0".

FIG. 27 shows the syntax associated with "macroblock layer." In FIG. 27, there is shown a particular example in which "scalable_layer_dependency" is equal to 0. "COD" is a flag indicating whether the macroblock of interest includes more data. When "COD" is equal to 0, there is no more data in the macroblock (skip macroblock).

"MCBPC" is a variable-length flag specifying "macroblock_type" and "CBPC." FIG. 28 shows macroblock types available in the lower layer and FIG. 29 shows macroblock types of an enchantment layer. In FIG. 29, "compatible" denotes such a macroblock which are only spatially-predicted from a lower-layer macroblock. This type of macroblock includes no quantization scale. "compatible+Q" denotes such a macroblock which is similar to the "compatible" type of macroblock but it includes a quantization scale.

In macroblock layers, when "spatial_temporal_weight_code_flag" is equal to "1", macroblock_type is one of the following types: INTER (interframe-prediction-encoded macroblock with no quantization scale); INTER+Q (interframe-prediction-encoded macroblock with a quantization scale); or INTER4V (8×8 motion-compensated macroblock). In this case, spatial_temporal_weight_code is transmitted. spatial_temporal_weight_code is a 1-bit flag indicating whether a macroblock of the above-described type should be processed simply in the temporal prediction mode or a hybrid mode of spatial and temporal prediction. "CBPC" is a flag indicating whether there is a data in a block of a color difference signal.

The prediction mode of an enhancement layer is determined depending on the macroblock type as follows. There are three classes in the prediction associated with an enhancement layer, indicated by spatial_temporal_weight_class. They are:

class0: only temporal prediction is performed;

class1: combination of temporal and spatial prediction; and class2: only spatial prediction is performed.

When a macroblock is of the "Intra" type (intraframe-prediction-encoded macroblock with no quantization scale) or the "Intra+Q" type (intraframe-prediction-encoded macroblock with a quantization scale), spatial_temporal_weight_class has a value of 0, that is the spatial_temporal_weight_class is class0. On the other hand, when a macroblock is of the "Compatible" type or the "Compatible+Q" type, spatial_temporal_weight_class has a value of 2, that is the spatial_temporal_weight_class is class2. In the other cases, that is when a macroblock is of the "Inter," Inter+Q," or "Inter4V" type, spatial_temporal_weight_class cannot be determined uniquely only from macroblock_type. In such a case, spatial_temporal_weight_code_flag has a value of 1 (refer to FIG. 31), and spatial_temporal_weight_code is transmitted in macroblock_layer.

FIG. 30 shows the relationship between spatial_temporal_weight_class and spatial_temporal_weight_code transmitted. When scalable_layer_dependency is equal to 0, the prediction mode is determined for each macroblock as described above. In contrast, when scalable_layer_dependency is equal to 1, the prediction mode is determined as follows. In this case, no information about the macroblock type is transmitted in the higher layer. Thus, the macroblock type in the higher layer is determined from the macroblock type in the lower layer. If the higher-layer frame size is for example twice the lower-layer frame size, there are four higher-layer macroblocks corresponding to each lower-layer macroblock.

The macroblock type in the higher layer is determined as follows.

A: When the lower-layer COD is equal to 0, the lower-layer macroblock of interest is a skip macroblock, and thus a copy of a lower-layer reference frame at a corresponding location is produced. In this case, the higher-layer macroblock becomes a skip macroblock, and a copy of a higher-layer reference frame at a corresponding location is produced. However, neither COD nor any other data is transmitted in the corresponding higher-layer macroblock.

B: When the lower-layer COD is equal to 1, the lower-layer macroblock of interest includes some data. Whether each luminance block in the lower-layer macroblock includes some data or not is indicated by a flag called CBPY. When the lower-layer macroblock of the "INTRA" type of "INTRA+Q" type, the corresponding higher-layer macroblock must be of the "compatible" type or "compatible+Q" type, and thus the macroblock is processed in the spatial prediction mode. (Alternatively, the higher-layer macroblock may be of the "INTRA" type or "INTRA+Q" type so that it becomes of the same type as the lower-layer macroblock.)

C: When the lower-layer macroblock is of the "INTER," "INTER+Q," or "INTER4V" type, the corresponding higher-layer macroblock must be of a temporally-predicted or a spatially-predicted macroblock. Whether each block in the lower layer includes some data or not is indicated by a flag called CBP. There is one higher-layer macroblock corresponding to each lower-layer block. For those higher-layer macroblocks corresponding to lower-layer blocks having no transmitted data, only temporal prediction is performed. In this case, the temporal prediction is performed on the basis of a higher-layer reference frame. That is, the macroblock_type of the higher-layer macroblock becomes equal to that of the lower-layer block and thus the macroblock_type is INTER, INTER+Q, or INTER4V.

D: When the lower-layer macroblock type is INTER, INTER+Q, or INTER4V, higher-layer macroblocks corresponding to lower-layer macroblocks having transmitted data are subjected only to spatial prediction. In this case, the prediction is performed only from the lower-layer data, and a higher-layer macroblock corresponding to an INTER- or INTER4V-type lower-layer macroblock becomes of the Compatible type while a higher-layer macroblock corresponding to an INTER+Q type lower-layer macroblock becomes of the Compatible+Q type. (Alternatively, both spatial and temporal prediction may be performed for the above-described macroblocks. In this case, the type of the higher-layer macroblock becomes equal to the type of the corresponding lower-layer macroblock, and thus the type of the higher-layer macroblock is INTER, INTER+Q, or INTER4V. spatial_temporal_weight_class has a value of 1.)

The type of a higher-layer macroblock is determined in the manner described above and thus no information indicating the type of the higher-layer macroblock is transmitted. On the other hand, flags associated with a higher-layer macroblock which are transmitted include COD, CBPC, CBPC, DQUANT (a flag indicating the difference between the quantization scale for the current macroblock and that for the previous macroblock), MVD (motion vector or the deviation from the predicted value), and MVD2–4 (motion vector associated with remaining INTRA4V macroblocks (deviation from the predicted value)). Whether these flags are transmitted or not is determined in accordance with the type of a higher-layer macroblock of interest.

The above-described method of determining the higher-layer prediction mode in accordance with the lower-layer prediction mode may be applied to any of embodiments of the present invention.

4. SYNCHRONIZATION AMONG VOPS

When an image is encoded separately for each VOP, respective VOPs are synchronized according to the method described below. This method ensures that the respective VOPs are synchronized even when images are displayed in a random access fashion or in a scaled fashion. This synchronization method may be used not only in conjunction with the scalable encoding but also in conjunction with any encoding technique in which an image is encoded for each VOP. Furthermore, the synchronization method may be applied to any embodiment disclosed herein.

FIG. 32 shows header information associated with a VOP layer. The displaying timing of a VOP is indicated by a flag called VOP_temp_ref. VOP_temp_ref indicates a time interval from the displaying time of a previous VOP. Thus, the display time for all frames of a certain VOP can be determined from a frame to a next frame. However, it is impossible to achieve synchronization among different VOPs. Let us assume that images are displayed at a fixed frame rate. Assume further that a session includes four VOPs as shown in FIG. 33. As can be seen from FIG. 33A, only a VOP4 is displayed at first two frame times (t1, t2). At the 3rd frame time (t3), VOP1, VOP3, and VOP4 are displayed. For simplicity, it is further assumed that each VOP includes only a P-picture or an I-picture.

To display VOPs as shown in FIG. 33, it is required that all VOPs, which are to be displayed at a particular time, have already been decoded before that particular time. To satisfy the above requirement, it is needed that VOPs which are to be displayed at the same time (or within a particular short time period in the case where VOPs are displayed at a variable frame rate)should be transmitted all at once. In the case of FIG. 33, the bit stream carries the data of VOP4 at times t1 and t2, and the data of VOP1, VOP3, and VOP4 at time t3. Thus, the bit stream carries VOPs as shown in FIG. 33B. If we make it a rule to display VOPs in the order of increasing VOP_IDs at any given time, it is possible to definitely determine the displaying time for all VOPs. For example, the transition from time t2 to time t3 can be known by a transition in VOP_ID from 4 to 1.

Figure 34:
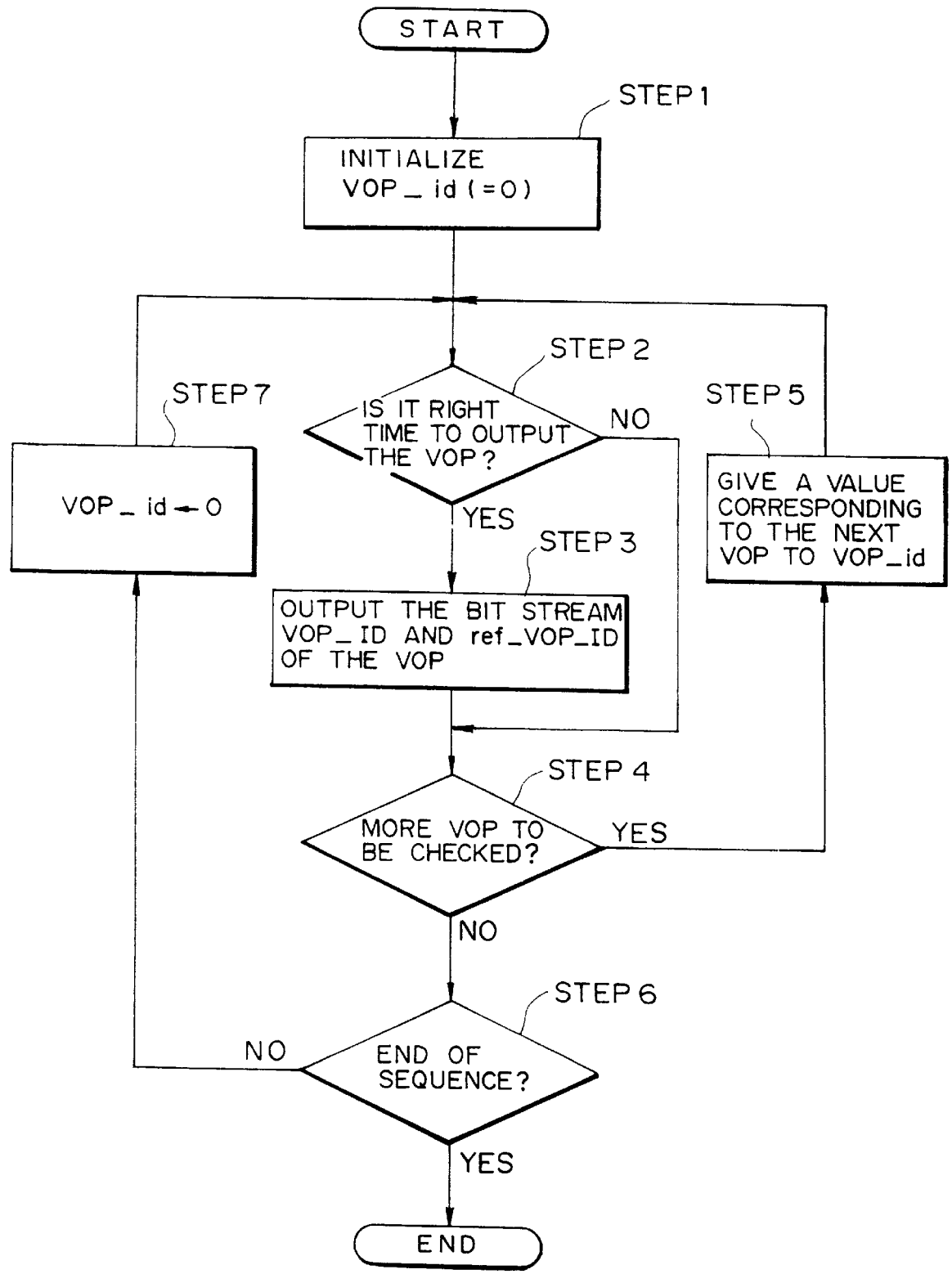
FIG. 34 is a flowchart illustrating a method of determining transmission order when transmitting a plurality of VOPs in the form of a bit stream at a fixed frame rate and a method of transmitting the VOPs in the determined order, according to the present invention.

FIG. 34 is a flowchart illustrating a method of determining transmission order when transmitting a plurality of VOPs in the form of a bit stream at a fixed frame rate and then transmitting the VOPs in the determined order. In practical operation, the transmission order for particular VOPs in a bit stream is determined by the multiplexer shown in FIG. 8A.

In FIG. 34, VOP_ID is initialized in step 1. Then in the next step 2, it is judged whether it is the right time to transmit a first VOP. If it is concluded that it is the right time to transmit it, the process goes to step 3 to transmit a bit stream of the VOP (frame), a flag indicating the displaying timing of that frame, VOP_temp_ref, and VOP_ID. Then the process goes to step 4. On the other hand, if it is concluded in step 2 that it is not the right time to transmit the VOP, the process goes to step 4. In step 4, it is judged whether there is a VOP which has not been checked yet in terms of the displaying timing or whether there is another VOP to be checked. If there is a VOP to be checked, the process goes to step 5, and VOP_ID is incremented or given a value corresponding to the next VOP in preparation for judgment on the next VOP. The process then returns to step 2 and it is judged whether a bit stream of the next VOP (frame) should be transmitted. On the other hand, if it is concluded in step 4 that all VOPs have already been checked for that particular time, the process goes to step 6. In step 6, it is judged whether the sequence has arrived at its end. If the judgment conclusion is negative, the process goes to step 7. In step 7, VOP_ID is reset to 0 in preparation for judgment on the next transmission timing for remaining VOPs (frames), and the process returns to step 2 to make a judgment on the next transmission timing. On the other hand, if it is concluded in step 6 that the sequence has arrived at its end, the VOP transmission process is completed.

VOPs are transmitted in the form of a bit stream in the transmission order determined in the above-described manner, and supplied to the demultiplexer 39 shown in FIG. 8B. The demultiplexer 39 supplies demultiplexed bit streams of VOPs to the respective VOP decoders located at the stage following the demultiplexer 39.

In the case where a fixed frame rate is employed, synchronization among VOPs can be achieved as described above. When the frame rate is variable, synchronization is achieved as follows. In the case of the variable frame rate, it is needed that VOPs which are to be displayed or within a particular short time period should be transmitted all at once. Furthermore, it is also required to transmit the information indicating the displaying timing of the first frame in each VOP. If the time at which the first frame in each VOP is to be displayed is specified, the displaying time of the remaining frames in each VOP may be determined in a frame-to-frame fashion by flags (VOP_temp_ref) indicating the delay times of the respective frames with reference to the previous frame. In the case of the first frame in each VOP, ref_VOP_id will also be transmitted in addition to VOP_temp_ref as will be described in further detail later.

Now let us assume that two VOPs are displayed at different frame rates as shown in FIG. 35. In FIG. 35A, the time axis is graduated in minimum units of time intervals. In the specific example shown in FIG. 35, a frame of VOP2 is displayed first. Because this is the first frame of VOP2, VOP_temp_ref has a value of 0 as shown in FIG. 35B. No other VOPs (VOP1 in this case) have been displayed before the first frame of the VOP2, and thus ref_VOP_id has a value of 2. A second frame of VOP2 is then displayed after 3 units of time intervals. Thus VOP_temp_ref associated with this second frame has a value of 3. Thus the values of VOP_temp_ref associated with the successive frames of VOP2 are 0, 3, 2, . . . as shown in FIG. 35B.

On the other hand, a first frame of VOP1 is displayed after one unit of time interval from the second frame of VOP2. In this specific example, VOP_temp_ref associated with the first frame of VOP1 has a value indicating the time delay from the immediately previos frame (the second frame of VOP2 in this example) of the other VOP (VOP2 in this example). Furthermore, ref_VOP_id transmitted in conjunction with VOP1 specifies the ID of VOP which is referred to by VOP_temp_ref. That is, VOP_temp_ref and ref_VOP_id associated with the first frame of VOP1 are 1 and 2, respectively. As described above, ref_VOP_id is transmitted only in conjunction with the first frame of each VOP which is to be displayed in each VOP, and VOP_temp_ref associated with the first frame of VOP1 indicates the time delay from the previously-displayed frame of a VOP having VOP_ID specified by ref_VOP_id associated with the VOP1. In the specific example shown in FIG. 35, ref_VOP_id associated with the first frame of VOP1 has a value of 2 (and thus specifies VOP2), and VOP_temp_ref has a value 1, 2, 4, . . . for the first and subsequent frames of VOP1. The syntax relating to the above example is shown in FIG. 36.

Figure 37:
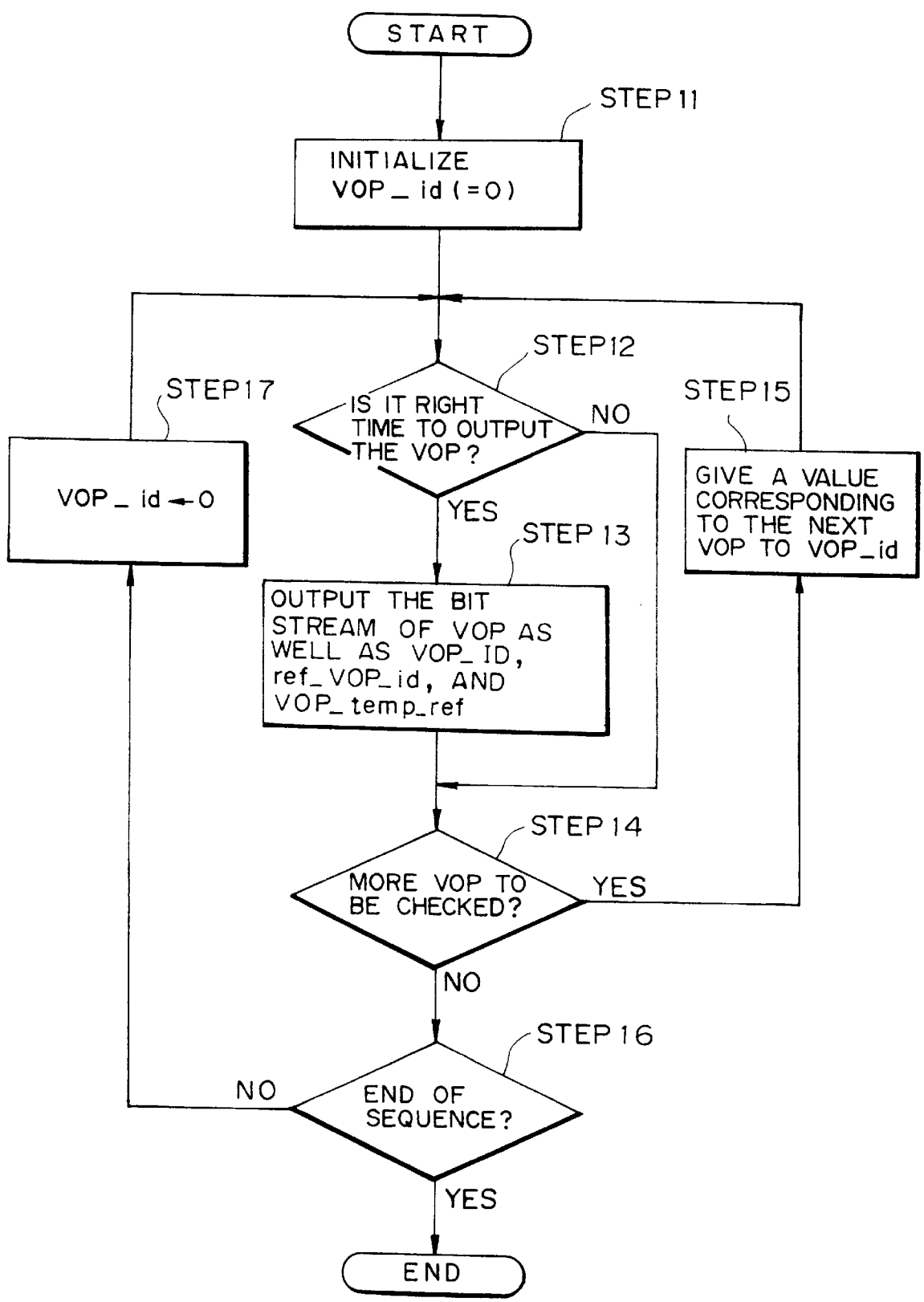
FIG. 37 is a flowchart illustrating a method of determining transmission order when transmitting a plurality of VOPs in the form of a bit stream at a variable frame rate and a method of transmitting the VOPs in the determined order, according to the present invention.

In the above example, VOPs are transmitted in the form of a bit stream in the transmission order shown in FIG. 35C. The data associated with the first frame of VOP1 should be transmitted after the data associated with the second frame of VOP2. Similarly, all data are multiplexed so that any frames adjacent in the displaying time are adjacent in the transmission order and thus frames are transmitted in the same order as the displaying order. The procedure of determining the transmission order of VOPs and then transmitting a bit stream of VOPs in the determined order is shown in the flowchart of FIG. 37 for the case where image is displayed at a variable frame rate. The transmission order is determined by the multiplexer shown in FIG. 8A and a bit stream of VOPs are transmitted in the determined transmission order from the multiplexer.

In step 11 of FIG. 37, VOP_ID is initialized and then the process goes to step 12. In step 12, it is judged whether it is the right time to transmit a first VOP. If it is concluded that it is the right time to transmit the first VOP, then the process goes to step 13. In step 13, a bit stream of that VOP (frame) is transmitted together with flags of ref_VOP_id (only when the first frame of the VOP is transmitted), VOP_temp_ref, and VOP_ID. The process then goes to step 14. On the other hand, if it is concluded in step 12 that it is not the right time to transmit the VOP, the process goes to step 14. In step 14, it is judged whether there is a remaining VOP which has not been checked yet in terms of the displaying timing. That is, it is judged whether there is a more VOP to be checked. If it is concluded that there is a more VOP to be checked, the process goes to step 15. In step 15, VOP_ID is incremented or given a value corresponding to the next VOP in preparation for judgment on the next VOP. The process then returns to step 12 to judge whether a bit stream of the next VOP (frame) should be transmitted. On the other hand, if it is concluded in step 14 that all VOPs have already been checked for that particular time, the process goes to step 16. In step 16, it is judged whether the sequence has arrived at its end. If the judgment conclusion is negative, the process goes to step 17. In step 17, VOP_ID is reset to 0 in preparation for judgment on the next transmission timing for remaining VOPs (frames), and the process returns to step 2 to make a judgment on the next transmission timing. On the other hand, if it is concluded in step 16 that the sequence has arrived at its end, the VOP transmission process is completed.

Thus a bit stream of VOPs is transmitted together with flags (ref_VOP_id, VOP_temp_ref) in the transmission order determined in the above-described manner, and supplied to the demultiplexer 39 shown in FIG. 8B. In accordance with the flags, the demultiplexer 39 supplies demultiplexed bit streams of VOPs to the respective VOP decoders located at the stage following the demultiplexer 39.

Figure 38A:
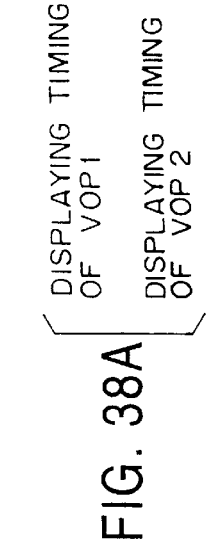
FIGS. 38A, 38B, 38C, and 38D are a schematic representation of a method of transmitting VOPs including B-pictures in the form of a bit stream according to the present invention.

When VOPs include B-pictures, the transmission procedure is performed as follows. In this case, VOPs are transmitted in the form of a bit stream in a transmission order different from the order in which they are displayed. For simplicity, it is assumed that VOPs are transmitted at a fixed frame rate. Let us assume that a session includes two VOPs as shown in FIG. 38A. Let us also assume that B3 of VOP1 and b0 of VOP2 are displayed at time t4. In FIG. 38, B and b denote B-pictures, and I and P denote an I-picture and P-picture respectively.

Figure 38B:
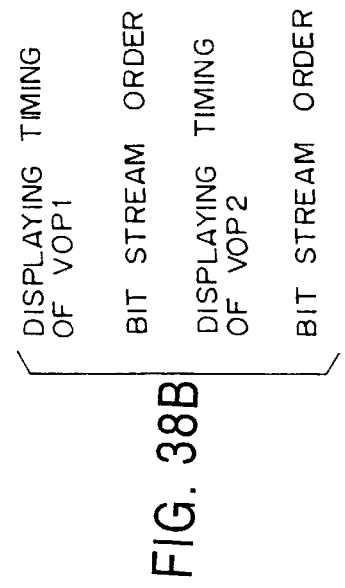

FIG. 38B illustrates the transmission orders of frames of VOP1 and VOP2 in a bit stream and also illustrates the displaying order thereof.

Figure 38C:
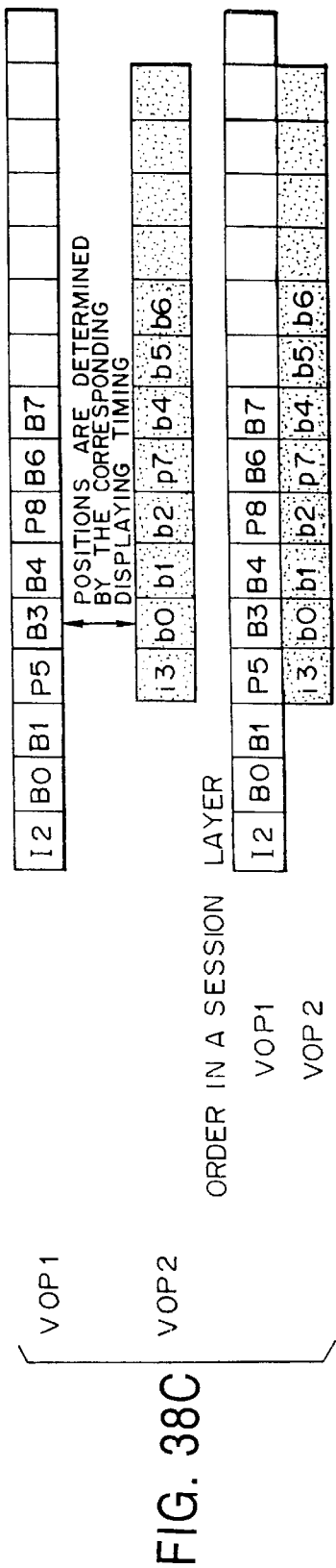
Figure 38D:

The frames of VOP1 and VOP2 are multiplexed into a single bit stream and then transmitted as described below. B3 of VOP1 and the first frame b0 of VOP2 are displayed at the same time, it is required that the decoding of both image frames should be completed before the specified displaying time. To meet the above requirement, B3 and b0 are transmitted in immediate succession. Similarly, P5 and i3 are transmitted in immediate succession, and B4 and b1 are also transmitted in immediate succession as shown in FIG. 38C. FIG. 38D illustrates a bit stream in which these frames are multiplexed.

The transmission order is determined relative to a frame to be displayed first as described above, and related frames are placed or multiplexed at adjacent locations in a bit stream.

Now in FIG. 38, let us assume that the frame rate is variable. The variable frame rate can be achieved by introducing ref_VOP_id as described earlier and by determining the time when a first frame of each VOP is to be displayed.

For example, let us assume that b0 is displayed after two units of time intervals from B3. In this case, ref_VOP_id equal to 1 and VOP_temp_ref equal to 2 are transmitted in conjunction with b0. After that, VOP_temp_ref indicates the relative displaying time of each frame measured from the displaying time of the previous frame. FIG. 36 illustrates the syntax associated with the VOP_layer in which ref_VOP_id is transmitted before VOP_temp_ref only for a frame to be displayed first in each VOP.

Although in the specific example described above, two VOPs are included in one session, each session may include an arbitrary number of VOPs.

5. ERASURE OF VOP

Now let us assume that a certain VOIP disappears in the middle of a session. In the case where frames are displayed at a variable rate, it is required that the time when the last frame of the VOP disappears should be clearly defined. To define the disappearing time, an erasure frame indicating the time when the VOP is terminated is transmitted at the end of the series of frames of that VOP. FIG. 39 illustrates the syntax (associated with flags) for the erasure frame. The erasure frame includes a VOP_end flag indicating that the frame is an erasure frame, and also includes a VOP_temp_ref flag. After the last frame of the VOP is displayed at the specified time for a time period indicated by VOP_temp_ref, no further frames of the VOP are displayed.

According to the encoding method and apparatus of the present invention, as described above, when an image signal and a key signal are separately encoded for each VOP, the key signal can be encoded in a highly efficient manner.

Furthermore, the encoding can be performed in a scalable fashion. Furthermore, in the present invention, the efficiency in the scalable encoding is further improved by limiting the encoding mode of a higher-layer signal.

In the method and apparatus for encoding an image signal for each VOP according to the present invention, those data which are adjacent in displaying time are placed at adjacent locations in the transmission order. The time at which a first frame of each VOP is to be displayed is indicated by a relative time (VOP_temp_ref) with respect to an immediacy previous frame of another VOP whose VOP_id is indicated by a ref_id flag. Thus it is possible to achieve synchronization among different VOPs even when VOPs are displayed at different frame rates or even when VOPs include B-pictures.

Furthermore, in the method and apparatus for encoding and transmitting an image signal for each VOP according to the present invention, when a certain VOP is terminated in the middle of a series of frames, a flag indicating the end frame and information indicating the time when the end frame is displayed are transmitted. This makes it possible to terminate a desired VOP at a desired time so that no frames are displayed after that.

Although in the specific examples described above with reference to block diagrams, the present invention are embodied using hardware, the invention may also be implemented with software in conjunction with a CPU and memory. That is, the algorithm of encoding and decoding an image signal of the present invention may be implemented in the form of a computer program such as an image encoding program and/or an image decoding program. In this case, the computer program is stored on a recording medium such as a semiconductor memory or a disk. The computer program such as the image encoding program and/or the image decoding program may be supplied to an terminal device via a network.

Although the present invention is described above with reference to specific embodiments, the invention is not limited to the details of these embodiment. Various modifications and applications are possible without departing from the sprit and scope of the invention.

What is claimed is:

1. An image signal encoding method of encoding first and second image signals in decomposed forms and a key signal used to combine said first and second image signals, said method comprising the steps of:

performing a scalable encoding process on said first image signal and said second image signal; and performing a scalable encoding process on said key signal, said scalable encoding process for said key signal being similar to that used for said image signals;

wherein, said first image signal is a background image signal and said second image signal is a foreground image signal;

said scalable encoding step for the image signals comprises:
  a first scalable encoding step of performing a scalable encoding process on said first image signal; and
  a second scalable encoding step of performing a scalable encoding process on said second image signal; and
  said scalable encoding process for the key signal is performed in a manner similar to said scalable encoding process used for said second image signal.

2. An image signal encoding method according to claim 1, wherein:
  said scalable encoding step for the key signal comprises the steps of:
  receiving a higher-layer key signal and a lower-layer key signal;
  encoding said lower-layer key signal thereby generating an encoded lower-layer key signal;
  locally decoding said encoded lower-layer key signal thereby generating a locally-decoded lower-layer key signal;
  generating a first predicted key signal for use in processing the higher-layer key signal, using said locally-decoded lower-layer key signal;
  calculating the difference between said higher-layer key signal and said first predicted key signal thereby generating a key difference signal; and
  encoding said key difference signal thereby generating an encoded key difference signal.

3. An image signal encoding method according to claim 1, wherein
  in said scalable encoding step for the first image signal, said scalable encoding step for the second image signal, and said scalable encoding step for the key signal, spatially-scalable encoding is performed.

4. An image signal encoding method according to claim 1, wherein: in said scalable encoding step for the first image signal, said scalable encoding step for the second image signal, and said scalable encoding step for the key signal, temporally-scalable encoding is performed.

5. An image signal encoding method according to claim 1, wherein: in said scalable encoding step for the first image signal, said scalable encoding step for the second image signal, and said scalable encoding step for the key signal, SNR-scalable encoding is performed.

6. An image signal encoding method according to claim 2, wherein:
  the lower-layer key signal is a key signal associated with an image having a small frame size, and the higher-layer key signal is a key signal associated with an image having a large frame size;
  said step of generating the first predicted key signal includes the step of up-sampling said first predicted key signal thereby generating an expanded first predicted key signal having a frame size equal to the higher-layer frame size; and
  in said step of calculating the difference between said higher-layer key signal and said first predicted key signal, the difference between said higher-layer key signal and said expanded first predicted key signal is calculated, thereby generating said key difference signal.

7. An image signal encoding method according to claim 2, further comprising the steps of:

locally decoding said encoded key difference signal thereby generating a locally-decoded key difference signal;
generating a second predicted key signal from said locally-decoded key difference signal; and
generating a predicted reference key signal from said first predicted key signal and said second predicted key signal,
wherein in said step of generating the key difference signal, the difference between said higher-layer key signal and said predicted reference key signal are calculated.

8. An image decoding method of decoding an encoded signal, said encoded signal comprising a signal obtained by encoding first and second image signals in decomposed forms and a key signal used to combine said first and second image signals, said method comprising the steps of:
  performing a scalable decoding process on the first encoded image signal and the second encoded image signal thereby generating a decoded first image signal and a decoded second image signal; and
  performing a scalable decoding process on an encoded key signal, said scalable decoding process for the encoded key signal being similar to that used for the image signals, thereby generating a decoded key signal;
wherein:
  said first image signal is a background image signal and said second image signal is a foreground image signal;
  said scalable decoding step for the image signals comprises the steps of: a first scalable decoding step of performing a scalable decoding process on said first image signal; and a second scalable decoding step of performing a scalable decoding process on said second image signal; and
  said scalable decoding step of processing said key signal is performed using a similar process to that used in said second scalable decoding step of processing said second image signal.

9. An image decoding method according to claim 8, wherein:
  said scalable decoding step for the key signal comprises the steps of:
  receiving an encoded key difference signal and an encoded lower-layer key signal;
  decoding said encoded lower-layer key signal thereby generating a decoded lower-layer key signal;
  decoding said encoded key difference signal thereby generating a decoded key difference signal;
  generating a first predicted key signal for use in processing a higher-layer key signal, said first predicted key signal being generated using said decoded lower-layer key signal; and
  calculating the sum of said decoded key difference signal and said first predicted key signal thereby generating a decoded higher-layer key signal.

10. An image decoding method according to claim 8, wherein in said scalable decoding step for the first image signal, said scalable decoding step for the second image signal, and said scalable decoding step for the key signal, spatially-scalable decoding is performed.

11. An image decoding method according to claim 8, wherein in said scalable decoding step for the first image signal, said scalable decoding step for the second image signal, and said scalable decoding step for the key signal, temporally-scalable decoding is performed.

12. An image decoding method according to claim 8, wherein in said scalable decoding step for the first image signal, said scalable decoding step for the second image signal, and said scalable decoding step for the key signal, SNR-scalable decoding is performed.

13. An image decoding method according to claim 9, wherein:
- the lower-layer key signal is a key signal associated with an image having a small frame size, and the higher-layer key signal is a key signal associated with an image having a large frame size;
- said step of generating the first predicted key signal includes the step of up-sampling said first predicted key signal thereby generating an expanded first predicted key signal having a frame size equal to the higher-layer frame size; and
- in said step of calculating the sum of said decoded key difference signal and said first predicted key signal, the sum of said decoded key difference signal and said expanded first predicted key signal is calculated to thereby generate said decoded higher-layer key signal.

14. An image signal encoding apparatus for encoding first and second image signals in decomposed forms and a key signal used to combine said first and second image signals, said apparatus comprising:
- means for performing a scalable encoding process on said first image signal and said second image signal; and
- means for performing a scalable encoding process on said key signal wherein said scalable encoding process for said key signal is similar to that used for said image signals;

wherein,
- said first image signal is a background image signal and said second image signal is a foreground image signal;
- said means for performing the scalable encoding process on the image signals comprises:
  - first scalable encoding means for performing a scalable encoding process on said first image signal; and
  - second scalable encoding means for performing a scalable encoding process on said second image signal; and
- said means for performing the scalable encoding process on said key signal performs said scalable encoding process using a similar scalable encoding process to that used for the second image signal.

15. An image signal encoding apparatus according to claim 14, wherein:
- said scalable encoding means for processing the key signal comprises:
- means for receiving a higher-layer key signal and a lower-layer key signal;
- means for encoding said lower-layer key signal thereby generating an encoded lower-layer key signal;
- means for locally decoding said encoded lower-layer key signal thereby generating a locally-decoded lower-layer key signal;
- means for generating a first predicted key signal for use in processing the higher-layer key signal, using said locally-decoded lower-layer key signal;
- means for calculating the difference between said higher-layer key signal and said first predicted key signal thereby generating a key difference signal; and
- means for encoding said key difference signal thereby generating an encoded key difference signal.

16. An image signal encoding apparatus according to claim 14, wherein in said scalable encoding means for processing the first image signal, said scalable encoding means for processing the second image signal, and said scalable encoding means for processing the key signal, spatially-scalable encoding is performed.

17. An image signal encoding apparatus according to claim 14, wherein in said scalable encoding means for processing the first image signal, said scalable encoding means for processing the second image signal, and said scalable encoding means for processing the key signal, temporally-scalable encoding is performed.

18. An image signal encoding apparatus according to claim 14, wherein in said scalable encoding means for processing the first image signal, said scalable encoding means for processing the second image signal, and said scalable encoding means for processing the key signal, SNR-scalable encoding is performed.

19. An image signal encoding apparatus according to claim 15, wherein
- the lower-layer key signal is a key signal associated with an image having a small frame size, and the higher-layer key signal is a key signal associated with an image having a large frame size;
- said means for generating the first predicted key signal includes means for up-sampling said first predicted key signal thereby generating an expanded first predicted key signal having a frame size equal to the higher-layer frame size; and
- said means for generating the higher-layer key signal calculates the difference between said higher-layer key signal and said expanded first predicted key signal.

20. An image signal encoding apparatus according to claim 15, further comprising:
- means for locally decoding said encoded key difference signal thereby generating a locally-decoded key difference signal;
- means for generating a second predicted key signal from said locally-decoded key difference signal; and
- means for generating a predicted reference key signal from said first predicted key signal and said second predicted key signal,
- wherein said means for generating the key difference signal calculates the difference between said higher-layer key signal and said predicted reference key signal.

21. An image decoding apparatus for decoding an encoded signal, said encoded signal comprising a signal obtained by encoding first and second image signals in decomposed forms and a key signal used to combine said first and second image signals, said apparatus comprising:
- means for performing a scalable decoding process on the first encoded image signal and the second encoded image signal thereby generating a decoded first image signal and a decoded second image signal; and
- means for performing a scalable decoding process on an encoded key signal using a similar process to that used for the image signals, thereby generating a decoded key signal;

wherein,
- said first image signal is a background image signal and said second image signal is a foreground image signal;
- said scalable decoding means for processing the image signals comprises:

a first scalable decoding means for performing a scalable decoding process on said first image signal; and a second scalable decoding means for performing a scalable decoding process on said second image signal; and said means for performing a scalable decoding process on said key signal performs the scalable decoding process in a manner similar to that used for said second image signal.

22. An image decoding apparatus according to claim 21, wherein said means for performing a scalable decoding process on the key signal comprises:

means for receiving an encoded key difference signal and an encoded lower-layer key signal;

means for decoding said encoded lower-layer key signal thereby generating a decoded lower-layer key signal;

means for decoding said encoded key difference signal thereby generating a decoded key difference signal;

means for generating a first predicted key signal, said first predicted key signal being generated using said decoded lower-layer key signal; and means for calculating the sum of said decoded key difference signal and said first predicted key signal thereby generating a decoded higher-layer key signal.

23. An image decoding apparatus according to claim 21, wherein in said scalable decoding means for processing the first image signal, said scalable decoding means for processing the second image signal, and said scalable decoding means for processing the key signal, spatially-scalable decoding is performed.

24. An image decoding apparatus according to claim 21, wherein in said scalable decoding means for processing the first image signal, said scalable decoding means for processing the second image signal, and said scalable decoding means for processing the key signal, temporally-scalable decoding is performed.

25. An image decoding apparatus according to claim 21, wherein in said scalable decoding means for processing the first image signal, said scalable decoding means for processing the second image signal, and said scalable decoding means for processing the key signal, SNR-scalable decoding is performed.

26. An image decoding apparatus according to claim 22, wherein the lower-layer key signal is a key signal associated with an image having a small frame size, and the higher-layer key signal is a key signal associated with an image having a large frame size;

said means for generating the first predicted key signal includes means for up-sampling said first predicted key signal thereby generating an expanded first predicted key signal having a frame size equal to the higher-layer frame size; and said means for calculating calculates the sum of said decoded key difference signal and said expanded first predicted key signal to generate said decoded higher-layer key signal.

* * * * *